United States Patent [19]
Lacher et al.

[11] Patent Number: 5,649,066
[45] Date of Patent: Jul. 15, 1997

[54] METHOD AND APPARATUS FOR REFINEMENT OF LEARNING IN EXPERT NETWORKS

[75] Inventors: Robert Christopher Lacher, Tallahassee; Susan Irene Hruska, Quincy; David Carl Kunicky, Tallahassee, all of Fla.

[73] Assignee: The Florida State University for and on behalf of the Florida Board of Regents, Tallahassee, Fla.

[21] Appl. No.: 412,616

[22] Filed: Mar. 29, 1995

Related U.S. Application Data

[63] Continuation of Ser. No. 189,270, Jan. 31, 1994, abandoned, which is a continuation of Ser. No. 816,560, Jan. 3, 1992, abandoned.

[51] Int. Cl.$^6$ .................................................. G06F 15/18
[52] U.S. Cl. ............................................................. 395/23
[58] Field of Search ................................. 395/23, 22

[56] References Cited

U.S. PATENT DOCUMENTS

| | | | |
|---|---|---|---|
| 4,326,259 | 4/1982 | Cooper et al. | 364/715 |
| 4,593,367 | 6/1986 | Slack et al. | 364/513 |
| 4,912,647 | 3/1990 | Wood | 364/513 |
| 4,912,649 | 3/1990 | Wood | 364/513 |
| 4,912,651 | 3/1990 | Wood et al. | 364/513 |
| 4,912,652 | 3/1990 | Wood | 364/513 |
| 4,912,653 | 3/1990 | Wood | 364/513 |
| 4,912,654 | 3/1990 | Wood | 364/512 |
| 4,912,655 | 3/1990 | Wood | 364/513 |
| 4,914,603 | 4/1990 | Wood | 364/513 |
| 4,918,620 | 4/1990 | Ulug | 395/22 |
| 4,979,126 | 12/1990 | Pao et al. | 364/513 |
| 5,121,467 | 6/1992 | Skeirik | 395/22 |
| 5,130,936 | 7/1992 | Sheppard et al. | 395/22 |
| 5,168,549 | 12/1992 | Takagi et al. | 395/21 |
| 5,201,026 | 4/1993 | Tsuiki | 395/11 |

FOREIGN PATENT DOCUMENTS 0 295 876 A2  12/1988  European Pat. Off. ......... G06K 9/64

OTHER PUBLICATIONS

LiMin Fu, "Rule Learning by Searching on Adapted NETS," *AAAI-91 Conference*, 1991.

K, Hirota, W. Pedrycz, "Fuzzy Logic Neural Networks: Design and Computations," *International Joint Conference on Neural Networks*, 1991.

Hirota et al., Fuzzy Logic Neural Networks: Design and Computations, in 1991 IEEE International Joint Conference on Neural Networks, vol. 1, Nov. 1991, pp. 152–157.

Fu, Rule Learning by Searching on Adapted Nets, in Proceedings of American Association of Artificial Intelligence Conference, Jul. 1991, pp. 590–595.

Lacher et al., Expert Networks: A Neural Network Connection to Symbolic Reasoning Systems, in Proceedings of the 4th Florida Artificial Intelligence Research Symposium, Apr. 1991, pp. 12–16.

Krieger et al., Neuronet—A Distributed Real-Time System for Monitoring Neurophysiologic Function in the Medical Environment, in IEEE Computer, Mar. 1991, pp. 45–55.

(List continued on next page.)

*Primary Examiner*—Robert W. Downs
*Attorney, Agent, or Firm*—Arnold, White & Durkee

[57] ABSTRACT

A method for constructing an expert network apparatus from a specific rule-based expert system, having a certainty factor, through the use of a first-order network structure comprising regular node structures and weighted connections and a second-order network comprising regular nodes, operation nodes and connections. Also disclosed are related methods for implementing backpropagation learning on an acyclic, event-driven, expert network apparatus and for improving the rule-base of a rule-based expert system. Further disclosed is an event-driven expert network of high-level nodes and methods for implementing backpropagation learning thereon.

6 Claims, 14 Drawing Sheets

OTHER PUBLICATIONS

Hruska et al., Learning in Acyclic Expert Networks, in Second Proceedings of the Second Workshop on Neural Networks: Academic/Industrial/NASA Defense, Feb. 1991, pp. 181–184.

Lacher et al., Backpropagation Learning in Expert Networks, FSUCS Technical Report 91–015, Jan. 1991.

Lacher et al., Expert Networks: A Neural Network Connection to Symbolic Reasoning Systems, FSUCS Technical Report 90–092, Sep. 1990.

Kuncicky et al., Hybrid Systems: The Equivalence of Rule-Based Expert System and Artificial Intelligence Neural Network Inference, FSUCS Technical Report 90–091, 1990.

Hruska et al., Learning in Acyclic Neural Networks, FSUCS Technical Report 90–052, May 1990.

Kuncicky, The Transmission of Knowledge Between Neural Networks and Expert Systems, in Proceedings of the [First] Workshop on Neural Networks: Academic/Industrial/NASA/Defenst, Feb. 5–6, 1990, pp. 311–319.

Fu, Integration of Neural Heuristics into Knowledge-Based Inference, in Connection Science, 1990.

Fu, "Refinement of Medical Knowledge Bases: A Neural Network Approach", Proc of 3rd Annual IEEE Symposium on Computer Based Medical Systems, Jun. 3–6 1990, pp. 290–297.

50
a ⊢ b (.8) 50a
a ⊢ c (.6) 50b
b ⊢ c (.1) 50c
d ⊢ e (.4) 50d
e ⊢ c (-.2) 50e

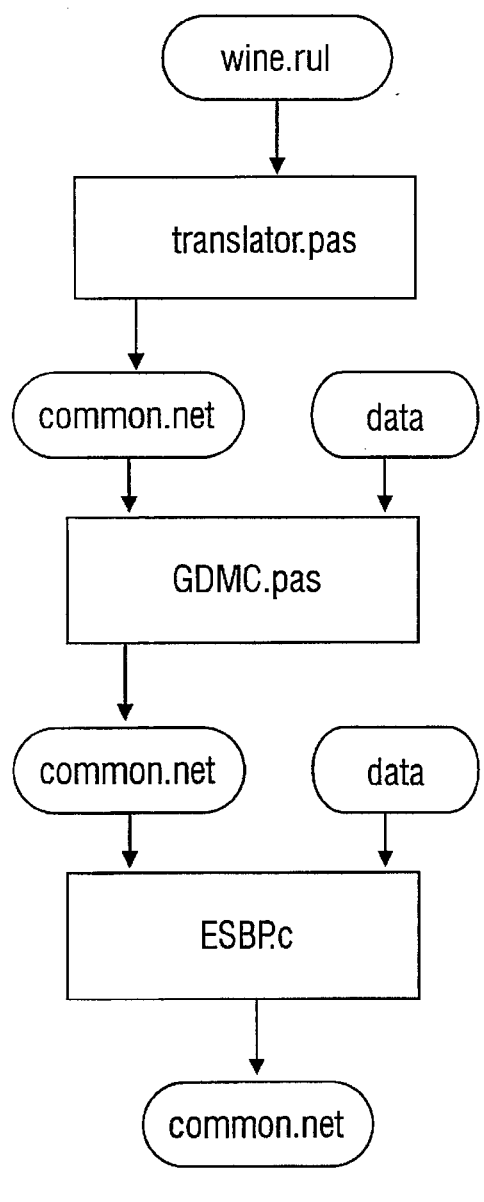

1. Start with a rule base that contains missing or incorrect certainty factors

2. Translate rule base to ANN

3. ANN knowledge is represented in ASCII file for transfer. Data set is a collection of correct examples.

4. Goal-Directed Monte Carlo Learning is used to reduce error to 10% of original error.

5. Results are passed to next program using ASCII file.

6. ES-backpropagation is used to complete the learning process.

7. Resulting ASCII file may be translated back to ES rule base if desired.

FIG. 10

METHOD AND APPARATUS FOR REFINEMENT OF LEARNING IN EXPERT NETWORKS

This application is a continuation of application Ser. No. 08/189,270, filed 31 Jan. 1994, now abandoned, which is a continuation of application Ser. No. 07816,560, filed 3 Jan. 1992, now abandoned.

1. BACKGROUND OF THE INVENTION

The prior art includes two basic technologies for implementing knowledge based systems on machines: Expert systems and neural networks. In constructing an expert system, a human expert (or several experts) is generally consulted about how he would solve a certain problem. Through these consultations, general rules about how the data associated with a particular problem should be manipulated are developed. These rules are eventually programmed into the machine so that, given a set of input data, the formulated rules can be applied to the data to yield a solution.

As the above discussion indicates, expert systems are generally associated with top-down knowledge engineering and model-based or deductive reasoning. In other words, to implement an expert system one must have some previous information indicating how a problem should be solved or a model describing the problem through a group of rules.

In contrast to expert systems, neural networks are generally associated with bottom-up learning and inductive reasoning. To construct a neural network, one first constructs a network of neurons that receive input and produce an output in response to the input. In most neural networks, the neurons assign differing weights to each input, and combine the weighted inputs to produce the output. Once the basic neural network is constructed, it is then trained by feeding it data representative of known problems and their known solutions. The network then adjusts the weight factors in accordance with predetermined feedback rules so that it can correctly produce an acceptable output for each set of known inputs. In this sense, the neural network "learns" from the sets of known problems and solutions.

Additional details concerning expert systems and neural networks are set out below.

1.1 Expert Systems

The above provided a brief explanation regarding how an expert system works. This section provides a more detailed discussion of expert systems. As used in this specification, an "expert system" is generally defined as comprising three interacting components: a rule base, an inference engine, and a cache. Each element of such an expert system is figuratively illustrated in regard to a typical expert system 10 in FIG. 1A and further discussed below.

1.1(a) Rule Base

The rule base 12 of expert system 10 typically consists of statements called rules that are essentially implications with certainty factors. As discussed above, these rules are generally established by interviewing human experts. An entry in the rule base is a rule of the form a→b (cf)

where a is the antecedent, b the consequent, and cf the certainty factor of the rule. For example, a human expert in the area of auto repair may posit a rule that 75% of the time a car's wheels squeak the brake pads need replacement. Thus, a rule may be established indicating that if the brakes squeak then the brake pads need replacing with a certainty factor of 0.75. In this example the squeaking brakes would be the antecedent a, the brake pad replacement would be the consequence b, and the 0.75 would be the confidence factor of. For the purposes of this discussion, it is assumed that certainty factors are restricted to the range [−1,1] although the present invention may be practiced with other certainty factors.

Generally, the rules contained in an expert system's rule base may be expressed in mathematical terms. For example, let A denote the set of antecedents, B denote the set of consequents, and define $C = A \cup B$. Under such a description the elements of C are called assertions. Each assertion $c \in C$ has three attributes: a label c.l denoting a fixed logical statement, a real variable c.i called its internal state, and a real variable c.o called its output value. The significance of these labels, internal states, and output values is further discussed below. Again, for the purposes of this specification it is assumed that states are restricted to the range [−1,1] and output values are restricted to [0,1] although other ranges may be used without departing from the inventive scope of the present invention.

In nearly all expert systems, the rules are constructed in a feed-forward form and no cycles occur among the expert system rules, as circular logic is typically disallowed in an expert system database. An example of this feed forward rule construction is illustrated in FIG. 1B. As illustrated, while the output of a rule in one layer may serve as an antecedent for a rule in a subsequent layer, the outputs for a rule in a subsequent layer do not serve as antecedents for rules in preceding layers. This is because cyclic rules are generally not allowed in expert systems.

1.1(b) Cache.

The second element in most expert systems is known as the cache or working memory. Such a cache is figuratively illustrated as element 14 in FIG. 1. Basically, the cache 14 is the dynamic working memory of the expert system. The current state of any active rule (or assertion) is stored in the cache along with facts consisting of information about the validity of rule antecedents. The cache may be viewed as the place where the label of an assertion is associated with its current state and output value. For example, using the simple rule discussed above, the cache 14 would contain information indicating the fact of whether the brakes are squeaking. For example if the brakes were not squeaking the current state of that antecedent would probably be 0; while if the brakes were squeaking the value would be 1.

1.1(c) Inference Engine.

The inference engine is the part of the expert system that draws conclusions by manipulating rules from the rule base and facts from the cache, and updates the current values in the cache during processing. Even though it is usually superimposed on a clocked computer, this cache updating is naturally an event-driven computation.

Using the above example, assume that the driver of the car is not sure whether the brakes or shocks are squeaking but believes that there is a 80% chance that the brakes are squeaking. In this case the cache may include an indication that the current state of the antecedent "squeaking brakes" is 0.80. The inference engine would read this current state, apply the rule, and generate an output signal indicating that there is a 60% (0.8×0.75) chance that the brake pads need replacing. Of course the above example is an extremely simple one. In most expert systems the number of antecedents will be much greater than one and the output state of one rule may serve as the input antecedent for another. In such systems, the modification of one antecedent almost always involves a recalculation of several other antecedents, an updating of these antecedent states in the cache, and a reapplication of the rules on the rule base to the updated antecedents.

The inference processing of an expert system may be referred to as inferential dynamics. The inferential dynamics are determined by three components of the inference engine: the evidentiary combining function, the firing function, and the control system.

The "evidentiary combining function" is used to evaluate the effect of multiple rules having the same consequent. For example, assume that two rules are known, the first being the rule that when the brakes squeak the brake pads need to be changed 75% of the time, and the second being the rule that when the car takes 200 feet to stop at 25 miles/per/hour the brake pads need replacing 75% of the time. If the expert system is given the information that a car takes over 200 feet to stop at 25 mph and that the brakes squeak, it can use the evidentiary function to combine the two rules and indicate that there is probably greater than a 75% chance that the brake pads need replacing.

The "firing function" determines whether or not a rule will fire based on the value of its internal state, and then determines the output value. For an assertion a, a.o:=f(a.i) where f is the firing function, the "control system" performs selection and scheduling. Selection consists of determining which rules and facts if any are to be considered for activation. Scheduling resolves conflicts that may arise, for example, when more than one rule is ready to fire or when rules are encountered in some sequential order that may not reflect real knowledge. For example, again given the above example, a firing function for the rule "change brake pads" may be set to fire only when there are adequate indicators that the task needs to be performed. For example, the firing function may be set to only change the brake pads when the internal value of the rule is greater than 0.75. Thus, if the brakes merely squeak or the car takes 200 ft to stop at 25 mph, the function will not fire since the internal state will be 0.75. However, if both facts are found in the cache, the internal state of the rule will be 1.5 and the rule will fire indicating that the brake pads should be changed. In keeping with the above example, the value for changing brake pads would be set to 1 since the output values are restricted to be in the range of [0, 1].

Closely related to the concept of an inference engine is the concept of a "shell." Basically, a shell is an un-instantiated expert system, consisting of an inference engine and empty memory structures (i.e., no set rules in the rule-base). A shell can be instantiated (made into an expert system) by insertion of knowledge into the knowledge base or by placing rules into the rule base.

1.2 Neural Networks

In contrast to the non-cyclic, rule-based expert systems described above, most neural networks consist of networks of artificial neural objects, sometimes referred to as processing units, nodes, or "neurons," which receive input data, process that data, and generate an output signal. In such systems, the key to solving lies not in a rule proclaimed by an expert but in the processing functions of the many neurons which comprise the network. One example of a neural network is illustrated in FIG. 2A.

As discussed above, most neural networks must be trained to establish the processing functions of the neurons and enable the network to solve problems. The role and nature of time is important for both computational expedition and model realism in the training of such neural networks. This role is influenced and often constrained by architectural assumptions. For example, the most widely used learning algorithm, back-prop, typically depends on a layered feed-forward architecture that implicitly defines the role of time in both activation and learning phases. The layers impose what amounts to a global clock in the entire network. Additional discussion of the artificial neural objects that make up a neural networks is contained below.

In object-oriented programming, an object is characterized by a set of attributes describing its current state and a set of operations which can be applied to that object. An "artificial neural object" (ANO) may be defined as an artificial neuron with it attendant states, I/O, and processes: activation state, processing state, incoming connections and connection strengths, outgoing connections, combining function, output function, and possibly a learning function, together with a communications facility to signal changes in processing state (waiting, active, ready) to adjacent nodes in the network. Precise specification of communications facilities for an ANO is dependent on the learning method imposed on the network and possibly other application-specific considerations. The exact nature of the combining and output functions is also variable. There is one specific type of ANO that is widely used in prior art neural networks. The combining function for this ANO is the taking of a weighted sum of the inputs; the output function for this ANO is a sigmoidal squashing function applied to the value of the weighted sums of the inputs. For the purposes of this specification only, ANO meeting this definition, i.e., having a weighted sum combining function and a sigmoidal squashing output function is referred to as an analog perceptron.

1.3 Learning

As discussed above, one important step in training a neural network to solve problems is to teach the neural network how to solve the desired problem by supplying it with known problems with known solutions. This teaching process is often referred to as "learning" since the neural network learns from the known correct cases.

After enumerating the nodes in a neural network, each node has a "weight vector" whose components are the weights of incoming edges. The weight vectors are the rows of the "weight matrix," also called the "knowledge state" of the network. The "weight space" of a node consists of all possible weight vectors. "Learning" is defined to be a change in the knowledge state. The process of updating the knowledge state over time according to some algorithm is called "knowledge dynamics". The time scale of knowledge dynamics is generally assumed to be slower than that of activation dynamics.

Learning implies a change in knowledge. Generally speaking, neural networks are said to represent knowledge in their connections. There are two levels on which to interpret such a statement.

First, given a set of connections (a network topology), knowledge is stored in the synaptic functions. This is the more usual interpretation and is usually referred to as "fine" knowledge. In other words, fine knowledge is represented in a neural network by the weights of the connections between the ANOs.

On the other hand, the specification of which connections exist could also fit this concept of knowledge in neural networks. This is referred to as "coarse" knowledge.

Thus, coarse knowledge is captured in a network topology; fine knowledge is captured in the synaptic functionality of the connections. Learning coarse knowledge means changing the network topology while learning fine knowledge (or knowledge refinement) involves changing the synaptic functionalities. In either case learning is change, or knowledge dynamics.

The above brake-pad example may be used to illustrate the difference between coarse learning and fine learning. Assume that a neural network is established and that numerous known-correct cases are applied where it has been proper to change the brake pads. After learning, the neural network should establish a link between (a) the neurons responsible for indicating that the brakes squeak and that the car takes 200 ft to stop at 25 mph and (b) the neuron responsible for indicating that the brake pads need to be changed. This establishment of the link may be referred to as "coarse learning."

Once the coarse learning has been accomplished, the neural network must next determine what weight factors to apply to the respective outputs indicating that the brakes squeak and that the car takes 200 ft to stop at 25 mph. After repeated learning, the neural network should determine that the weight factors for both of these outputs should be 0.75. This determination of the exact weight factor to be applied to given inputs is referred to as "fine learning."

Learning coarse knowledge could be loosely interpreted as rule extraction; a considerable body of research on this topic exists independent of neural networks. Some connectionist methods have also been introduced in recent years that build or modify network topology. While these methods are mostly not directed at high-level networks, where a single connection may be assigned meaning, some of them have potential in the realm of expert networks.

1.4 Backpropagation Learning

As discussed above, a neural network must go through a learning process before it can accurately be used to solve basic problems. Although several procedures are available for training neural networks, one of the most widely used is "backpropagation of error" learning.

Backpropagation learning, more precisely described as steepest-descent supervised learning using backpropagation of error, has had a significant impact in the field of neural networks. Basically, backpropagation of error involves comparing the actual output of a neuron with a known correct value and determining the error for that neuron. That error for that neuron is then sent back (or back-propagated) to the neurons that provided input into the neuron for which the error was calculated; the errors for those neurons are then calculated and backpropagated through the network.

Once each neuron receives its backpropagation error, it has an indication of both what its output value actually is and what that output value should be. Because the error for a given neuron is essentially a vector representing the erroneous weights given to the various input values, each node can be designed (a) to determine the gradient of the error vector and (b) to determine in which direction is must change its weight vector to minimize the magnitude of the error vector. In other words, each neuron can be designed to determine the change in its weight vector that would tend to minimize the magnitude of the error vector the fastest, and then to change its weight vector in that direction. By periodically receiving error vectors, calculating the fastest way to minimize the magnitude of the error vector (i.e., calculating the steepest descent), and altering its weight vector, the neurons of a neural network can learn how to solve various problems.

Because of the need to backpropagate errors, many prior art backpropagation learning methods typically depend on a layered feed-forward architecture that implicitly defines the role of time in both activation and learning phases. In other words, most neural networks using back propagation divide the ANOs into separate layers and backpropagate the error from each layer to its predecessor through the use of a global clock. Such layered, backpropagation is illustrated in FIG. 2B.

As illustrated, the neural network is divided into four layers: A, B, C and D. Known inputs are applied to layer A and the network is activated to yield outputs in layer D. The error for the ANOs in layer D is then calculated using the known outputs and backpropagated to layer C. This process is repeated from layer C to B and B to A. Notably, the error for all the neurons is clocked to the neurons of its preceding layer through the use of a global clock. By implementing backpropagation in this manner these layers impose what amounts to a global clock on the entire network.

Another feature typical of most prior art neural networks using backpropagation learning is that the ANOs are almost always simple analog perceptrons. As discussed above, an analog perceptron is an ANO where the combining function takes the weighted sum of the inputs and the output function is a sigmoidal squashing function.

Although analog perceptrons are useful for solving many problems, they are often inadequate when more complicated types of neural networks are attempted to be implemented. Apparently, the complexities of implementing backpropagation with ANOs that are not perceptrons has been one of the factors preventing the prior art from using non-perceptron ANOs in backpropagation neural networks.

In summary, although backpropagation has been widely used in the prior art as a supervised learning paradigm, it has been applied almost exclusively to layered, feed-forward networks of analog perceptrons.

2. SUMMARY OF THE INVENTION

The present invention relates to learning fine knowledge, or knowledge refinement. The methods disclosed herein are appropriate in cases where a general set of rules is known but requires fine tuning to work properly.

Particularly in cases where coarse knowledge is static and relatively easily encoded, but fine knowledge is difficult to capture and may vary over time or over specific use sites, the ability to learn fine knowledge inductively from data will be important. Examples of this type include medical-advice systems for chronic diseases where treatment programs must be tuned to each individual patient as well as control systems that must adapt to a variety of environments yet to be encountered. In such situations, the coarse knowledge is determined by the disease or the machine, the fine knowledge by the patient or the environment.

Through the practice of the present invention, an "event-driven expert network" comprising acyclic neural objects derived from an expert system may be implemented. Neural objects in accordance with the present invention process information through a novel non-linear combining function. Further, practice of the present invention allows implementation of backpropagation learning for the acyclic, event-driven expert network.

3. BRIEF DESCRIPTION OF THE DRAWINGS

Figure 7:
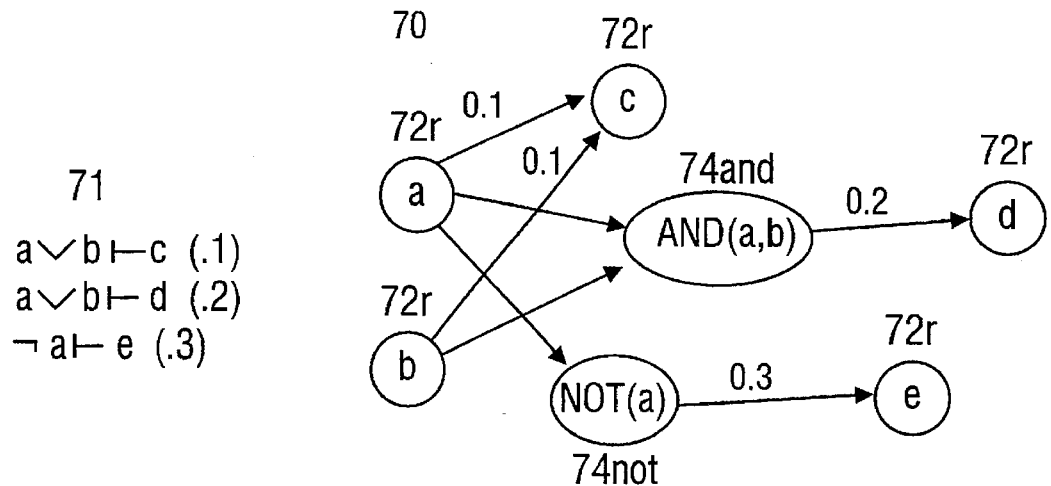
Figure 8:
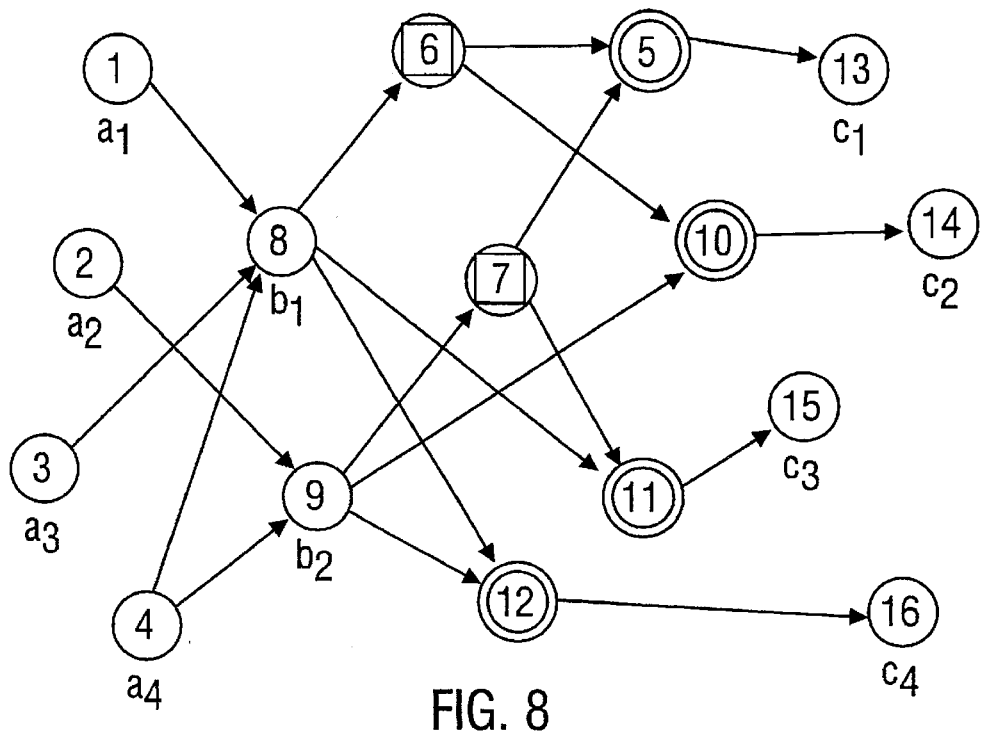
Figure 9:
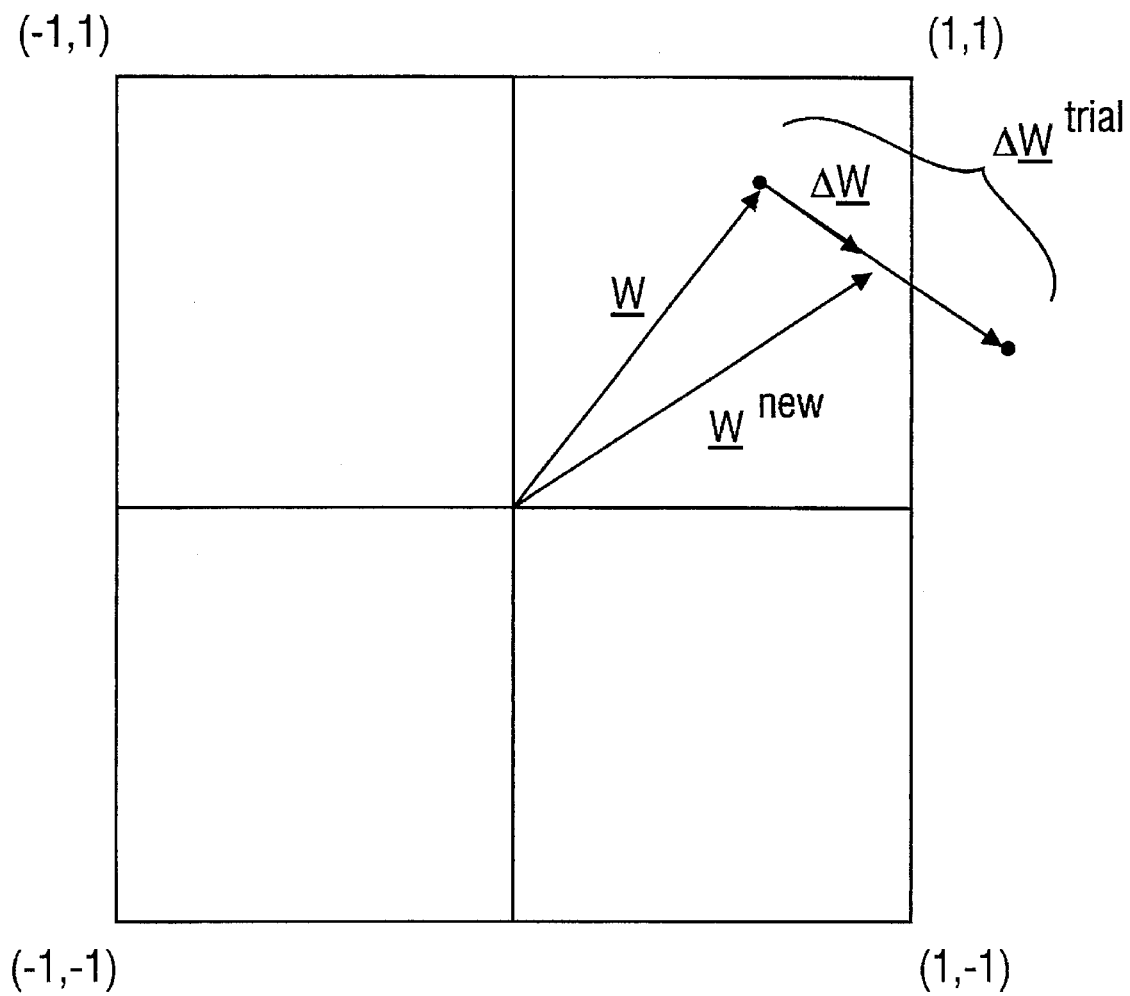

FIG. 7 provides an example of the construction of a neural network from a rule base with complex assertions;

FIG. 8 illustrates a network for solving the 4-2-4 problem;

FIG. 9 illustrates a constraint on the weight factor of a neural network; and

FIG. 10 illustrates one process for using the methods of the present invention.

4. DISCUSSION OF EMBODIMENTS OF THE INVENTION

4.1 An Event-Driven Neural Network

In one embodiment of the present invention, an acyclic, event-driven neural network is constructed where backpropagation learning can be implemented.

As discussed in Section 1.4, above, most prior art neural networks are globally timed. In contrast to such prior art systems, the expert network of the present invention is event-driven.

In order to accommodate an event-driven scheme, the expert network of the present invention makes use of the concept of an "n-input artificial neuron." Basically, an n-input artificial neuron is a processing element consisting of at least the following:

(i) Real-valued input signals $x_1, \ldots, x_n$ along with real-valued connection strengths (weights) $w_1, \ldots w_n$ for these signals; $x=(x_1, \ldots, x_n)$ is the input vector and $w=(w_1, \ldots w_n)$ is the weight vector of the neuron;

(ii) A combining function F that determines an internal state $y=F(x,w)$ from the input and weight vectors;

(iii) An output function f that determines a single output value (sometimes called activation value) $z=f(y)$ from the internal state.

When the combining function is the weighted sum of inputs and the output function is a sigmoidal squashing function about some threshold, the artificial neuron may be referred to as an analog perceptron. Such analog perceptrons are typically used to implement backpropagation learning in prior art neural networks. Because such analog perceptrons are not well adapted to implement acyclic, event driven expert networks, the present invention employs a distinctly different type of ANO.

A neural network in accordance with the present invention utilizes the concept of an artificial neural object (ANO) that is different from the analog perceptrons used in the prior art. Basically, an ANO comprises an artificial neuron with its attendant states, I/O, and processes: internal processing state, incoming connections and connection strengths, outgoing connections, combining function, and, in one embodiment, the learning function, together with a communications facility to signal changes in the processing state to adjacent nodes in the network. Precise specification of the communication facilities for an ANO is dependent on the learning method imposed on the network and possibly other application-specific considerations such as (in the case of expert networks) the inferential dynamics of the expert system. The exact nature of the combining and output functions is also variable.

As used herein, a network is a directed graph with weighted edges. An event-driven artificial neural network is a network of artificial neural objects where the directed edges indicate the output-to-input connections among the ANOs. That is, a directed edge connects the output of its initiating node to an input of its terminating node. The weight of a directed edge indicates the strength of the connection. The term "node", as used herein, generally means a vertex (i.e., artificial neural object) in an event-driven artificial neural net.

Figure 1A:
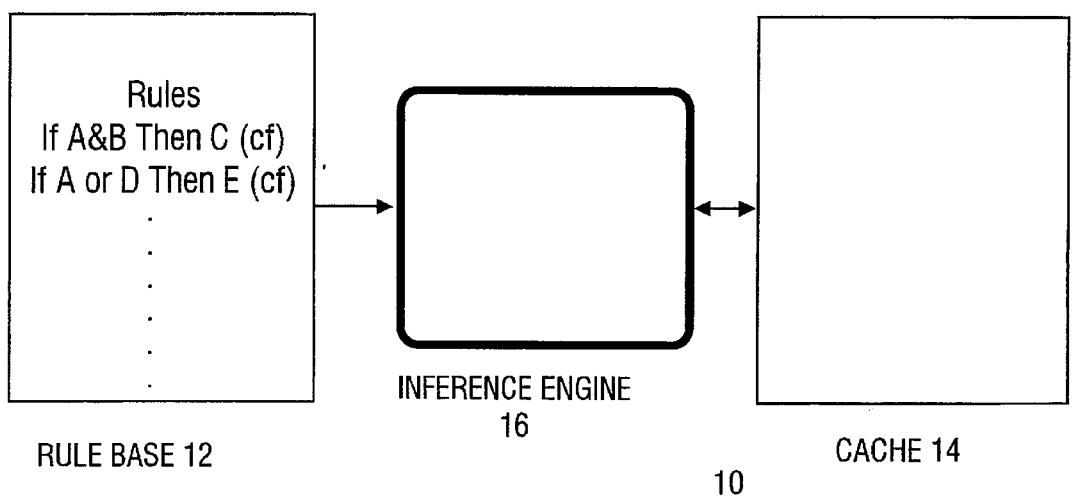
FIGS. 1A–1B illustrate a typical feed forward expert system.
Figure 1B:
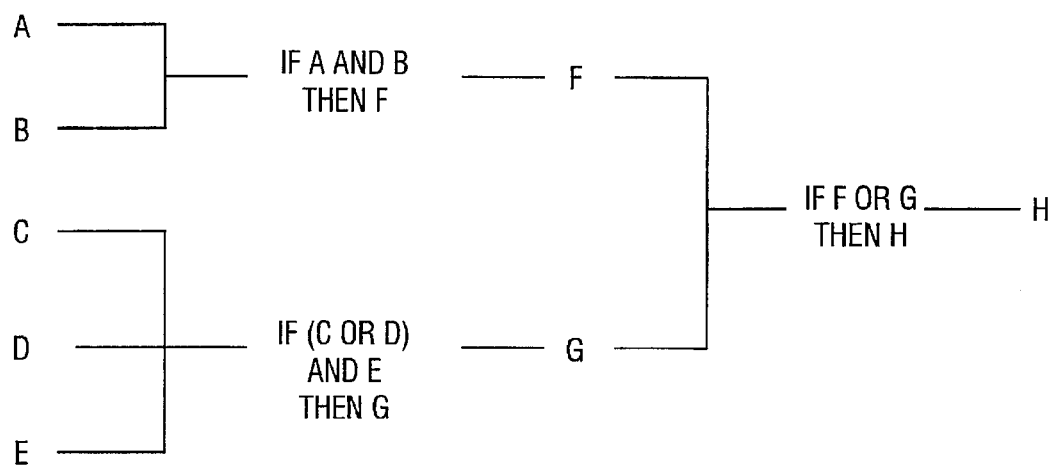
Figure 2A:
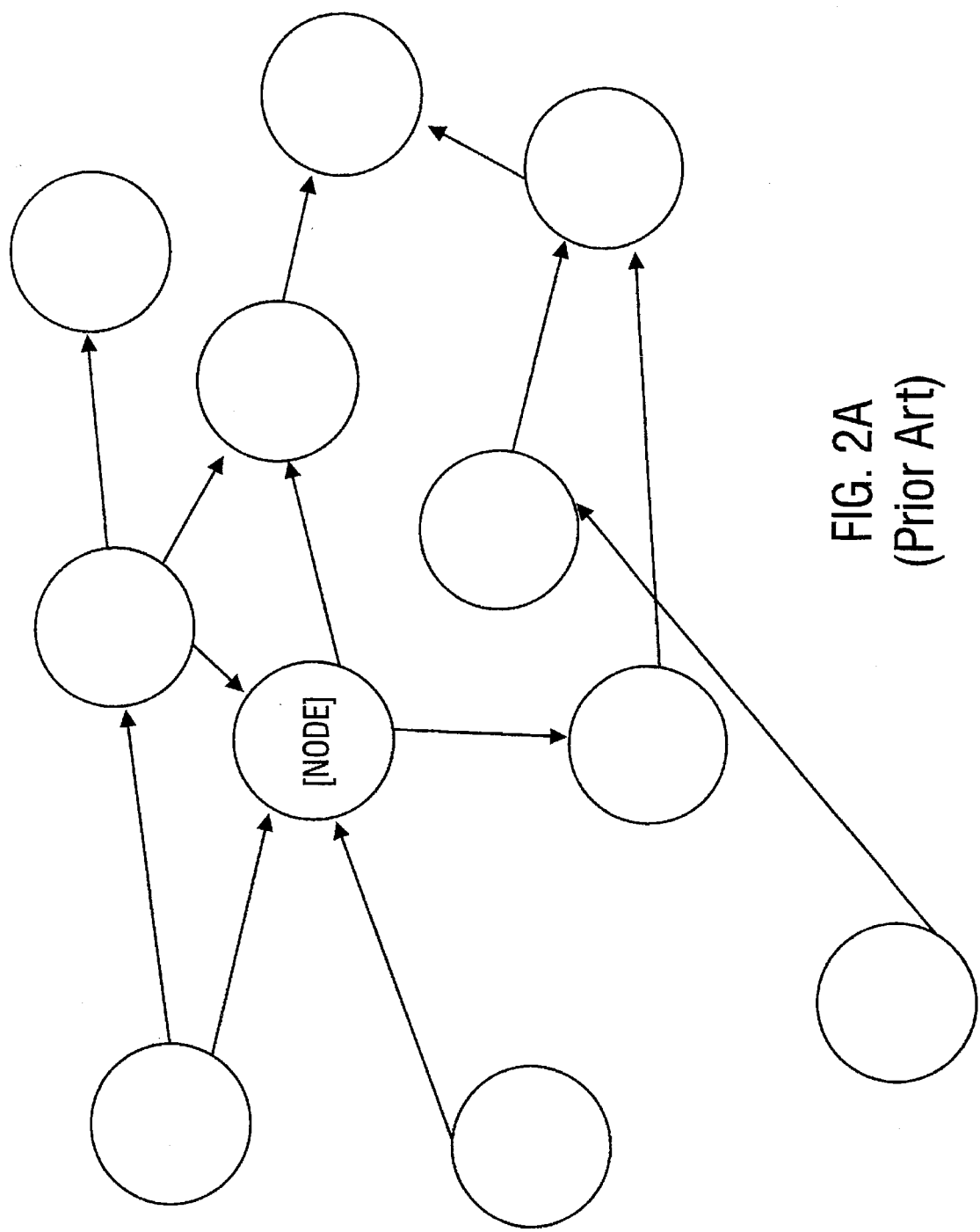
FIGS. 2A–2B illustrate a typical neural network.
Figure 2B:
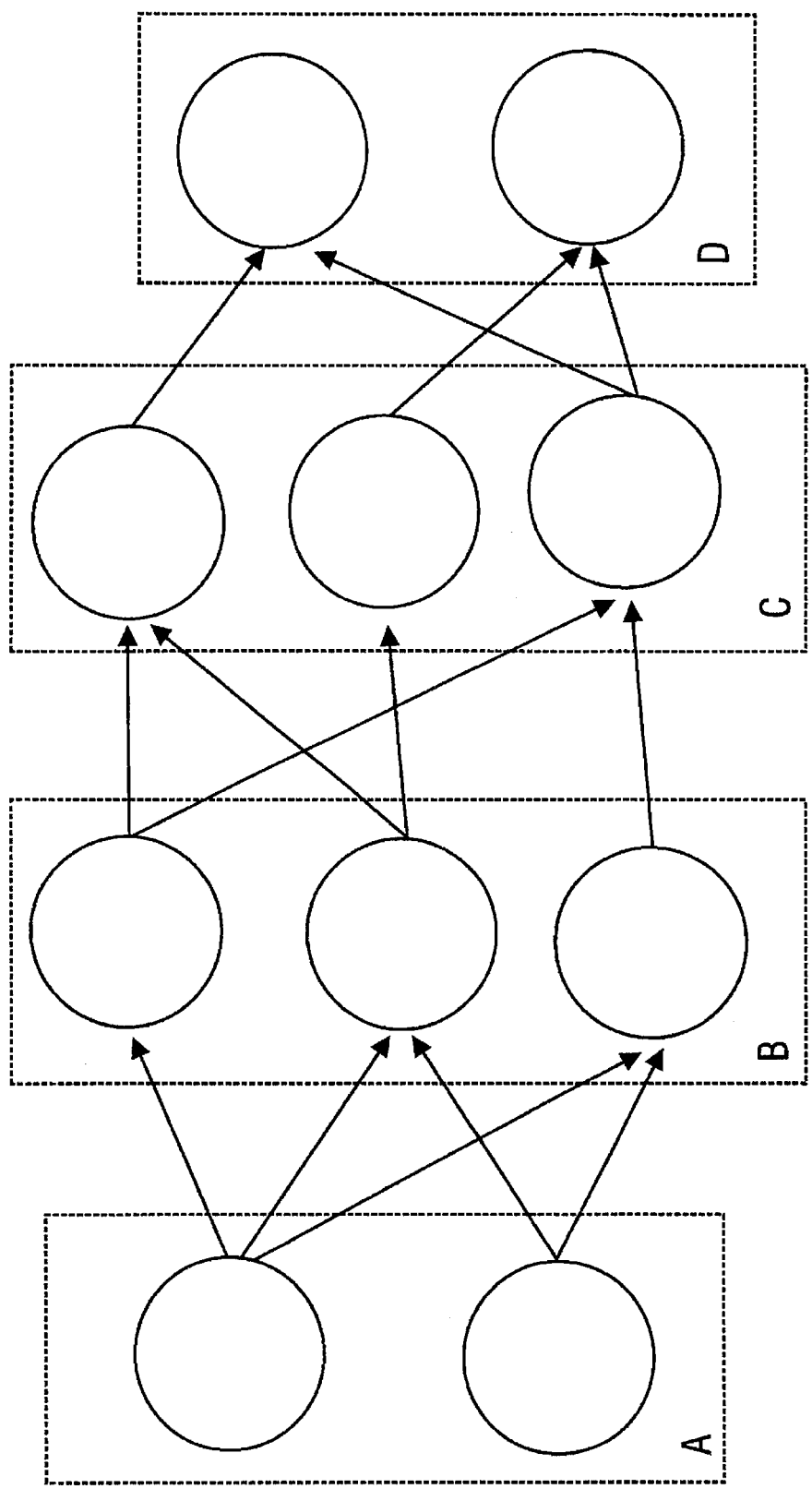
Figure 3:
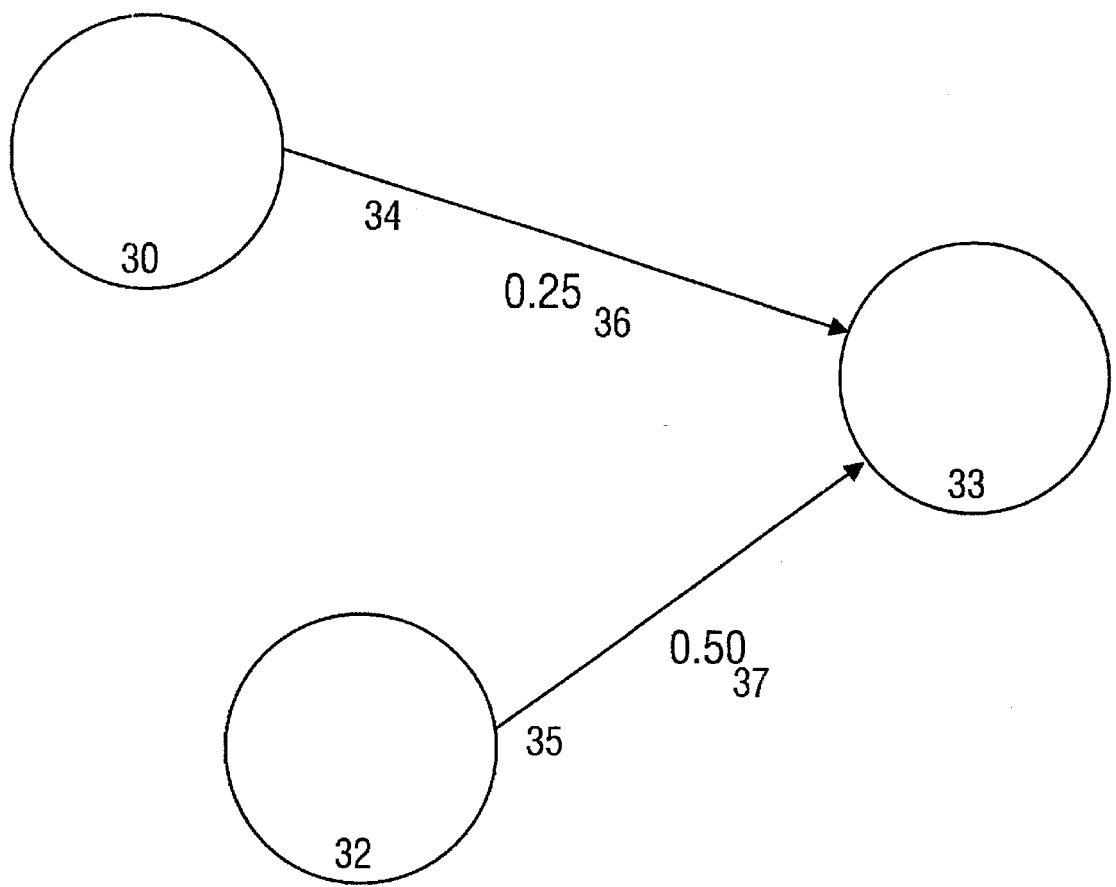
FIG. 3 illustrates a neural network with weighted connections.
Figure 4A:
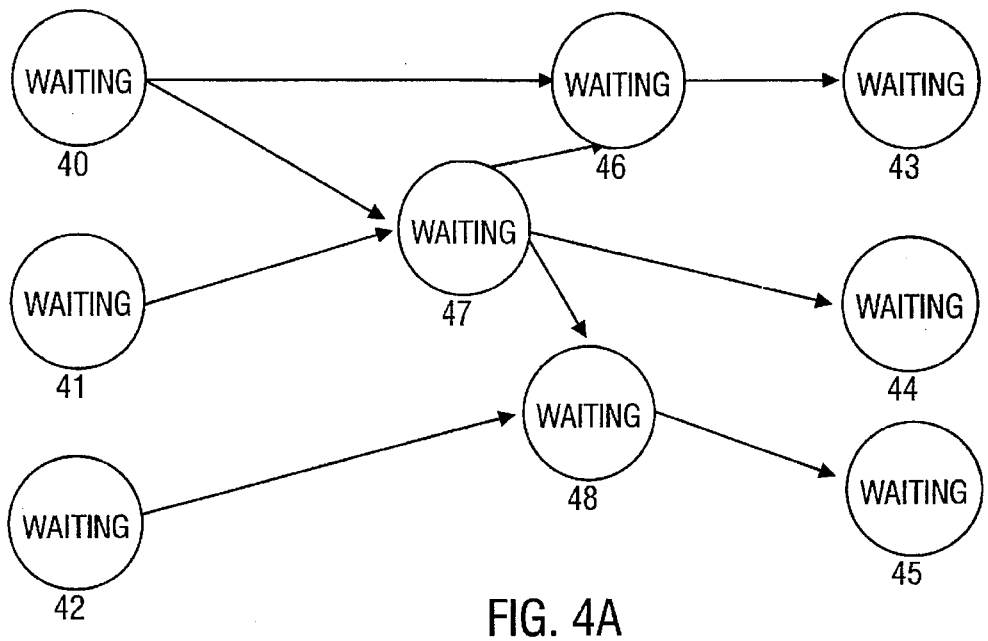
FIGS. 4A–4L illustrate the event-driven nature of the expert network of the present invention.
Figure 4B:
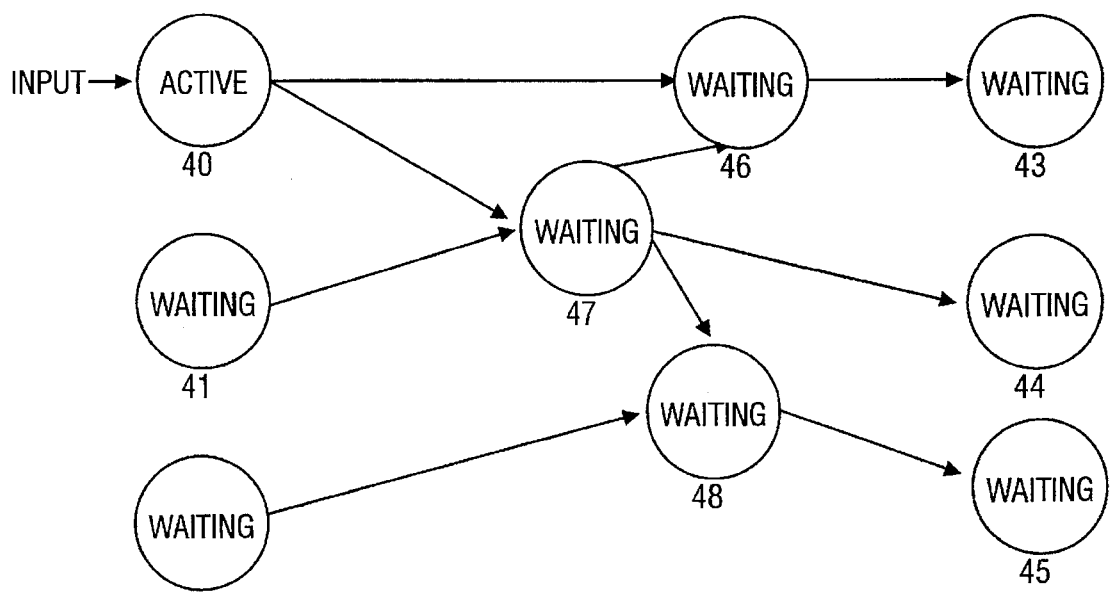
Figure 4C:
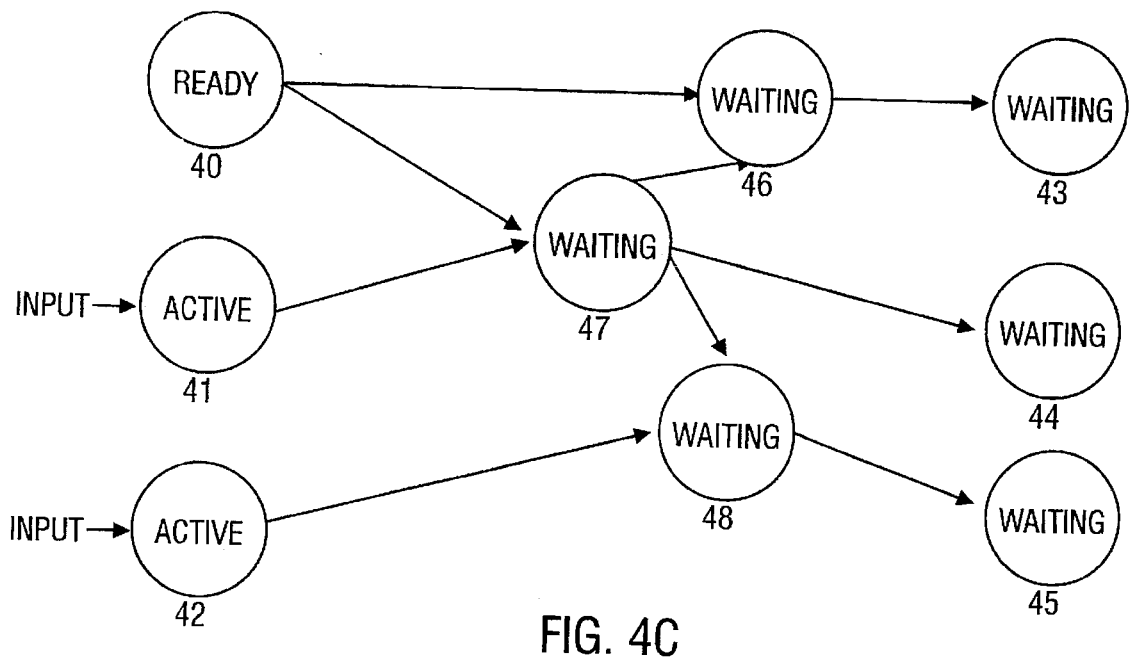
Figure 4D:
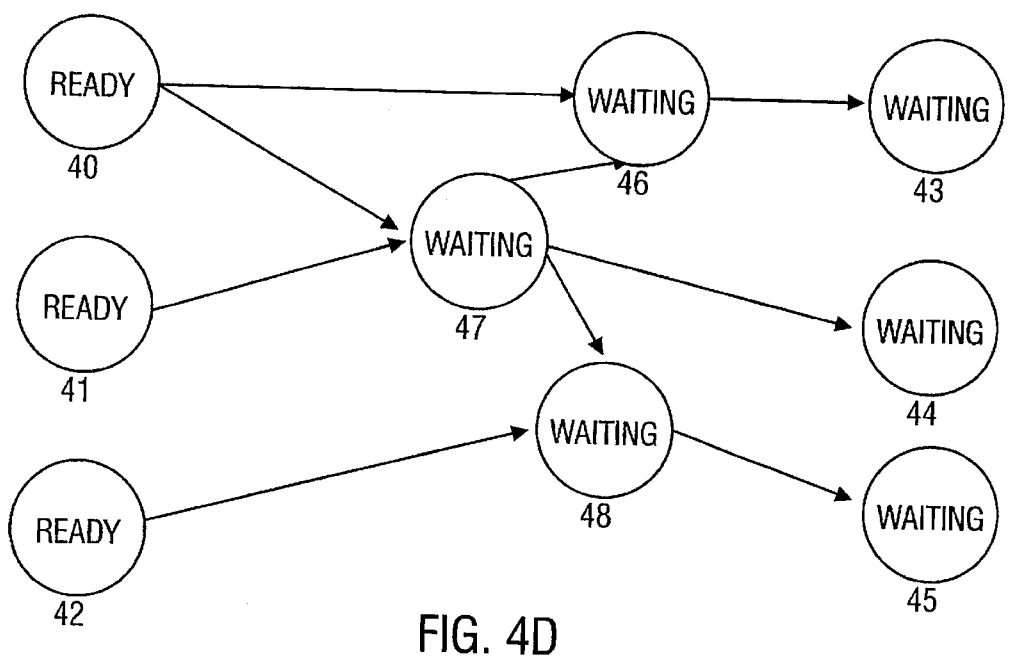
Figure 4E:
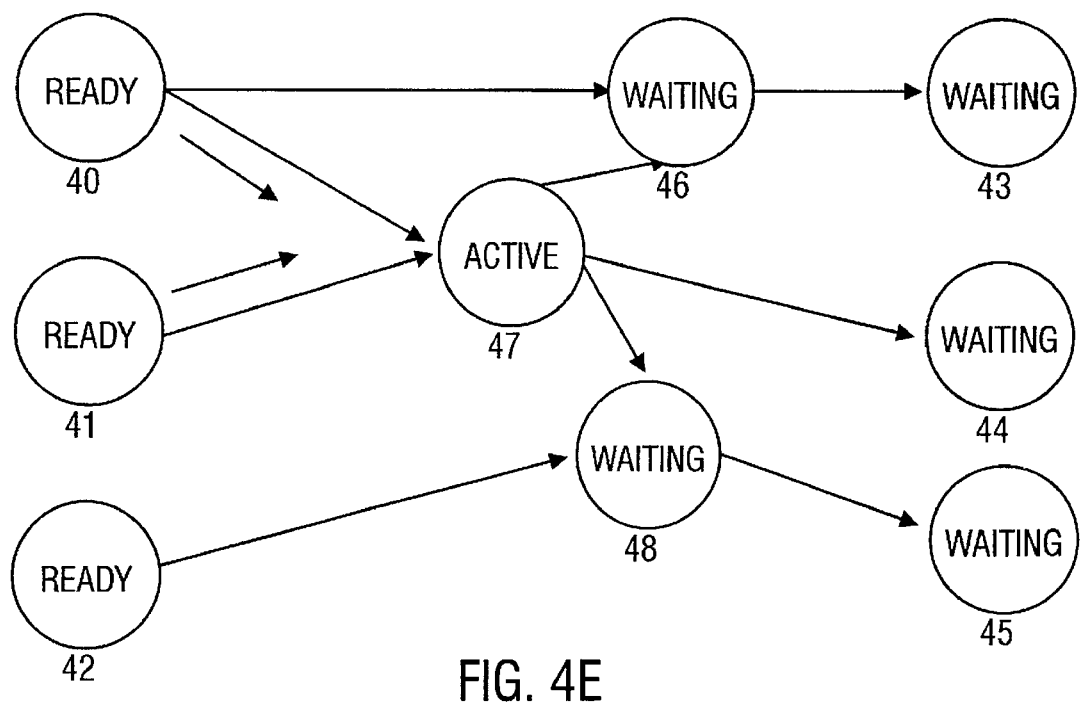
Figure 4F:
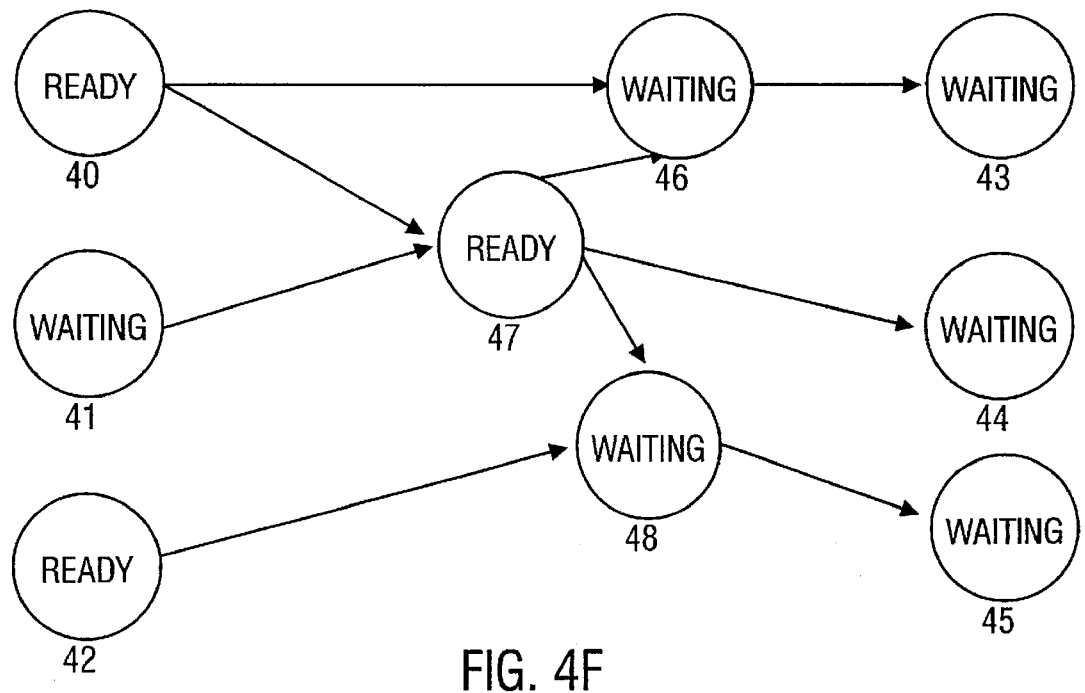
Figure 4G:
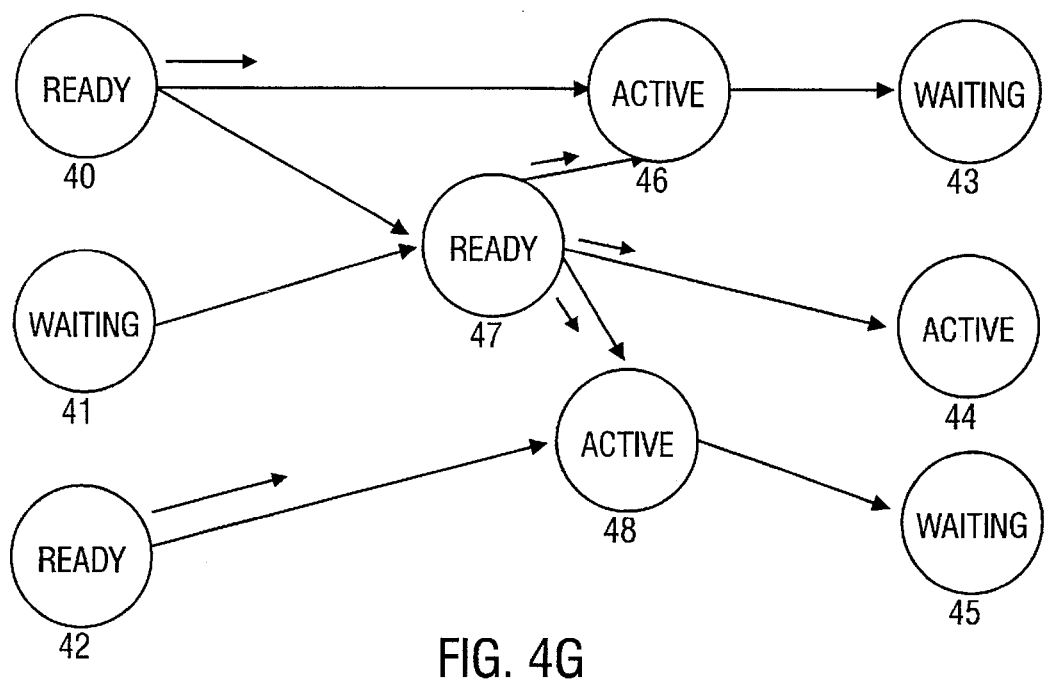
Figure 4H:
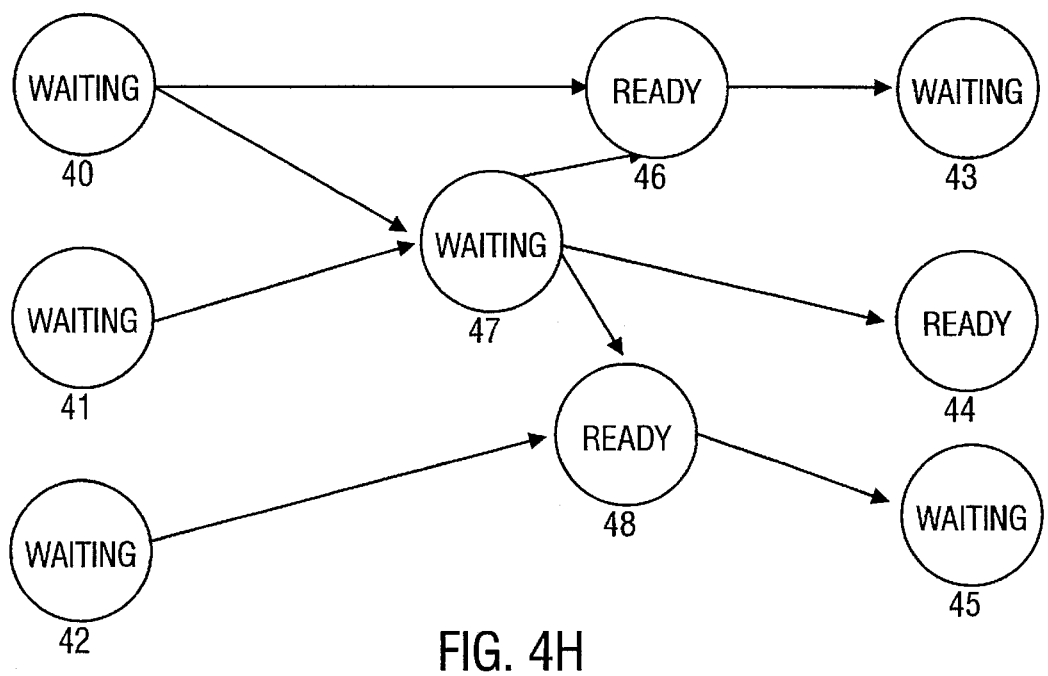
Figure 4I:
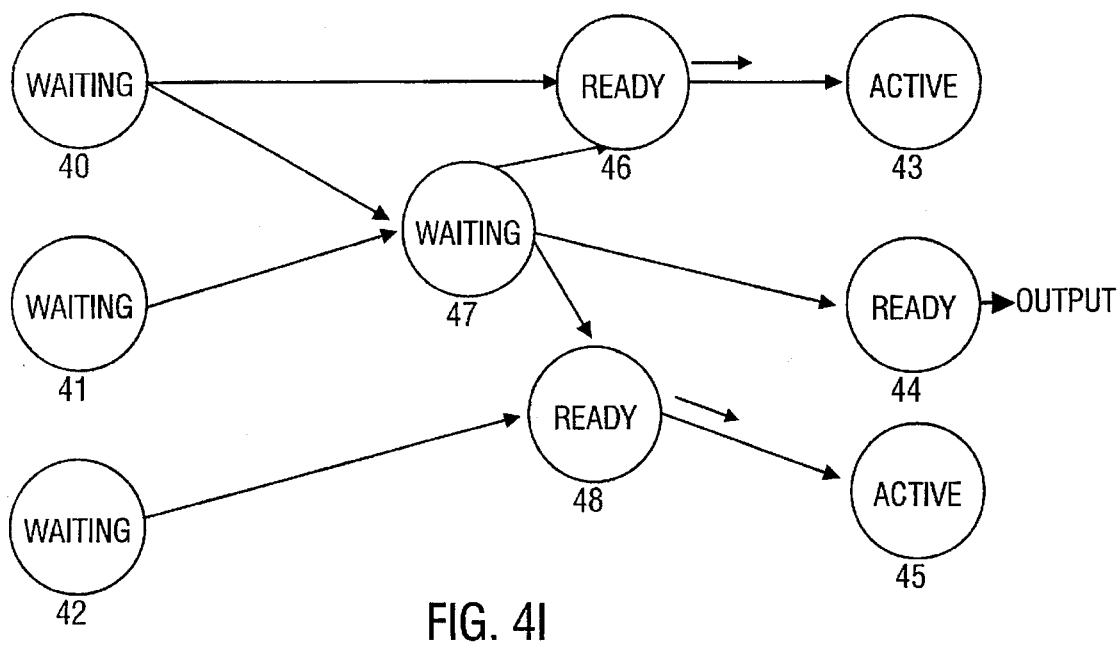
Figure 4J:
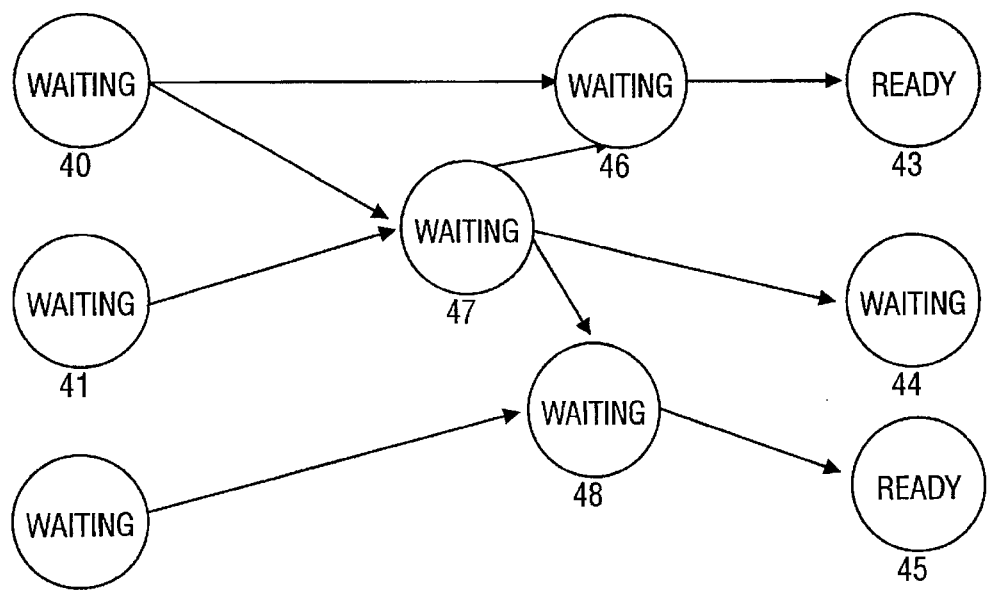
Figure 4K:
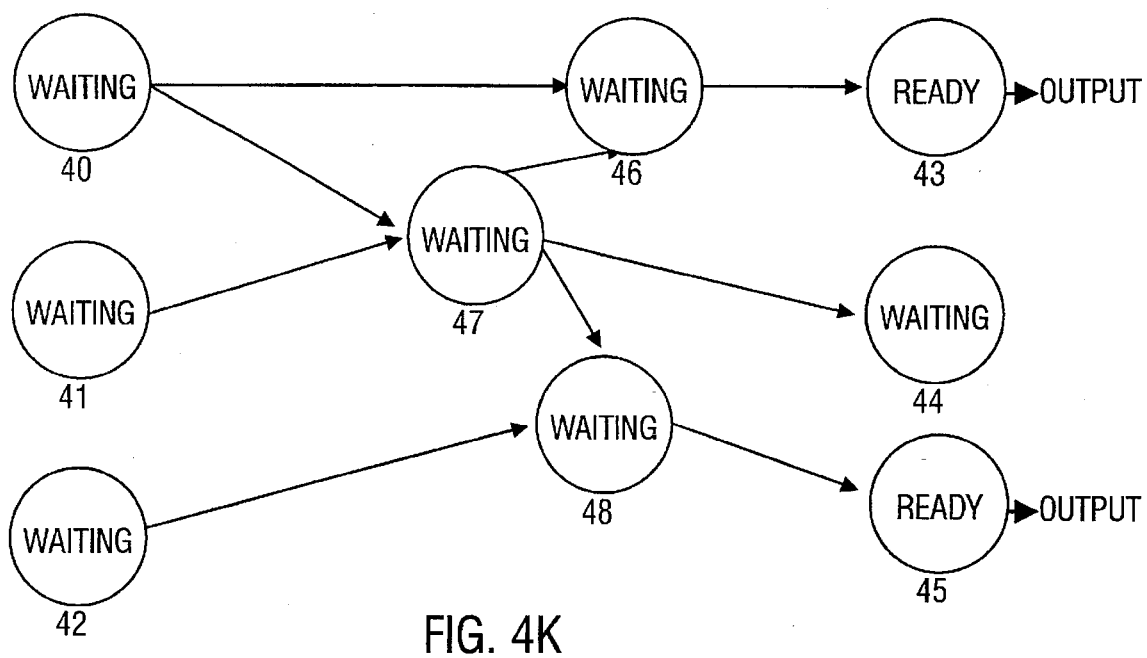
Figure 4L:
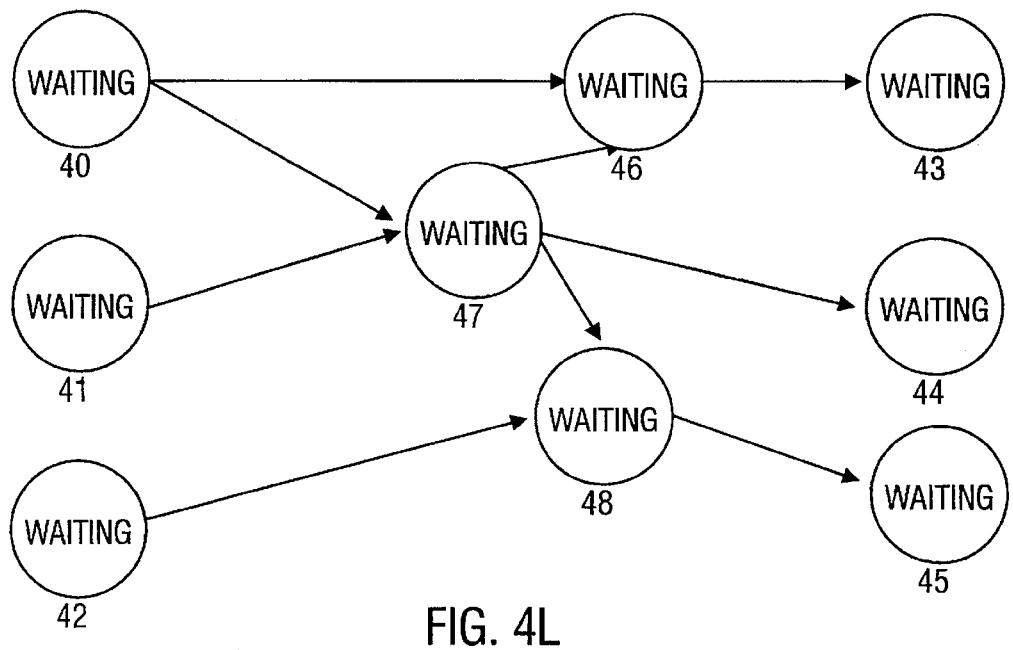

FIG. 3, helps to illustrate the concept of a neural network as used herein. As illustrated, a first ANO 30, and a second ANO 32, are connected to a third ANO 33, through directed edges, 34, 35. As discussed above, the directed edges 34, and 35 indicate that the outputs of ANOs 30, 32 serve as inputs to ANO 33. Additionally, directed edges 34 and 35 are assigned specific weight factors, 36, 37 respectively. As mentioned above, these weight factors indicate the strength of the connection. In this example, the weight factor for directed edge 34 (the connection from ANO 30 to ANO 33) is 0.25 and the weight factor for directed edge 35 is 0.50. As such, the internal value assigned by ANO 33 for ANO 32 will generally be stronger than the value assigned to the signal received from ANO 30.

The weights, internal state, and output value of an ANO of the present invention may be constrained to lie in some subrange. By enumerating the ANOs within a neural network, the states, at a given instant, form a state vector. The process of introducing values on the input lines of a neural network and allowing it to process is called activation, and the state, at a given instant, is called the activation state of the network. The set of possible activation states is called the (activation) state space. Activation dynamics refers to the process of updating activation states over time; this is a dynamical system on the state space. For purposes of this explanation, it may be assumed that weights are held fixed during activation.

In contrast to most prior art neural networks, which are globally clocked, the neural network of the present embodiment is event driven. In essence, the concept of event-driven neural networks distributes the basic control structures among the ANOs. For efficiency of computation in simulations, however, it may be appropriate to bring back a notion of global time in order to take advantage of pipeline or SIMD computational platforms such as the Cray Y-MP/4p or the Thinking Machines CM-2. On the CM-2, however, it is not yet clear whether a global vector approach or the decentralized control concept results in the more efficient implementation. This global clock is for computational efficiency only; it preserves and is subordinate to the event-driven nature of the model.

Generally, the event-driven nature of the neural network of the illustrative embodiment is similar to the concept of data flow computing. In data flow computing, operations are ordered by the interdependencies of the data and the availability of resources rather than being specified totally by the programmer. The data flow approach encompasses computations in which the order of the operations executed is determined either by the availability of or demand for input data.

Activation of a neural network, as viewed here, follows this data flow model. In the "waiting" state, a node simply waits for updated outputs of all of its predecessor nodes (nodes that initiate connections into the given node) to arrive. During the "active" state, the node then takes its inputs and associated weights and computes an internal state with its combining function. Finally, the node enters its "ready" state—it computes its output value with its output function and signals its successor nodes that an output is ready for processing. In this way, activation spreads through the network, directed by the network topology and the flow of data.

FIGS. 4A–4L illustrate the event-driven nature of the present invention. As illustrated, there are three input ANOs, 40 41, 42, and three output ANOs 43, 44, and 45. There are also three intermediary nodes, 46, 47, and 48.

Assume that the inputs are applied to the input nodes in discrete steps with the inputs applied first to ANO 40, then to ANOs 41 and 42. As discussed above, the state of each ANO (or node) will change depending on the availability of data.

FIGS. 4B–4L illustrate the way the activation spreads through the network. Notably the change in state of an ANO from "waiting" to "active" and from "active" to "ready" depends on the states of its preceding ANO's and not on a global time clock.

4.2 Building an Expert Network

One feature of the present invention is the transformation of a typical expert system into an expert network. Through the practice of the present invention, networks that are useful for both inference and knowledge acquisition can be constructed from any rule-based network system in hardware (e.g., discrete logic, VLSI) or software (e.g. by programming a suitable general-purpose processor system). The details of the construction may vary somewhat with the type of expert system, but the general principle is to construct an inference network from the knowledge base and make this network neural by defining node functionality in terms of the inference rules of the expert system. Thus, the initial network topology is determined by the knowledge base and the network dynamics are determined by the inference engine.

A few methods for transforming an expert system into an expert network are known in the art. The following discussion describes a method for constructing an expert network for expert systems similar to the well-known MYCIN, such as systems built under the well-known commercial shell M.1 available from Teknowledge, Inc., Palo Alto, Calif.

A network model can be constructed directly from the rule base of the expert system by taking the elements of C to be vertices and defining a directed edge from a to b of weight cf for each rule a⊢b (cf).

Figure 5:
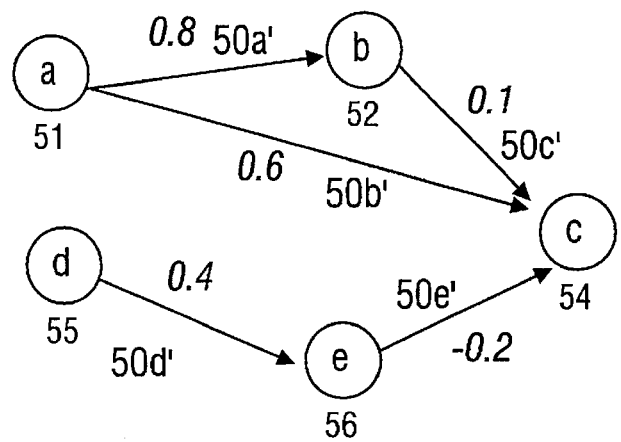
FIG. 5 illustrates the construction of a network model from a rule base.

Such a basic transformation is illustrated in FIG. 5. In FIG. 5, an expert system rule base 50, having 5 rules, 50a, 50b, 50c, 50d, and 50e, is transformed into an expert network having five nodes (or ANOs). The first rule, 50a, is represented by the two nodes 51, 52 and the directed edge 50a'. Notably, the weight factor applied to the directed edge 50a' is identical to the confidence factor of the rule. In a like manner, rules 50b–50e are represented by nodes, 51, 52, 54, 55, and 56 and directed edges 50b', 50c', 50d' and 50e'.

The conversion from an expert system to an expert network is accomplished by using a three-step method. The first step is an optional step wherein the basic rules of logical simplification are used to change the expert system rule base into a simplified expert system. The second step is to transform the rule base (possibly the simplified rule base) into an inference network. Finally, nodes representing complex logical rule antecedents are expanded into subnetworks with atomic input nodes.

It is assumed, in the following discussion, that the given expert system deals with uncertainty through certainty factors as in MYCIN and that the rule base has been optionally transformed to the user's preference. In the following discussion the range of certainty factors are standardized to be between −1 and 1; e.g., $-1 \leq cf \leq 1$, and the range of rule output values is standardized at between 0 and 1; e.g., $0 \leq z \leq 1$.

4.2(a) The First Step—Simplifying the Expert System Rule Base.

The first step in converting an expert system to an expert network through the method of the present invention is an optional step wherein the rule base of the expert system is simplified. In most cases, the expert system rule base is likely to have rather complex compound antecedents and may in some cases have compound consequents. Such complex and compound antecedents are often difficult to implement through the use of ANOs. To overcome this problem, many expert system shells allow substitution of a set of simpler rules for a complex one. Such a substitution may be referred to as a rule base transformation.

Formally, a "rule base transformation" (RBT) is the substitution of one set of rules for another set derived from the first. An RBT is called "valid" if the resulting expert system is functionally identical to the original. Note that validity of an RBT is dependent on the expert system shell, not just the knowledge base, since functionality depends on the inference engine.

Two expert systems may be referred to as being "RBT-equivalent" provided one can be obtained from the other by a finite sequence of valid RBTs. RBT-equivalence is an equivalence relation on the class of expert systems built under a given shell. Generally an RBT is defined by two sets of rule models, either of which may be substituted for the other. Some common examples of RBTs are as follows:

| | Antecedent disjunction law |
|---|---|
| • | $a \vee b \vdash c$ (cf) |
| | $a \vdash c$ (cf) |
| | $b \vdash c$ (cf) |
| • | Antecedent distributive law |
| | $a \wedge (b \vee c) \vdash d$ (cf) |
| | $a \wedge b \vdash d$ (cf) |
| | $a \wedge c \vdash d$ (cf) |
| • | Antecedent DeMorgan law |
| | $-(a \vee b) \vdash c$ (cf) |
| | $-a \wedge b \vdash c$ (cf) |
| • | Consequent conjunction law |
| | $a \vdash b \wedge c$ (cf) |
| | $a \vdash b$ (cf) |
| | $a \vdash c$ (cf) |

These four RBTs are analogous to identities that hold in crisp logic (i.e., logic when values are either ±1 or 0) but do not necessarily hold in a particular expert system shell. The nature of the evidentiary combining function and the way uncertainty is handled by operations may either rule out some of these RBTs or introduce inconsistencies in the way the shell reasons. It is again emphasized that the validity of a particular RBT is a constraint on the entire expert system, not just the rule base, because the functionality of the entire system must be unchanged by the allowed substitutions.

The first three RBTs are valid in M.1-based expert systems, and the fourth is practically valid. The M.1 inference engine cannot handle arbitrary conjunctions in consequents, but for the limited class of consequent conjunctions that are allowed, the consequent conjunction RBT is valid.

This entire discussion can be formalized: If X is an expert systems shell, the "category of expert systems over X" can be defined (analogous to the category of vector spaces over the field F).

Through the practice of the present invention, a network that is useful for both inference and knowledge acquisition can be constructed for any rule-based expert system. The construction is more elegant and canonical in the case of valid RBTs, and thus only that case is discussed herein. From this discussion, it will be apparent to one skilled in the art how these methods can be expanded to include more general concepts of expert systems.

For example, using the method described above, the rule base of an expert system, ES, can be restructured using valid RBTs so that its rule antecedent and consequents are decomposed as far as possible into "atomic assertions." In other words, ES as so restructured is hypothesized as being an indecomposable representative from its RBT-equivalence class.

The advantage of simplifying the expert system rule base is simplification of the network input nodes and greater exposure of network connections to learning. The disadvantage is rule proliferation.

4.2(b) The Second Step—Constructing the Regular Nodes.

Once an expert system rule base has been simplified, the next step is to construct a network model from the simplified rule base.

The first level of network construction in the present invention is built on a convention that each atomic assertion (antecedent or consequent) represents a vertex and each rule a⊢b (cf)

defines a weighted connection

Figure 6:
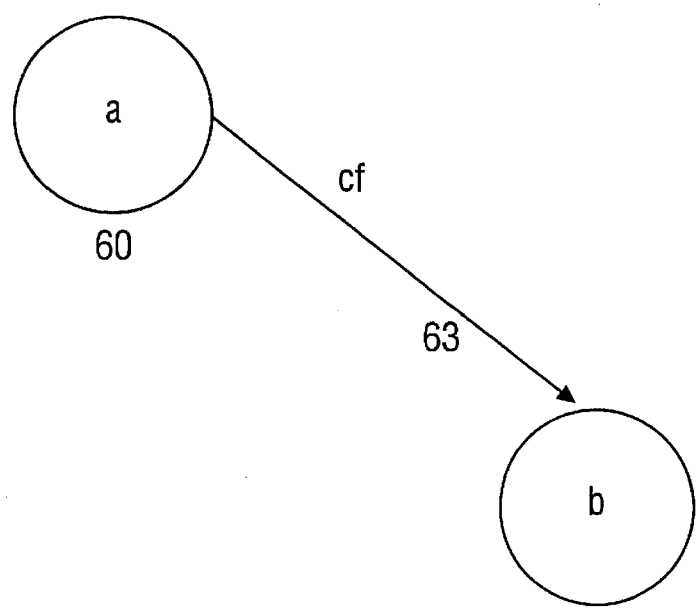
FIG. 6 illustrates the construction of a neural connection from a rule with a certainty factor.

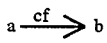

in the network. For example, the expert system rule if a then b (cf) defines a weighted connection a —cf→ b. This transformation is illustrated in FIG. 6 where ANO 60 represents the antecedent a, ANO 61 represents the consequent b, and the weight value of the directed edge 63 represents the confidence factor of the rule. The nodes connected in the expert network constructed through the above method are referred to as regular nodes.

The combining function for a regular node must be based on the evidentiary combining function of the expert system, and the output function for the node is essentially the firing function of the expert system. Thus, the exact processing functionality of regular nodes is dependent on, and a reflection of, the inferential processing defined by the particular expert system shell under consideration. In addition to the relatively simple regular nodes, the neural network of the present invention makes use of more complex nodes.

4.2(c) The Third Step—Constructing the Operation Nodes.

As discussed above, it is often not possible to simplify the rule base of an expert system into a group of rules that may be represented only by regular nodes. For example, through the method described above, expert system rule antecedents consisting of negation or conjunction clauses can be expanded (where an arrow with no designation weight indicates a hard connection) as illustrated by the following examples. The expert system rule: if (not a) then c (cf), generates the two expert network connections: a→NOT(a) and NOT(a)—cf→c in the expert network. The expert system rule If (a and b) then c (cf) generates three connections in the expert network: a→AND(a, b); b→AND(a, b); and (a, b) —cf→c. Further, to implement the unsimplified expert rule: if (a or b) then c (cf), three expert network connections would be required: a→OR(a, b); b→OR(a, b); and OR(a, b) —cf→c. If the expert system rule is simplified, however, only two connections are required: a —cf→c; b—cf→c.

It would be convenient if the reduction of complex antecedents could be as easy as formal logic might suggest. In practice, this process is hampered by the divergence of intuitive and formal concepts of negation. For example, in M.1, negation does not conform to either ordinary (weak) negation or to modal (strong) negation in formal logic. In particular, DeMorgan's laws (e.g., $\neg(A \vee B)$ is equivalent to $\neg a \wedge \neg b$) do not hold, and the ability to reduce complexity becomes stifled immediately upon encountering a conjunction. Thus, such rules cannot be readily represented through the use of regular nodes and both conjunctions and negations must be treated as special logical processors embedded in the network. Representation of such rules is handled in the neural network of the present invention through the use of operation nodes.

"Operation nodes" are necessary to implement certain rules of the expert system that cannot be represented by the regular nodes described above. An operation node is typically used where an antecedent in the expert system is in the form of OP(a1, a2, ... an) where OP is an operator (such as AND or NOT) on the clause (a1, a2 ... an). For example, suppose an antecedent is of the form $OP(a_1, \ldots, a_n)$ where OP is an operator (such as AND or NOT) on the clauses $a_1, \ldots, a_n$. In the present invention, an OP node is used to intervene between $a_1, \ldots, a_n$ and the consequent of the rule. Thus the rule $OP(a_1, \ldots, a_n)\vdash b$ (cf)

expands to the n+1 network components $a_i \xrightarrow{1} OP(a_1, \ldots, a_n)$ $OP(a_1, \ldots, a_n) \xrightarrow{cf} b$ where i=1, ... ,n.

Weights of connections incoming to OP-nodes are defined to be unity and are referred to as "hard" weights to indicate that they are a fixed or "hard-wired" part of the architecture. All other weights are called "soft" even when they happen to have the value one. Soft weights have the potential for modification during learning. Weights that have one of the values ±1 are called "crisp." Thus, all hard weights are crisp but soft weights may be crisp or non-crisp. Depending on the application, it may or may not be desirable to allow soft crisp weights to be modified during learning. An arrow with no designated weight is understood to be hard.

Using the principle of the present invention, antecedents consisting of conjunctions or negations of clauses can be expanded:

a∧b⊢c (cf)

generates the three connections a→AND(a,b)

b→AND(a,b)

$AND(a,b) \xrightarrow{cf} c$ and

¬a⊢c (cf)

generates the two connections a→NOT(a)

NOT(a) $\xrightarrow{cf}$ c.

One final comment on OP-nodes: although several examples of a given type may be generated by this network construction, distinguished here by the labels indicating the input clauses, all OP-nodes of a given operation type have the same processing functions, differing only in that they may have different numbers of incoming edges. This is illustrated in FIG. 7.

FIG. 7 illustrates a simple neural network 70 designed to implement the rule base of the expert system 71. As illustrated, there are five regular nodes, 72r, and two operation nodes, 74and, and 74not. Notably the weights of the connections in the operation nodes are all 1 or hard. Additional discussion about the internal functions of the regular and operations nodes in set out below.

4.2(d) Making the Expert Network Neural—Defining the Neural Object Structures.

The above sections have described how to generate a network from an expert system. In order to consider the network neural, one must define a neural object structure for the vertices. Through the practice of the present invention, control structures are created to support both forward and backward chaining as well as some learning mechanism. The combining and output functions are then constructed to complete the specification of the ANOs.

In order to be a functional neural object, each of the nodes in the present invention should have a combining function and an output function. These combining functions and output functions are highly dependent on the inferential dynamics of the expert system. The following discussion describes how the present invention may be practiced for an expert system built under the M.1 shell, which is a commercial shell similar to the successful MYCIN medical diagnosis system. Although it is envisioned that the present invention can be practiced on other shells, in the following discussion a shell abstracted from MYCIN is referred to as EMYCIN.

As discussed above, there are at least two types of nodes that can be constructed through the practice of the present invention: regular nodes and operation nodes. For the purposes of this discussion the operations nodes are further sub-divided into two subsets: conjunction nodes and negation nodes. As such, there are really three types of nodes that can be constructed through the practice of the present invention.

As further discussed above, each node has a neural object structure essentially comprising the weight vector of the neuron; a combining function F that determines an internal state y=F(x,w) from the input and weight vectors; and an output function f that determines a single output value (sometimes called activation value) z=f(y) from the internal state. The neural object structure for each node-type is discussed below.

Regular Nodes: For a regular node N, the values x1, x2, ..., xn are defined to be the output values of the various nodes initiating connections to N and wi is defined as the weight of the incoming connector. P is defined to be the set of indices of positive weight, i.e., P={i|wi>0} and N is defined to be the set of indices with negative weight. Then two pre-internal states y+ and y− may be calculated as:

$$y_j^+ = 1 - \prod_{i \in P_j} (1 - x_i w_{j,i})$$

$$y_j^- = -1 + \prod_{i \in N_j} (1 + x_i w_{j,i})$$

The EMYCIN/M.1 combining function for a regular node in the expert network of the present invention may be calculated as follows:

$$F_R(x_1, \ldots, x_n, w_{j,1}, \ldots, w_{j,n}) = \frac{y_j^+ + y_j^-}{1 - \min\{|y_j^+|, |y_j^-|\}}$$

when the divisor is non-zero. In the exceptional case when the divisor is zero, the divisor is defined to be unity. y=F$_r$(x, w) is the internal state for a regular node.

The output function for a regular node of the present invention is defined as:

$$fR(y) = \begin{cases} 0, & \text{if } y < 0.2; \\ y, & \text{otherwise.} \end{cases}$$

With the output value defined by the equation:

$$z_j = fR(y_j)$$

Conjunction Nodes: In addition to regular nodes, the expert network of the present invention supports conjunction-type operation nodes. The combining function for a conjunction node is the minimum operator. In other words, the internal state of a conjunction node is the minimum value of all its incoming signals. As suggested above, when discussing operation nodes, the weights on all input signals into a conjunction node are hard.

The output function for a conjunction node is the same as that for a regular node.

Negation Node: The third type of node in the expert network of the present invention is a negation node. A negation node has only one input (again, with a hard weight) and its internal state is the same as its input value. The output function for a negation node is given by:

$$fN(y) = \begin{cases} 1, & \text{if } y < 0.2; \\ 0, & \text{otherwise.} \end{cases}$$

By following the network construction method discussed above recursively, it is possible to represent each atomic clause in an antecedent of rule in the rule base of the expert system as a node in the expert network.

4.2(e) Example: The 4-2-4 Problem.

The following example illustrates how an expert system rule base may be converted to an expert network through the practice of the above described method. Assume that there is an expert system that has a rule base defined by the following rules:

M.1 Rule Base
Solving the 4-2-4 Encoder/Decoder Problem

| | | | |
|---|---|---|---|
| $a_1$ | then | $b_1$ | (−1) |
| $a_2$ or $a_4$ | then | $b_2$ | (+1) |
| $a_3$ or $a_4$ | then | $b_1$ | (+1) |
| (not $b_1$) and (not $b_2$) | then | $c_1$ | (+1) |
| (not $b_1$) and $b_2$ | then | $c_2$ | (+1) |

-continued

M.1 Rule Base
Solving the 4-2-4 Encoder/Decoder Problem

| $b_1$ and (not $b_2$) | then | $c_3$ | (+1) |
| $b_1$ and $b_2$ | then | $c_4$ | (+1) |

The rules address a problem wherein four inputs (antecedents) are received: $a_1$ $a_2$ $a_3$ $a_4$ and they produce any one or more of four consequences: $c_1$ $c_2$ $c_3$ $c_4$. These antecedents and consequences are used here for illustrative purposes only, although the antecedents in a true expert system will probably relate to real-word input signals (e.g., brakes squeak, tires balding, engine knocks, and alignment left) and the consequences to real-word solutions (e.g., replace brake pads, change tires, change oil, and align wheels). The intermediary assertions $b_1$ and $b_2$ are necessary to implement expert rules that are necessary to reach the final solution.

Following the above-described method, this rule base may be expressed in terms of node connections as follows:

$a_1 \rightarrow 1_{b1}$
$a_2 \rightarrow b_2$
$a_4 \rightarrow b_2$
$a_3 \rightarrow b_1$
$a_4 \rightarrow b_1$
$b_1 \rightarrow \text{NOT}(b_1)$
$b_2 \rightarrow \text{NOT}(b_2)$
$\text{NOT}(b_1) \rightarrow \text{AND}(\text{NOT}(b_1), \text{NOT}(b_2))$
$\text{NOT}(b_2) \rightarrow \text{AND}(\text{NOT}(b_1), \text{NOT}(b_2))$
$\text{AND}(\text{NOT}(b_1), \text{NOT}(b_2)) \rightarrow c_1$
$\text{NOT}(b_1) \rightarrow \text{AND}(\text{NOT}(b_1), b_2)$
$b_2 \rightarrow \text{AND}(\text{NOT}(b_1), b_2)$
$\text{AND}(\text{NOT}(b_1), b_2) \rightarrow c_2$
$\text{NOT}(b_2) \rightarrow \text{AND}(b_1, \text{NOT}(b_2))$
$b_1 \rightarrow \text{AND}(b_1, \text{NOT}(b_2))$
$\text{AND}(b_1, \text{NOT}(b_2)) \rightarrow c_3$
$b_1 \rightarrow \text{AND}(b_1, b_2)$
$b_2 \rightarrow \text{AND}(b_1, b_2)$
$\text{AND}(b_1, b_2) \rightarrow c_4$ These connections may be expressed as an expert neural network where circled squares denote NOT nodes (negation notes) and double circles represent AND nodes (conjunction nodes). This is seen in FIG. 8. As FIG. 8 illustrates, there are sixteen nodes and nineteen weighted connections. Again, the weight of the connections leading onto the operation nodes are all hard.

4.3 Event-Driven Backpropagation

As discussed above, the useful and popular backpropagation learning method was designed for feed-forward systems of analog perceptrons and is usually implemented with the assistance of a layer structure that helps in process control. The expert network of the illustrative embodiment, however, is acyclic; there is no feed-forward requirement. Additionally, the expert network of the present invention is event-driven and the control and keeping of time is performed locally by ANOs. As such, in the expert network of the present invention there is no need to reference layer structures.

Because the illustrative expert network is oriented towards local objects (e.g., ANOs), the following discussion is directed only to how activation values are computed and passed forward, how error is propagated backward, and how weight corrective steps are made with respect to a single node. The acyclicity of the network guarantees stability of both forward activation and backward propagation. In the following discussion nodes with only out-connections are referred to as "input nodes"; nodes with only input connections are referred to as "output nodes"; and nodes with both in-and out-connections are referred to as "interior nodes."

The forward activation of the neural network of the present invention is discussed in §4.1 above. The backward error propagation phase essentially reverses the forward activation process discussed in §4.1.

First, an error value is computed for each output node by a comparison of its activation value with an ideal value. Then the error is propagated backward in data-flow fashion. The node N waits until all its immediate successor nodes have computed an error value, then assigns the weighted sum of these error values to itself and passes this value back to the immediate predecessor nodes. This process assigns an error value to each node in the network.

The second step is to calculate the gradient of square error. An ideal output I is assumed for each output node and defined for each non-output node. Thus, for a given node N, the error e may be defined as the difference between the ideal output and the actual output for the node; e.g., $e = I - z$. A square error function, E, may be defined for each node such that $E = e^2$. Through the chain rule it can be established that:

$$\frac{\partial E}{\partial w_i} = \frac{\partial E}{\partial e} \frac{\partial e}{\partial z} \frac{\partial z}{\partial y} \frac{\partial y}{\partial w_i}$$
$$= [2e][-1][f'(y)]\left[-\frac{\partial F}{\partial w_i}\right]$$
$$= -2e \frac{\partial F}{\partial w_i} f'(y)$$

Expressing this result in terms of gradients gives:

$-\nabla E = 2ef'(y)\nabla F.$

The negative of the gradient of the square error points in the direction of the steepest descent or fastest square error decrease.

A node N is referred to as an analog perceptron if $F(x, w) = w \cdot x$ and $f(y) = \tanh(\lambda y - t)$ (i.e., if the combining function is the combined sum of the weights (w) times the inputs (x) and the outputs f(y) is a sigmoidal squashing function). As discussed above, the expert network for the present invention includes ANOs other than perceptrons.

4.3(a) Backpropagation in an Expert Network (ESBP).

Returning to the expert network derived from an expert system, the present invention allows implementation of backpropagation learning on such an expert network.

In order to implement backpropagation learning on the expert network of the present invention, it is necessary to assume that the expert system rule base from which the expert network is derived has no circular inference chains and is thus acyclic. This assumption is a reasonable one given the almost complete lack of circular inference chains in expert systems.

The implementation of backpropagation in the illustrative expert network differs from prior art implementations of backpropagation in at least two respects. First, in the illustrative expert network the weight factors are constrained. The weight space of a node in the expert network of the present invention is a hypercube, not an open subset of space, due to the constraint that weights must lie in the range of [-1, 1]. Second, in the illustrative expert network the combining functions are complex and different from those used with prior art perceptrons.

As discussed above, both "hard" and "soft" weights are defined. A hard weight is one that is fixed as part of the architecture and does not change. Thus, to properly implement the expert network of the present invention, it is necessary to disable learning, i.e., prevent the weight from changing, at connections with hard weights while relating backpropagation of error through these connections.

As further discussed above, soft weights with a value of +/−1 are referred to as crisp. It some situations it may be desirable to disable learning at connections with a soft weight of +/−1, because they represent absolute certainty on the part of a human expert. There is little practical difference between a soft weight of 1 and a weight of 0.99 so there should be no practical loss of learning with this restriction. In other cases, however, it may be advantageous to allow crisp soft weights to change because the connectivity of the weight space (a hypercube) may allow a pathway to change that is not available in the crisp world (the vertices of the hypercube). In other words, it may be beneficial to allow crisp soft weights to vary from +/−1 so that all possible weights (knowledge states) may be explored during learning. This later possibility exists even when the goal system would have a crisp weight.

Because there are two alternatives, the following discussion describes two different cases. In the first, crisp weights are constant and never change, and in the second a soft crisp weight is allowed to change provided the direction of change keeps the weight in bounds.

During learning it is desirable to take a corrective step in weight space changing the current weight vector into a new weight vector such that:

$$W^{new} = W + \Delta W$$

subject to the following constraints:
1. The step is in the direction of steepest descent of the square error surface, i.e., $\Delta W$ is a positive scalar multiple of the negative gradient of E.
2. The step size does not exceed the step size parameter $\beta$, i.e., $\|\Delta W\| \leq \beta$.
3. The new weight vector lies within the weight space hypercube, i.e., $|w_i^{new}| \leq 1$ for $i = 1 \ldots n$.

In the first case (crisp weights do not change) a trial weight change is computed over the non-crisp weights only according to the formula $$\Delta w^{norm} = -\frac{\nabla E}{\|\nabla E\|}$$

and a new trial weight vector is computed according the formula:

$$w^{trial} = w + \Delta w^{trial}$$

To guarantee that all three of the conditions are simultaneously met, the components of $w^{trial}$ are tested to determine if they lie within the range (−1, 1). If not $w^{trial}$ is multiplied by a scalar shrinking factor, $\omega$, and the test is repeated. Eventually, after testing, multiplying by $\omega$, and retesting, a $w^{trial}$ will be found that meets all three conditions. The resultant $w^{trial}$ is the step $\Delta w$.

For the second case (crisp weights allowed to change) the procedure is essentially that as discussed above except a weight change is made at a soft crisp weight $w_i$ whenever $w_i \Delta w_i < 0$. The range check is relaxed to the closed interval [−1, 1].

To properly implement the method discussed above the self adjusting step-size, $\beta$, should be selected be a value greater than 0, and the shrinking constant, $\sigma$, should be selected to lie in the range $0 < \sigma < 1$.

In an alternate embodiment of the invention, the scalar shrinking factor is not used to deal with the hypercube constraint. In this embodiment, the constraint is initially ignored and the final weight state is calculated. If the final weight state is within the hypercube then there is no problem. If, however, the final weight state is out-of-bounds, then a steepness function is added to the square error to force minimization to occur within the hypercube. This, of course, will require calculation of the new gradient.

4.3(b) Calculation of the Gradient.

The particular gradient calculations are of course dependent on the particular combining and output functions at a node; these in turn depend on the inferential dynamics of the expert system under study. The following discussion explains how to take the gradient for an expert system built under EMYCIN shells and, in particular, under the shell M.1.

As discussed above the basic method for determining the gradient is to calculate the values expressed by the equation:

$$\nabla E = 2lf'(y) \nabla F$$

After the above discussion, the only information now lacking to complete the gradient equation is the derivatives appearing in the above equation. For the M.1 shell, these have been calculated as follows:

$$\frac{\partial F_R}{\partial w_i} = \begin{cases} \frac{x_i}{1 + x_i w_i} \cdot \frac{1 + y^+}{1 - y^-}, & \text{if } y^+ \leq |y^-| \text{ and } i \in N; \\ \frac{x_i}{1 - x_i w_i} \cdot \frac{1 + y^+}{1 - y^-}, & \text{if } y^+ \leq |y^-| \text{ and } i \in P; \\ \frac{x_i}{1 + x_i w_i} \cdot \frac{1 + y^-}{1 - y^+}, & \text{if } y^+ \leq |y^-| \text{ and } i \in N; \\ \frac{x_i}{1 - x_i w_i} \cdot \frac{1 + y^-}{1 - y^+}, & \text{if } y^+ \leq |y^-| \text{ and } i \in P. \end{cases}$$

$$fR(y) = \begin{cases} 0, & \text{if } y < 0.2; \\ 1, & \text{otherwise} \end{cases}$$

Putting all this information together, with the methods discussed above and the two cases (crisp weights allowed to change, crisp weights held constant) it is possible to develop a method for calculating the new trial weight vectors.

A Makefile and C code modules for implementing Expert System Backpropagation Learning for an M.1 expert system according to the present invention are attached as Appendix I.

4.4 Node Error Assignment—Influence Factors

One embodiment of the present invention differs from that described above in that it does not implement traditional backpropagation learning but makes use of a new method using influence factors to improve the learning of the expert network.

A critical step in backprop, and other supervised learning methods, is the assignment of nominal error values to nodes. Any notion of "correction" of synaptic functionality is explicitly or implicitly based on the concept of error at a node—the very term implies that there is a better setting of synapses and that it can be determined, or at least in which direction, this better setting may be found. Traditional backprop binds the processes of synaptic correction and node error assignment together. For expert networks, it is more convenient to separate these processes into distinct tasks that may be invoked at different times and under different circumstances.

In one method in accordance with the present invention it is assumed, given an acyclic artificial neural network and a pool of data of the form $(\xi^v, \Gamma^v), v = 1, 2, 3, \ldots$, that the goal is to duplicate, or at least approximate the mapping $(\xi^v, \Gamma^v)$ with the neural network. Thus $\xi$ is a vector appropriate for initializing the network and I is a vector of the type read from the output nodes of the net. The data could be samples from some vector-valued mapping, measurement or experimental data, pattern classifications, or, in the case of expert networks, correct inferences obtained either from human reasoning records or an expert system whose inferential dynamics we would like to duplicate. The problem is to activate the network on $\xi$, compare the computed output $\zeta$ with the ideal output I, and assign error to each node on the network.

As discussed above, the general idea behind traditional backprop is to compute error exactly at each output node, where error is unambiguously defined, and to "back-propagate" these error values throughout the rest of the network. Thus at output nodes, error is assigned using $$e_j = I_j - \zeta_j.$$

For non-output nodes, error is assigned in terms of successor node error using $$e_j = \sum_k \epsilon_{jk} e_k$$

where $\epsilon_{jk}$ is an error distribution weight whose nature is discussed below.

Before discussing the nature of the $\epsilon$'s, consider the dynamics implied by the above equation. These assignments determine a backward assignment process that is a kind of reverse-direction activation. In fact, one can define reverse functionality at each node and each connection in such a way that activation of the resulting network is given precisely by the above equation: The reverse synapses are linear, the reverse combining function is the sum, and the reverse firing function is the identity. It follows that backpropagation using the above equation is a nilpotent activation process. After initialization using equation $e_j = I_j - \zeta_j$, the terminal state of this reverse activation gives the error assignments to the nodes in the network.

The question of how to assign the error distribution weights $\epsilon_{jk}$ deserves some thought and discussion. For ordinary analog perceptrons the concept of blame suffices. Think for a moment of node k as a committee: its presynaptic inputs are committee members' opinions, the incoming synaptic weight is the members' voting strength, node output represents a committee decision. If the decision is wrong, who is to blame? One answer is to distribute blame among members according to their voting strength. This analogy results in setting the error distribution weight equal to the synaptic strength. Substituting the synaptic weight $\omega_{jk}$ for $\epsilon_{jk}$ in assignment in the equation gives $$e_j = \sum_k \omega_{jk} e_k$$

which, when substituted for $e_j$ in the gradient of square error, gives one of the formulae commonly used for backprop in the case of analog perceptrons.

This method may be used to assign error for expert networks. Results of computational experiments have shown that this method works very well for EMYCIN networks where node successor subnets are regular and suffices as long as negations are avoided.

In the general case, however, a more subtle approach may be used. Returning again to the committee analogy, suppose for example that each person on the committee has the same empowerment (equal synaptic strengths) but that it is known in a given decision, that one member of the committee has great influence on the decision while another member has little influence. These two members can be equally blamed, but where should effort be concentrated in order to affect the committee decision? Clearly, a change in committee output will be most easily made by changing the opinion of the member with the largest influence.

Thus the question is, how does a change in presynaptic input affect a change in node output? Put this way, the answer becomes clear in hindsight: the problem may be solved by defining the influence factor of the jk connection to be the derivative of output of node k with respect to its j-th presynaptic input (which is the output of node j):

$$\epsilon_{jk} = \frac{\partial z_k}{\partial z_j}$$

evaluated at the current terminal state (i.e., using the current weight state of each node) of the network. Note this influence factor is dependent on the activation state of the network as well as the various functionalities of the network. Expanding the above equation with the chain rule, the following equation is obtained:

$$\epsilon_{jk} = \phi'_k(Y_k) \times \frac{\partial \Gamma_k}{\partial x_{jk}}(x_{1k}, \ldots, x_{nk}) \times \sigma'_{jk}(z_j).$$

Here $\phi'_k$ is evaluated at the current internal state of node k, $\partial \Gamma_k / \partial \chi_{jk}$ is evaluated at the current input vector for node k, and $\sigma'_{jk}$ is evaluated at the current output for node j. Thus, assuming the derivatives are known, the previous equation can be used to calculate an influence factor for each connection during a forward terminal activation of the network. Then the equations $$e_j = I_j - \zeta_j \text{ and}$$

$$e_j = \sum_k \epsilon_{jk} e_k$$

can be used to assign error throughout the net during a reverse activation.

This method of defining error distribution weights again reduces to the usual backprop method for perceptrons. In that case, $\partial \Gamma_k / \partial \chi_{jk} = 1$ and $\sigma'_{jk} = \omega_{jk}$, both constant with respect activation values. The factor $\phi'_k(y_k)$ appears here as part of influence instead of as part of the gradient. In any case, this factor does not affect the direction of change but only the stepsize.

For a more enlightening example, suppose j is an AND node with combining function given by the minimum operator: $\Gamma_k(\chi_{1k}, \ldots, \chi_{nk}) = \min\{\chi_{1k}, \ldots, \chi_{nk}\}$. To influence the output of this node it will do little if any good to effect a change in an input value that is significantly larger than the minimum. Only a change in the variable with the smallest value will change the output. This is reflected in the derivative calculation:

$$\frac{\partial \Gamma_k}{\partial x_{jk}} = \begin{cases} 1, & \text{if } x_{jk} = \min\{x_{ik}\} \\ 0, & \text{otherwise} \end{cases}$$

(where k is fixed). Thus the AND node should assign error backward through node k acting as an influence-switch demultiplexer.

Implementation of error assignment in an acyclic neural network, a key step in backprop and other supervised learning methods, requires that the three derivatives appearing as factors in $$\epsilon_{jk} = \phi'_k(Y_k) \times \frac{\partial \Gamma_k}{\partial x_{jk}} (x_{1k}, \ldots, x_{nk}) \times \sigma'_{jk}(z_j).$$

be known or calculated. Seldom is this a problem, but in some cases the middle partial derivative factor may give difficulty. In particular, the EMYCIN combining function given previously is a bit unwieldy. Fortunately that partial has been calculated and is given by $$\frac{\partial \Gamma_j}{\partial x_{ij}} (x_{1j}, \ldots, x_{nj}) = \begin{cases} \frac{1}{1-x_{ij}} \frac{1-y_j^+}{1+y_j^-}, & \text{if } y_j^+ \geq |y_j^-| \text{ and } x_{ij} > 0; \\ \frac{1}{1-x_{ij}} \frac{1+y_j^-}{1-y_j^+}, & \text{if } y_j^+ < |y_j^-| \text{ and } x_{ij} > 0; \\ \frac{1}{1+x_{ij}} \frac{1-y_j^+}{1+y_j^-}, & \text{if } y_j^+ \geq |y_j^-| \text{ and } x_{ij} < 0; \\ \frac{1}{1+x_{ij}} \frac{1+y_j^-}{1-y_j^+}, & \text{if } y_j^+ < |y_j^-| \text{ and } x_{ij} < 0. \end{cases}$$

Note that when $y_j^+ = -y_j^-$ or when a given input passes through zero, the formulae in the four cases of the above equation give equal values, so the partial derivative given by the above equation is continuous, a fact that is important for gradient descent learning. In some other cases the derivatives of expert network functions are discontinuous on a set of measure zero. Computational experiments have uncovered no particular difficulties created by these discontinuities for backward error assignment.

In contrast, the M.1 NOT node output function, is particularly unsuited for these techniques. Note that its derivative is zero! Thus strict use of $$\epsilon_{jk} = \phi'_k(Y_k) \times \frac{\partial \Gamma_k}{\partial x_{jk}} (x_{1k}, \ldots, x_{nk}) \times \sigma'_{jk}(z_j).$$

would simply block reverse error assignment at a NOT node. In cases like this there are two alternatives. The first is to define a "pseudo-derivative" that reflects the kind of behavior we feel the node should have and use that in place of the derivative in the previous equation. In case of an M.1 NOT node, one can use $\phi'_j = -1$.

An alternate solution is to redefine EMYCIN so that its firing functions are smooth squashing functions instead of the threshold functions in use today. In particular, the NOT firing function is a reverse squashing function. The result is a system that inferences like EMYCIN but is much more suited to automated knowledge refinement.

The same general backpropagation procedure discussed above, with "influence" used to assign error, may be used to give a supervised learning method for an acyclic neural network. For expert nets this type of learning is referred to as ENBP, for expert network backprop.

4.5 Expert Network Backpropagation

The implementation of backpropagation in an expert network may be accomplished according to the present invention as follows.

Assume given an acyclic neural network with linear synapses and a training example $\xi \rightarrow I$. Then use the influence factors discussed above to assign error to each node in the network. Let total square error $E = \Sigma_j e_j^2$. Suppose that node j has been designated for training. Denote the vector of synaptic weights on connections incoming to j by $w_j = (\omega_{1j}, \ldots, \omega_{nj})$.

The gradient $\nabla E$ of E with respect to $w_j$ is the vector of partials $$\frac{\partial E}{\partial \omega_{ij}} = 2e_j \frac{\partial e_j}{\partial z_j} \frac{\partial z_j}{\partial y_j} \frac{\partial y_j}{\partial x_{ij}} \frac{\partial x_{ij}}{\partial \omega_{ij}}$$

$$= -2e_j \phi'_j(y_j) \frac{\partial \Gamma_j}{\partial x_{ij}} (x_{1j}, \ldots, x_{nj}) z_i.$$

Thus a step (with "learning rate" $\eta$ and "momentum" in the direction of $-\nabla E$ is given by $$\Delta \omega_{ij} = \eta e_j \phi'_j(y_j) \frac{\partial \Gamma_j}{\partial x_{ij}} (x_{1j}, \ldots, x_{nj}) z_i + \mu \Delta \omega_{ij}^{prev}$$

Iterations using the above four equations define backprop in any acyclic neural net and allow learning to occur at a select subset of nodes.

Now assume an EMYCIN expert network. To deal with the hypercube weight space, the shrink-and-test loop described above in regard to traditional backpropagation may be used to prevent out-of-bounds weight changes. This method, as used in ENBP, is briefly set out below:

1. Present the network with f and calculate the rest state and the output f, also calculate the influence factor for each node during this forward pass.
2. Using the ideal output value I and the calculated influence factors, calculate an error value $e_j$ for each node during a backward pass.
3. For each node j with soft incoming connections:
   3.1 For each i compute a trial weight change using the formula for $\Delta \omega_{ij}$ given above.
   3.2 Let $w_j^{trial} := w_j + \Delta w_j^{trial}$
   3.3 If $w_j^{trial}$ is not in the weight space hypercube, shrink $\Delta w_j^{trial}$ by a constant factor and go to step 3.2
   3.4 Set $$w_j^{new} := w_j^{trial}$$

4. If total error is not acceptably small go to 1.

Of course, multiple training examples will be used in practice, and either on-line or off-line (batch) versions can be defined. The shrink/retest loop is not necessary if weight ranges are unrestricted.

On a higher level, the method for introducing the learning process of the present invention may be summarized as follows:

1. Construct Expert Network
   1.1 Apply rule-base transformation [as desired] to expand rule base and simplify rule. See Section 4.2(a).
   1.2 Create first-order network consisting of regular nodes and connections only; weights on these connections are from rule certainty factors. See Section 4.2(b).
   1.3 Create second-order network consisting of regular and OP nodes and connections; regular nodes representing complex assertions are expanded into sub-networks simple regular nodes and OP nodes; new connections created are into the OP nodes and have weight. See Section 4.2(c).
2. Reduce relative error below 10% using alternate learning method, e.g. Goal Directed Monte Carlo learning. See Section 4.6(a).
3. Reduce relative error below 0.1% using ESBP (or ENBP, if OP nodes are present). See Section 4.5.
4. Modify rule base; replace each certainty factor in the expanded rule base with the corresponding weight in the expert network.

FIG. 10 illustrates the above process.

As noted above, a Pascal program for performing goal directed monte carlo learning (Step 2) is attached as Appendix II and a C program for performing expert system backpropagation learning (Step 3) is attached as Appendix I. A pascal program for translating an expert system rule base to an artificial neural network (Step 1) is attached as Appendix III.

4.6 Alternate Learning Methods

It is possible that a particular expert system rule base does not have the no-cycles property or that for some other reason, such as insurmountable difficulty in obtaining closed form calculations of the derivatives to find the gradient, that the ESBP algorithms are inappropriate for an expert network. There are alternatives that seem promising.

4.6(a) Goal Directed Monte Carlo Learning

Reinforcement learning may generally be a good technique. One reinforcement learning method, called Goal-Directed Monte Carlo learning (GDMC) that uses escalating noise levels on connections to search weight space for increasingly optimal states, may be used with the neutral network of the present invention. GDMC has been used to learn on a M.1 testbed and has performed quite well on the same prototype problems used to test M1BP. One possible implementation of Goal Directed Monte Carlo Learning is illustrated in the Turbo 5.5 Pascal program attached as Appendix II.

4.6(b) Mean Field Theory

A second alternative to ESBP is Mean Field Theory learning (MFT). MFT seems to work best when the global connection matrix is symmetric, although there may be ways to get around this symmetry assumption. Symmetry is not an obviously natural property of rule bases but preliminary ideas indicate possible applications of "artificial" symmetry: begin with an acyclic net with a triangular weight matrix W; apply MFT to the symmetric matrix $W+W^\tau$, maintaining symmetry; then apply the upper triangle back to the original net. Other possibilities can be explored. MFT is potentially significant since it displays better memory stability properties than many other neural net learning algorithms.

4.7 Detailed Summary of the Present Invention

A method for translating a rule-based expert system inference engine and knowledge base into a functionally equivalent artificial neural network (hereafter referred to as an expert network) in accordance with the present invention may be summarized as follows:

1. Construct a first-order network in which:
   (a) the combining function and firing rule of the expert system are translated into the combining function and activation function of the nodes (hereafter called regular nodes) in the expert network,
   (b) the regular nodes represent the complex logical assertions of the consequents and antecedents in the rule base,
   (c) the directed connections between nodes represent the implications between assertions, and
   (d) the weight of each connection represents the certainty factor associated with each respective implication.

A knowledge base can be represented by a weighted digraph and a weighted digraph is, by definition, a network. Thus the knowledge base of an expert system has the structure of a neural network, at least at the level of topology. The functional components of the inference engine in the expert system can be mapped to the functional components of a node in the neural network. The combining of input and activation of one unit in the neural network is analogous to the combining of evidence and firing of all rules with a common consequent in the expert system. The combining rule in the neural network can be made to be functionally equivalent to the evidentiary combining rule of the expert system. The activation function in the neural network can be constructed to function identically to the firing rule in the expert system. The activation dynamics at the node level of the neural network can be made to mimic the inferential dynamics at each vertex in the digraph representation of the expert system (see Table 1). Each rule in the expert system is represented in the neural network by a (node, edge, node) triple where the certainty factor of the rule becomes the weight of the edge. A rule denoted by $$a \rightarrow c \ (cf)$$

is represented in the neural network as

TABLE 1

Correspondences between components of an expert system and a neural network.

| Expert System | Neural Network |
| --- | --- |
| assertion | node |
| rule | connection |
| certainty factor | weight |
| internal state | internal state |
| evidentiary combining function | combining function |
| output value | output value |
| firing function | activation function |

$$a \xrightarrow{cf} c$$

The nodes a and c are referred to as regular nodes. The combining function for a regular node is based on the evidentiary combining function of the expert system being translated, and the output function of a regular node is essentially the firing function of the expert system.

2. Construct a second-order network in which:
   (a) each node in the first-order network that represents a complex assertion is replaced by a sub-network,
   (b) the sub-network functions equivalently to the logical connective(s) of the complex assertion, and
   (c) this is achieved by creating a set of nodes (hereafter called operation or op nodes) whose combining and activation functions capture the functionality of the logical connectives employed by the expert system (for example, negation, conjunction, or disjunction).

There are reductions of complex assertions that may be made by creating special op nodes with different classes of combining and activation functions. The following general procedure expands links that contain a logical operator in the antecedent to an equivalent network structure in which the input nodes are atomic assertions:

a. Replace a (node, edge, node) triple of the form $$op(a_1, a_2, \ldots, a_n) \xrightarrow{cf} c$$

with the sub-network $$a_i \xrightarrow{1} op(a_1, a_2, \ldots, a_n)$$

$$op(a_1, a_2, \ldots, a_n) \xrightarrow{cf} c$$

where $i=1, \ldots, n$.

The combining and activation functions of the node op $(a_1, a_2, \ldots, a_n)$ are based on the details of the operator definition.

b. Repeat step (a), recursively expanding the network until all original assertions are atomic.

For example, the expansion of logical conjunction can be performed in this manner. The following link which contains a conjunction in the antecedent $$\text{and}(a_1, a_2) \xrightarrow{cf} c$$

is converted to the subnetwork structure $$a_1 \xrightarrow{1} \text{and}(a_1, a_2)$$

$$a_2 \xrightarrow{1} \text{and}(a_1, a_2)$$

$$\text{and}(a_1, a_2) \xrightarrow{cf} c.$$

The throughput function of the and node is equivalent to the computation of logical conjunction for the particular expert system that is being translated. The unary operator negation can be expanded by the same method. The link $$\text{not}(a) \xrightarrow{cf} c$$

is expanded as follows:

$$a \xrightarrow{1} \text{not}(a)$$

$$\text{not}(a) \xrightarrow{cf} c$$

Again, the throughput function of the not node gives the same value as the computation of negation in the expert system. FIG. 7 shows an example of the expansion of a first-order network into a second-order network.

One embodiment of the invention where the method described above is applied to the expert system shell M.1 by Teknowledge may be summarized as follows: M.1 is a PC-based system shell. Some features of M.1 that are relevant to the current work are:
1. The knowledge is represented as rules.
2. The inference engine primarily uses backward chaining.
3. The representation of knowledge allows for the encoding of uncertain knowledge through the use of certainty factors, which are measures of likelihood of a fact.

Though M.1 uses certainty factors to represent uncertainty the general method described in claims 1 and 2 are applicable to expert systems that use other means of reasoning under uncertainty including Bayesian probability, Dempster-Shafer theory, and fuzzy reasoning.
1. Construct a first-order network for M.1. In the M.1 system, the evidentiary combining function for regular nodes can be stated in the following way: For a given node, let P be the set of indices of nodes with incoming connections to that node whose weights (corresponding to M.1's certainty factors) are positive, i.e., $P=\{i|\omega_i>0\}$. Likewise, N is the set of indices for nodes with negative incoming weights. Then define $$y^+ = 1 - \prod_{i \in P} (1 - \omega_i u_i) \tag{0.1}$$

$$y^- = -1 + \prod_{i \in N} (1 + \omega_i u_i) \tag{0.2}$$

where $u_i$ is the output of node i. Combining negative and positive incoming connections yields the combining function:

$$g_{reg}(u, w) = \frac{y^+ + y^-}{1 - \min\{|y^+|, |y^-|\}} \tag{0.3}$$

If $y^+=1$ and $y^-=-1$, $g_{reg}$ is defined to be 0. The activation function in the neural network is replaced by the firing rule from the expert system. The firing rule (or output function) used by M.1 is the threshold function:

$$f_{reg}(y) = \begin{cases} y, & \text{if } y \geq 0.2; \\ 0, & \text{otherwise} \end{cases} \tag{0.4}$$

2. Construct a second-order network for M.1. The combining function for a conjunction node in M.1 is explicitly given as $$g_{and}(u, w) = \min_i \{u_i\} \tag{0.5}$$

The output function is the same threshold function used for regular nodes (equation 0.4). The combining function for a negation node is $$g_{not}(u, w) = \omega_1 u_1 \tag{0.6}$$

where $\omega_1=1$ is the weight on the solitary incoming link. The output function is $$f_{not}(y) = \begin{cases} 1, & \text{if } y < 0.2; \\ 0, & \text{otherwise.} \end{cases} \tag{0.7}$$

M.1 meta-propositions are handled similarly. A metaproposition is a proposition that makes a statement about the inference process itself rather than about the subject domain of the knowledge base. For example, the M.1 meta-proposition that tests the assertion (a is unknown) does so by seeking values for the assertion. If no acceptable values are found then (a is unknown) is true. Let R be the set of values $r_i$, i=1, . . . ,n such that there exists an assertion of the form (a is $r_i$) in the knowledge base. Then the general form of expansion can be applied. The activation dynamics for an "unknown" node are based on the M.1 test for "unknown". The link:

$$(a \text{ is unknown}) \xrightarrow{cf} c$$

is converted to the following sub-network $$(a \text{ is } r_i) \xrightarrow{1} (a \text{ is unknown})$$

$$(a \text{ is unknown}) \xrightarrow{cf} c$$

for i=1, . . . ,n.

A still further application of the present invention for learning rule base certainty factors from examples may be summarized as follows:
1. Translate an expert system inference engine and rule base into an expert network using the steps outlined above.
2. Train the expert network from a set of correct examples using the following 2-stage process:
   (a) Reduce the gross output error to approximately 10% of the original error by using a stochastic hillclimbing technique such as Goal-Directed Monte Carlo learning (hereafter referred to as GDMC).

(b) Reduce the remaining output error by using a modified backpropagation technique.

3. Translate the expert network values back into an expert system rule base using the corrected weights from the expert network as the certainty factors in the rule base.

The method of the learning process described above may be applied to the expert system shell M.1 by Teknowledge as follows:

1. Translate the M.1 expert system inference engine and rule base into an expert network using the steps outlined above.
2. Train the expert network from a set of correct examples using he following 2-stage process:
   (a) Reduce the gross output error to approximately 10% of the original error by using a stochastic hillclimbing technique such as GDMC.
   (b) Reduce the remaining output error by using the modified backpropagation technique described above.
3. Translate the expert network values back into an M.1 rule base using the corrected weights from the expert network as the certainty factors in the rule base.

A specific method for implementing backpropagation learning for the second stage of the learning process in accordance with the present invention is summarized below. Nodes in the translated network (expert network) are partitioned into different classes which may have different activation functions. Credit for error is assigned in the typical manner—by propagating blame backwards through the network. However, weights leading to negation nodes and conjunction nodes are not modifiable.

The general backpropagation algorithm can be described succinctly as follows. The error in the $j^{th}$ node is the difference between the ideal and actual outcomes for that node: $e_j = I_j - z_j$. Defining total error for the system as $E = \Sigma_j e_j^2$ and differentiating E with respect to $\omega_{ji}$, the weight of the connection from the $i^{th}$ node to the $j^{th}$ node, yields $$\frac{\partial E}{\partial w_{ji}} = \frac{\partial E}{\partial e_j} \frac{\partial e_j}{\partial z_j} \frac{\partial z_j}{\partial y_i} \frac{\partial y_j}{\partial w_{ji}} \quad (0.8)$$

The output function used by MYCIN and M.1 is described in equation (0.4). The combining function for regular nodes in M.1 is stated in equations (0.1, 0.2, and 0.3). It can be shown that for the M.1 inference engine $$\frac{\partial y_j}{\partial w_{ij}} = \begin{cases} \frac{x_i}{1+x_iw_{ij}} \frac{1+y^+}{1-y^-}, & \text{if } y^+ \leq |y^-| \text{ and } i \in N_j; \\ \frac{x_i}{1-x_iw_{ij}} \frac{1-y^+}{1-y^-}, & \text{if } y^+ \leq |y^-| \text{ and } i \in P_j; \\ \frac{x_i}{1+x_iw_{ij}} \frac{1+y^-}{1+y^+}, & \text{if } y^+ > |y^-| \text{ and } i \in N_j; \\ \frac{x_i}{1-x_iw_{ij}} \frac{1-y^-}{1+y^+}, & \text{if } y^+ > |y^-| \text{ and } i \in P_j. \end{cases} \quad (0.9)$$

The steepest descent error gradient is then the vector whose components are $$\frac{\partial \Gamma_k}{\partial x_{jk}} = \begin{cases} 1, & \text{if } x_{jk} = \min\{x_{ik}\} \\ 0, & \text{otherwise} \end{cases} \quad (0.10)$$

These results allow implementation of backpropagation learning for the M.1.

A still further method in accordance with the present invention for assigning error to hidden nodes in any acyclic network of neural and synaptic objects using influence factors is summarized below. The influence factor $\epsilon_{kj}$ for the connection from node j to node k is calculated during forward activation of the network using the formula $$\epsilon_{kj} = \phi'_k(Y_k) \times \frac{\partial \Gamma_k}{\chi_{kj}} (x_{k1}, \ldots, x_{kn}) \times \sigma'_{kj}(z_j). \quad (0.11)$$

where $\phi_k$ is the activation function of node k, yk is the internal state of node k, $\Gamma_k$ is the combining function of node k, $\chi_{ki}$ is the i-th post-synaptic input to node k, $\sigma'_{jk}$ is the synaptic function of the connection from node j to node k, and $z_j$ is the output of node j.

Error is assigned to each node in the network by assigning $e_j = I_j - z_j$ (ideal value minus calculated output) to each output node and then reverse-activating the network using $$e_j := \sum_k \epsilon_{kj} e_k \quad (0.12)$$

as the reverse update rule. It is proved that activation of acyclic networks (both forward and backward) terminates in finitely many iterations, so error is defined at each node in the network uniquely by these equations.

A still further method for applying the method described above to an M.1 expert network in accordance with the present invention is summarized below: for and nodes:

$$\frac{\partial \Gamma_k}{\partial x_{kj}} = \begin{cases} 1, & \text{if } x_{kj} = \min\{x_{ki}|i = 1 \ldots n\} \\ 0, & \text{otherwise} \end{cases} \quad (0.13)$$

for not nodes:

$$\frac{\partial \Gamma_k}{\partial x_{kj}} = -1 \quad (0.14)$$

for nor nodes:

$$\frac{\partial \Gamma_k}{\partial x_{kj}} = \begin{cases} -1, & \text{if } x_{kj} = \max\{x_{ki}|i = 1 \ldots n\} \\ 0, & \text{otherwise} \end{cases} \quad (0.15)$$

for regular nodes:

$$\frac{\partial \Gamma_j}{\partial x_{ij}} = \begin{cases} \frac{1}{1-x_{ji}} \frac{1-y_j^+}{1+y_j^-}, & \text{if } y_j^+ \geq |y_j^-| \text{ and } x_{ji} > 0; \\ \frac{1}{1-x_{ji}} \frac{1+y_j^-}{1-y_j^+}, & \text{if } y_j^+ < |y_j^-| \text{ and } x_{ji} > 0; \\ \frac{1}{1+x_{ji}} \frac{1-y_j^+}{1+y_j^-}, & \text{if } y_j^+ \geq |y_j^-| \text{ and } x_{ji} < 0; \\ \frac{1}{1+x_{ji}} \frac{1+y_j^-}{1-y_j^+}, & \text{if } y_j^+ < |y_j^-| \text{ and } x_{ji} < 0. \end{cases} \quad (0.16)$$

4.8 Conclusion

Appendix IV sets forth c source code reflecting the inventors' current implementation of the influence factors aspect of the invention discussed in Section 4.4.

It will, of course, be recognized by those of ordinary skill that many variations from the specific embodiments disclosed above are possible. For example, the functions described above as being implemented in software may be equivalently implemented in hardware; likewise, functions implemented using a particular computer language may be equivalently implemented in other languages. It is intended that the attached claims or that the following claims be construed to encompass all such variations and equivalents.

APPENDIX I

Makefile and C Code Modules for
Implementing Expert System
Backpropagation Learning for an M.1 Expert System

```
23JUL91 1:30p              HRUS0723.U00           PAGE 1

1  Date:     Tue Jul 23, 1991  6:11 pm  GMT
 2  Source-Date: Tue, 23 Jul 91 13:58:29 -0400
 3  From:     Susan Hruska
 4            EMS: INTERNET / MCI ID: 376-5414
 5            MBX: hruska@tau.cs.fsu.edu
 6
 7  TO:     * D.C. Toedt / MCI ID: 421-9132
 8  Subject:  ESBP.c
 9  Message-Id: 65910723181156/0003765414NB1EM
10  Source-Msg-Id: <9107231758.AA00971@tau.cs.fsu.edu>
11
12  /*******************************************************/
13  /***                                                 ***/
14  /***   This file contains the Makefile and the C code modules for  ***/
15  /***   implementation of the Expert System Back Prop learning      ***/
16  /***   algorithm for M.1 expert networks.                          ***/
17  /***                                                 ***/
18  /***   Submitted by Susan I. Hruska on 22 July 1991 for R.C. Lacher, ***/
19  /***   D.C. Kuncicky, and S.I. Hruska to D.C. Toedt for purposes of  ***/
20  /***   investigation of patent for this process.                    ***/
21  /***                                                 ***/
22  /*******************************************************/
23
24  /*******************************************************/
25  /***   The first section of this file is the Makefile used to      ***/
26  /***   compile, link and form an executable file from the C modules ***/
27  /***   which follow.                                                ***/
28  /***                                                 ***/
29  /***   The next two sections are types and constants defined and   ***/
30  /***   global variables declared for the program.  Program modules ***/
31  /***   make up the rest of the file.                               ***/
32  /***                                                 ***/
33  /***   Indications for breakdown of the code modules are           ***/
34  /***   shown in comments at the beginning of each module.          ***/
35  /*******************************************************/
36
37  /**********Begin Makefile ******************************/
38
39  all: esbp
40
41  esbp:   importfiles.o getweight.o getxandz.o importxandz.o readyours.o
42          flowforward.o fire.o m1learn.o printcommon.o esbpdriver.o
43          cc -o esbp importfiles.o getweight.o getxandz.o importxandz.o
44                readyours.o flowforward.o fire.o m1learn.o printcommon.o
45                esbpdriver.o -lm
46
47  importfiles.o: importfiles.c
48          cc -c importfiles.c
49
```

23JUL91 1:30p          HRUS0723.U00            PAGE 2

```
50  getweight.o: getweight.c
51          cc -c getweight.c
52
53  getxandz.o: getxandz.c
54          cc -c getxandz.c
55
56  importxandz.o: importxandz.c
57          cc -c importxandz.c
58
59  readyours.o: readyours.c
60          cc -c readyours.c
61
62  flowforward.o: flowforward.c
63          cc -c flowforward.c
64
65  fire.o:  fire.c
66          cc -c fire.c
67
68  m1learn.o: m1learn.c
69          cc -c m1learn.c
70
71  printcommon.o: printcommon.c
72          cc -c printcommon.c
73
74  esbpdriver.o: esbpdriver.c
75          cc -c esbpdriver.c
76
77  /************* End Makefile ****************************/
78
79  /*******************************************************/
80  /*******************************************************/
81  /***************BREAK APART HERE************************/
82  /*******************************************************/
83  /*******************************************************/
84
85  /*******************************************************/
86  /*  tandc.c                                            */
87  /*                                                     */
88  /*  types and constants used in the program            */
89  /*                                                     */
90  /*******************************************************/
91
92  #define MAXINLAYER 100         /* Maximum nodes per layer   */
93
94  #define CMAXINLAYER 101        /* C's version of MAXNODES   */
95
96  #define MAXTOTALNODES 300      /* Includes input, middle and */
97                                 /* output nodes.              */
98  #define CMAXTOTALNODES 301
```

```
23JUL91 1:30p           HRUS0723.U00           PAGE 3

99
100  #define MAXPATTERNS 40         /* Maximum number of patterns */
101
102  typedef  int    vector[CMAXTOTALNODES];
103
104  typedef  float  patternarray[CMAXINLAYER][MAXPATTERNS];
105
106  typedef  float  bigpatternarray[CMAXTOTALNODES][MAXPATTERNS];
107
108  typedef  int    bigstatearray[CMAXTOTALNODES][CMAXTOTALNODES];
109
110  typedef  float  fvector[CMAXTOTALNODES];
111
112  typedef  float  fbigstatearray[CMAXTOTALNODES][CMAXTOTALNODES];
113
114  /*****************************************************************/
115  /*****************************************************************/
116  /***************BREAK APART HERE**********************************/
117  /*****************************************************************/
118  /*****************************************************************/
119
120  /*****************************************************************/
121  /*  globals.c                                                    */
122  /*                                                               */
123  /*  These are the global variables used throughout the program.  */
124  /*                                                               */
125  /*****************************************************************/
126
127  bigstatearray mask;
128
129  fbigstatearray s, deltaw, deltawstar;
130
131  vector f, activetag, r, c;
132
133  patternarray desiredz;
134
135  bigpatternarray x, z, e;
136
137  fvector y, goods;
138
139  int rules, in, middle, out, maxits, numpats, numwrong;
140
141  float beta, T, lambda, epsilon, mu, sigma;
142
143  /*****************************************************************/
144  /*****************************************************************/
145  /***************BREAK APART HERE**********************************/
146  /*****************************************************************/
147  /*****************************************************************/
```

```
23JUL91  1:30p           HRUS0723.U00           PAGE  4

148
149  #include <stdio.h>
150  #include "tandc.c"
151  #include "globals.c"
152
153.
154  /*************************************************/
155  /***   esbpdriver.c                          ***/
156  /***                                         ***/
157  /***   This is the main program module which drives the   ***/
158  /***   expert system backprop code. It reads in the       ***/
159  /***   network in the form of common.net, sets up the     ***/
160  /***   learning parameters, gets the input/output vectors ***/
161  /***   to be used in training, calls for one forward      ***/
162  /***   pass through the network for all patterns, and     ***/
163  /***   calls the M.1 backprop learning algorithm routine. ***/
164  /***                                         ***/
165  /***   Modules called: getweight, setup, getxandz,        ***/
166  /***                   flowforward, m1learn   ***/
167  /*************************************************/
168
169
170  main()
171  {
172
173  int i, j, dim;
174  int resp;
175
176  getweight();
177
178  setup();  /* Located in m1learn.c */
179
180  getxandz();
181
182  printf ("\n Press any integer key to continue.....");
183  scanf ("%d", &resp);
184
185  dim = in + middle + out;
186
187  for (j=1; j<=numpats; j=j+1)
188    {
189
190      flowforward(j);
191      printf ("\n Pattern %d:\n", j);
192      for (i=1; i<=dim; i=i+1)
193        printf (" %f ", z[i][j]);
194      printf ("\n");
195    }
196
```

23JUL91 1:30p          HRUS0723.U00          PAGE 5

```
197  mllearn();
198
199  }
200
201  /*****************************************************************/
202  /*****************************************************************/
203  /***********************BREAK APART HERE*************************/
204  /*****************************************************************/
205  /*****************************************************************/
206
207  #include <stdio.h>
208  #include <math.h>
209  #include "tandc.c"
210  #include "globals.c"
211
212  /*****************************************************************/
213  /***                                                           ***/
214  /***    fire.c                                                 ***/
215  /***                                                           ***/
216  /***    Fires node i, pattern pat, based on a switch on f[i], a ***/
217  /***    flag indicating type of node:                          ***/
218  /***              0 = vannilla neural net node                 ***/
219  /***              1 = M.1 regular node (disjunction)           ***/
220  /***              2 = M.1 conjunction node                     ***/
221  /***              3 = M.1 unknown node                         ***/
222  /***              4 = M.1 negation node                        ***/
223  /***                                                           ***/
224  /***    Firing combines evidence of incoming connections and   ***/
225  /***    assigns an activation value to node i.                 ***/
226  /***                                                           ***/
227  /***    Called from flowforward.c                              ***/
228  /***                                                           ***/
229  /***    Submodules: vanillann, m1regular, m1combining,         ***/
230  /***               m1conjunction, m1unknown                    ***/
231  /***                                                           ***/
232  /*****************************************************************/
233
234
235  void vanillann(i, pat)
236  int i, pat;
237
238  /*****************************************************************/
239  /***  for "vanilla" neural nets:                               ***/
240  /***       internal state = weighted sum of inputs             ***/
241  /***       output = hypertangent of internal state             ***/
242  /*****************************************************************/
243
244  {
245     int dim, k, resp;
```

```
23JUL91 1:30p          HRUS0723.U00           PAGE  6

246    float ysum, logistic, arg, hypertan;
247
248    dim = in + middle + out;
249
250    ysum = 0.0;
251    for (k=1; k<=dim; k=k+1)
252      ysum = ysum + s[i][k] * z[k][pat];
253
254    y[i] = ysum;
255
256
257    arg = lambda * (ysum - T);
258    hypertan = (exp(arg) - exp(-1.0*arg)) / (exp(arg) + exp(-1.0*arg));
259    z[i][pat] = hypertan;
260
261  }
262
263  float m1combining(currentCF, nextCF)
264  float currentCF, nextCF;
265
266  /*****************************************************************/
267  /***   This function is called by m1regular to combine the     ***/
268  /***   current certainty factor with the next certainty factor ***/
269  /***   See M.1 manual, page 4-17                               ***/
270  /*****************************************************************/
271  {
272    float result, temp;
273    char resp;
274
275    if (fabs(nextCF) <= 0.000001)
276      result = currentCF;
277
278    else if (currentCF >= 0.0 && nextCF > 0.0)
279      result = currentCF + ((1.0 - currentCF) * nextCF);
280
281    else if (currentCF < 0.0 && nextCF < 0.0)
282      result = -1.0 * ((-1.0 * currentCF) + (((1.0 - currentCF) * (-1.0 * nextCF)) ));
283
284    else if ((currentCF <= 0.0 && nextCF > 0.0) || (currentCF >= 0.0 && nextCF <0.0))
285    {
286      if (fabs(currentCF) > fabs(nextCF))
287        temp = fabs(currentCF);
288      else
289        temp = fabs(nextCF);
290      if (temp == 1.0)
291        result = currentCF + nextCF;
292      else
```

```
293       result = (currentCF + nextCF) * (1.0 / (1.0 - temp));
294     }
295
296  return result;
297  }
298
299
300  void m1regular(i, pat)
301
302  int i, pat;
303
304  /*****************************************************/
305  /*** This is the activation and firing function for regular   ***/
306  /*** (disjunction) nodes. It calls m1combining.               ***/
307  /*****************************************************/
308  {
309    int k, dim, resp;
310    float currentCF, nextCF;
311
312    float yplusprod, yminusprod, tempprod, yplus, yminus;
313    float lesser, yval;
314
315    dim = in + middle + out;
316
317  /*** This code is used to test the correctness of the closed ***/
318  /*** algebraic form of m1's combining function               ***/
319
320    yplusprod = 1.0;
321    yminusprod = 1.0;
322    for (k=1; k<=dim; k=k+1)
323    {
324      tempprod = s[i][k] * z[k][pat];
325      if (tempprod > 0.0)
326        yplusprod = yplusprod * (1.0 - tempprod);
327      else
328        yminusprod = yminusprod * (1.0 + tempprod);
329    }
330    yplus = 1.0 - yplusprod;
331    yminus = -1.0 + yminusprod;
332
333    lesser = yplus;
334    if (-1.0 * yminus < lesser)
335      lesser = -1.0 * yminus;
336
337    yval = yplus + yminus;
338    if (lesser != 1.0)
339      yval = yval / (1.0 - lesser);
340
341    currentCF = 0.0;
```

```
23JUL91 1:30p           HRUS0723.U00            PAGE  8

342     for (k=1; k<=dim; k=k+1)
343     {
344        nextCF = s[i][k] * z[k][pat];
345
346        currentCF = m1combining(currentCF, nextCF);
347     }
348     y[i] = currentCF;
349
350     z[i][pat] = 0.0;
351     if (y[i] >= 0.20)
352        z[i][pat] = y[i];
353
354 }
355
356
357 m1conjunction (i, pat)
358 int i, pat;
359
360 /****************************************************************/
361 /*** This is the firing function for conjunction nodes in M.1. ***/
362 /*** The rule is: Take the minimum of all inputs >= 0.20       ***/
363 /****************************************************************/
364
365 {
366    int dim, first, k;
367
368    float cf, currentMin;
369
370    first = 1;
371    dim = in + middle + out;
372
373    for (k=1; k<=dim; k=k+1)
374    {
375       cf = s[i][k] * z[k][pat];
376       if (s[i][k] >= 0.20)
377       {
378          if (first == 1)
379          {
380             first = 0;
381             currentMin = cf;
382          }
383          else
384          {
385             if (currentMin > cf)
386                currentMin = cf;
387          }
388       }
389    }
390
```

23JUL91 1:30p          HRUS0723.U00          PAGE 9

```
391    y[i] = currentMin;
392
393    z[i][pat] = 0.0;
394    if (y[i] > 0.2)
395      z[i][pat] = y[i];
396
397  }
398
399  void m1unknown(i, pat)
400  int i, pat;
401
402  /*****************************************************/
403  /*** The firing function for unknown nodes in M.1 takes all    ***/
404  /*** incoming lines, assesses the information known about      ***/
405  /*** the state of the node, and returns a 0 if any one line    ***/
406  /*** passes a value above the threshold and a 1 otherwise.     ***/
407  /*** Note that the computations are identical to those for     ***/
408  /*** negation nodes (below). However, negation nodes have only ***/
409  /*** one input line whereas unknown nodes may have several.    ***/
410  /*****************************************************/
411
412  {
413    int dim, k;
414
415    float cf, outvalue;
416
417    dim = in + middle + out;
418
419    outvalue = 1.0;
420
421    for (k=1; k<=dim; k=k+1)
422      {
423        if (s[i][k] != 0.0)
424          {
425            cf = s[i][k] * z[k][pat];
426              if (cf >= 0.20)
427                outvalue = 0.0;
428
429          }
430      }
431
432    y[i] = outvalue;
433
434    z[i][pat] = y[i];
435
436  }
437
438
439  void m1negation (i, pat)
```

23JUL91 1:30p          HRUS0723.U00          PAGE 10

```
440  int i, pat;
441
442  /******************************************************/
443  /*** This is the firing function for negation nodes in N.1.  ***/
444  /*** Negation nodes have only one incoming connection. If    ***/
445  /*** the weighted value of this connection is >= 0.2, the    ***/
446  /*** negation node has output value 0. If < 0.2, output is 1.0 ***/
447  /******************************************************/
448
449  {
450     int dim, k;
451
452     float cf, outvalue;
453
454     dim = in + middle + out;
455
456     outvalue = 1.0;
457
458     for (k=1; k<=dim; k=k+1)
459       {
460          if (s[i][k] != 0.0)
461            {
462               cf = s[i][k] * z[k][pat];
463               if (cf >= 0.20)
464                  outvalue = 0.0;
465
466            }
467       }
468
469     y[i] = outvalue;
470
471     z[i][pat] = y[i];
472
473  }
474
475
476  void fire(i, pat)
477  int i, pat;
478
479  /******************************************************/
480  /*** This is the driver for the firing functions. The switch ***/
481  /*** is based on the flag f[i] which indicates the type of   ***/
482  /*** node i.                                                 ***/
483  /******************************************************/
484
485  {
486     switch (f[i])
487     {
488        case 0: vanillann(i, pat); break;
```

```
23JUL91  1:30p         HRUS0723.U00         PAGE 11

489       case 1: m1regular(i, pat); break;
490       case 2: m1conjunction(i, pat); break;
491       case 3: m1unknown(i, pat); break;
492       case 4: m1negation(i, pat); break;
493    }
494
495  }
496
497  /*****************************************************/
498  /*****************************************************/
499  /************************BREAK APART HERE**************/
500  /*****************************************************/
501  /*****************************************************/
502
503  #include <stdio.h>
504  #include "tandc.c"
505  #include "globals.c"
506
507  /*****************************************************/
508  /***                                              ***/
509  /***   flowforward.c                              ***/
510  /***                                              ***/
511  /***   This module implements a forward pass through an ***/
512  /***   M.1 expert network using the evidenciary combining ***/
513  /***   functions and firing functions for different types ***/
514  /***   of nodes in M.1 expert system rulebases.   ***/
515  /***                                              ***/
516  /***   Called from esbpdriver.c and m1learn.c     ***/
517  /***                                              ***/
518  /***   Calls module fire.c                        ***/
519  /***                                              ***/
520  /*****************************************************/
521
522  void flowforward(pat)
523  int pat;
524
525  {
526
527  int i, j, dim;
528  int allok, iok;
529  char resp;
530
531  dim = in + middle + out;
532
533  /* The activetag indicates whether a node has been activated (1) or */
534  /* not (0).                                                         */
535
536  for (i=1; i<=dim; i=i+1)
537     {
```

```
538    z[i][pat] = 0.0;
539    activetag[i] = 0;
540    }
541
542 /* Initialize z's for input nodes to input x values */
543 /* Set their activetags to 1.                       */
544
545 for (i=1; i<=in; i=i+1)
546    {
547    z[i][pat] = x[i][pat];
548    activetag[i] = 1;
549    }
550
551 /* allok is a flag indicating whether all nodes in the */
552 /* network have been activated (1) or not (0).         */
553
554 allok = 0;
555
556 while (allok == 0)
557    {
558    allok = 1;
559
560    for (i=in+1; i<=dim; i=i+1)
561       {
562       if (activetag[i] == 0)
563          {
564          allok = 0;
565
566 /* iok is a flag indicating whether all the nodes  */
567 /* with input to node i are active (1) or not (0). */
568
569          iok = 1;
570          for (j=1; j<=dim; j=j+1)
571             {
572             if (s[i][j] != 0.0 && activetag[j] == 0)
573                iok = 0;
574             }
575          if (iok == 1)
576             {
577             activetag[i] = 1;
578             fire(i, pat);
579             }
580          }
581       }
582    }
583
584 }
585
586 /******************************************************************/
```

```
23JUL91  1:30p         HRUS0723.U00         PAGE 13

587  /*******************************************************/
588  /**********************BREAK APART HERE*****************/
589  /*******************************************************/
590  /*******************************************************/
591
592  #include <stdio.h>
593  #include "tandc.c"
594  #include "globals.c"
595
596  /*******************************************************/
597  /***   getweight.c                                   ***/
598  /***                                                 ***/
599  /***   This module reads in the state array S of weights. ***/
600  /***   You may read directly from an array S set up in a file or ***/
601  /***   from a common.net format.                     ***/
602  /***                                                 ***/
603  /***   Calls                                         ***/
604  /***     importfiles, readyours                      ***/
605  /*******************************************************/
606
607  FILE *fopen(), *goalwtfile;
608
609  void getweight ()
610
611  {
612  int resp;
613
614  int i, j, k, dim, row, col;
615
616  float val;
617
618  int yorn;
619
620  printf ("Would you like to \n");
621
622  printf ("\n   1  Read the information from a file of your choosing?\n");
623  printf ("\n   2  Read the complete s array from 'bigs.dat'\n");
624
625  scanf ("%d", &resp);
626
627  if (resp == 1)
628      importfiles ();
629  else
630      readyours ();
631
632  dim = in+middle+out;
633
634  numwrong = 0;
635
```

```
636  printf ("\n Would you like to guarrantee that the weights to be learned");
637  printf ("\n are learned perfectly?  1=yes  2 = no ");
638  scanf ("%d", &yorn);
639
640
641  if (yorn == 1)
642    {
643      goalwtfile = fopen ("goalwt.dat", "r");
644      printf ("\n Weights to be learned:\n");
645
646  /* Input goal weights for input to middle layer nodes. */
647
648      for (j=1; j<=dim; j=j+1)
649        {
650          for (i=1; i<=in+middle; i=i+1)
651            if (mask[i][j] > 0)
652              {
653                printf ("s[%d][%d] now = %4.2f ", i, j, s[i][j]);
654                numwrong = numwrong + 1;
655                r[numwrong] = i;
656                c[numwrong] = j;
657
658                fscanf (goalwtfile, "%f", &val);
659
660                printf (" Goal weight = %4.2f\n", val);
661                goods[numwrong] = val;
662              }
663
664        }
665
666  /* Input goal weights for middle to middle and middle to output */
667  /* layer nodes.                                                 */
668
669      for (j=1; j<=dim; j=j+1)
670        {
671          for (i=in+middle+1; i<=dim; i=i+1)
672            if (mask[i][j] > 0)
673              {
674                printf ("s[%d][%d] now = %4.2f ", i, j, s[i][j]);
675                numwrong = numwrong + 1;
676                r[numwrong] = i;
677                c[numwrong] = j;
678
679                fscanf (goalwtfile, "%f", &val);
680
681                printf (" Goal weight = %4.2f\n", val);
682                goods[numwrong] = val;
683              }
684
```

```
23JUL91 1:30p           HRUS0723.U00         PAGE 15
685       }
686
687     fclose (goalwtfile);
688    }
689  printf ("\n Would you like to change s? 1=y or 2=n");
690  scanf("%d", &yorn);
691  while (yorn == 1)
692    {
693    printf ("\n Please type row, column, and value for s[row][column] \n");
694    scanf ("%d %d %f", &row, &col, &val);
695    s[row][col] = val;
696    printf ("\n Would you like to change s again? y or n");
697    scanf ("%d", &yorn);
698    }
699
700  }
701
702  /**************************************************************/
703  /**************************************************************/
704  /************************BREAK APART HERE**********************/
705  /**************************************************************/
706  /**************************************************************/
707
708  #include"tandc.c"
709  #include "globals.c"
710
711  /**************************************************************/
712  /***   getxandz.c                                           ***/
713  /***                                                        ***/
714  /***   This module inputs the input (x) and output (z) patterns ***/
715  /***   to be used in training.  These values may be read from a ***/
716  /***   file or from the keyboard.                           ***/
717  /***                                                        ***/
718  /***   Contains submodules                                  ***/
719  /***      keyx, keyz                                        ***/
720  /***                                                        ***/
721  /***   Calls                                                ***/
722  /***      importxandz                                       ***/
723  /**************************************************************/
724
725  void getxandz()
726
727  {
728  int resp, i, j;
729  int yorn;
730
731  printf ("\n Would you like to ....\n");
732  printf ("\n 1  Read X's and Z's from the keyboard or\n");
733  printf ("\n 2  Read X's and Z's from a file?\n");
```

```
734
735  scanf ("%d", &resp);
736
737  if (resp == 1)
738     {
739     numpats = 0;
740     yorn = 1;
741     while (yorn == 1)
742        {
743        numpats = numpats+1;
744        keyx();
745        keyz();
746        printf ("\n Another input pattern?  y or n...");
747        scanf ("%d", &yorn);
748        }
749     }
750  else
751     {
752     importxandz();
753     printf ("\n Back from importxandz, with...\n");
754     for (j=1; j<=numpats; j=j+1)
755        {
756        printf ("\n Pat = %d\n", j);
757        for (i=1; i<=out; i=i+1)
758           printf ("%f ", desiredz[i][j]);
759        printf ("\n");
760        }
761     printf ("\n Type any integer to continue.\n");
762     scanf ("%d", &yorn);
763     }
764
765  }
766
767  keyx()
768
769  {
770     int i;
771
772     printf ("Please input the %d x values from the input nodes.", in);
773     for (i=1; i<=in; i=i+1)
774        {
775        printf ("\nInput %d is ...", i);
776        scanf ("%f", &x[i][numpats]);
777        }
778  }
779
780
781  keyz()
782
```

```
23JUL91 1:30p            HRUS0723.U00         PAGE 17

783  {
784     int i;
785
786     printf ("Please input the %d desired z values from the output nodes.", out);
787     for (i=1; i<=out; i=i+1)
788        {
789        printf ("\nOutput %d is ...", i);
790        scanf ("%f", &desiredz[i][numpats]);
791        }
792  }
793
794
795  /*****************************************************************/
796  /*****************************************************************/
797  /************************BREAK APART HERE*************************/
798  /*****************************************************************/
799  /*****************************************************************/
800
801  #include <stdio.h>
802  #include "tandc.c"
803  #include "globals.c"
804
805  /*****************************************************************/
806  /***    importfiles.c                                          ***/
807  /***                                                           ***/
808  /***    This module reads in the weight state defining the net in ***/
809  /***    common.net format. It also sets flags indicating the type ***/
810  /***    of each link: 1 - fixed or 2 - variable (learnable).   ***/
811  /***    It also sets a mask variable to allow the user to select- ***/
812  /***    ively turn learning off or on for a particular link.   ***/
813  /***                                                           ***/
814  /***    Called from getweight.c                                ***/
815  /***                                                           ***/
816  /*****************************************************************/
817
818  FILE *fopen(), *stateinfile;
819
820  void importfiles ()
821
822  {
823
824  int i, j, fromtolayer, fromnode, tonode, wt, fromlayer, tolayer, col, row;
825
826  int resp, dim, nodetype, temp1, digit;
827
828  float temp2;
829
830  char fname[20];
```

```
23JUL91 1:30p          HRUS0723.U00          PAGE 18
831
832  printf ("\n Is this\n");
833  printf ("   1    a vanilla net or\n");
834  printf ("   2    an M-1 net?\n");
835
836  /* In vanilla nets, all links are flagged as "0" type nodes. */
837  /* In M.1 nets, all links are regular "1" nodes unless       */
838  /* otherwise indicated in the common.net file.                */
839
840  scanf ("%d", &resp);
841
842  printf ("\n   What is the name of the file you wish to read?");
843  scanf ("%s", fname);
844
845  stateinfile = fopen(fname, "r");
846
847  fscanf (stateinfile, "%d %d %d %d",&rules, &in, &middle, &out);
848
849  /* Enter flags indicating type of node */
850
851  for (i=1; i<=in; i=i+1)
852      f[i] = resp-1;
853
854  for (i=in+1; i<=in+middle; i=i+1)
855      fscanf (stateinfile, "%d", &f[i]);
856
857  for (i=in+middle+1; i<=in+middle+out; i=i+1)
858      f[i] = resp-1;
859
860  /* Read weights into state array */
861
862  dim = in+middle+out;
863
864  for (i=1; i<=dim; i=i+1)
865      for (j=1; j<=dim; j=j+1)
866      {
867          s[i][j] = 0.0;
868          mask[i][j] = 0;
869      }
870
871  printf ("\n Masks initialized, entering rules loop.");
872
873  /* David's common.net files typically have 2 extra fields on */
874  /* each line, indicators of Hebbian correlation, etc.         */
875
876  printf ("\n Is this a Dave file (1) or a Susan file (2)?");
877  scanf ("%d", &resp);
878
879  printf ("\n Masks initialized, entering rules loop.");
```

23JUL91 1:30p          HRUS0723.U00          PAGE 19

```
880
881   for (i=1; i<=rules; i=i+1)
882     {
883     if (resp == 1)
884       fscanf (stateinfile, "%d %d %d %d %d %d %f", &fromtolayer, &fromnode,
885           &tonode, &wt, &nodetype, &temp1, &temp2);
886     else
887       fscanf (stateinfile, "%d %d %d %d %d", &fromtolayer, &fromnode,
888           &tonode, &wt, &nodetype);
889
890   /* Convert the numbering scheme from common.net (where each   */
891   /* layer starts numbering from 1) to an overall numbering     */
892   /* scheme to facilitate access to the large composite array   */
893   /* of weights.                                                */
894
895     fromlayer = fromtolayer / 10;
896     tolayer = fromtolayer % 10;
897     col = (fromlayer - 1) * in + fromnode;
898     row = in + (tolayer - 2) * middle + tonode;
899     s[row][col] = wt / 100.0;
900     mask[row][col] = nodetype - 1;
901
902   /* Print out the nonzero entries in the weight matrix.         */
903
904     if (s[row][col] != 0.0)
905       printf (" Rule %d yields row %d col %d = %f\n", i, row, col, s[row][col]);
906
907     }
908
909   fclose(stateinfile);
910
911   }
912
913   /*****************************************************************/
914   /*****************************************************************/
915   /************************BREAK APART HERE*************************/
916   /*****************************************************************/
917   /*****************************************************************/
918
919   #include <stdio.h>
920   #include "tandc.c"
921   #include "globals.c"
922
923   /*****************************************************************/
924   /***                                                          ***/
925   /***   importxandz.c                                          ***/
926   /***                                                          ***/
927   /***   This module inputs training patterns (x and z vectors) ***/
```

```
23JUL91 1:30p        HRUS0723.U00        PAGE 20

928  /*** from a file.                                          ***/
929  /*****************************************************************/
930
931  FILE *fopen(), *xzinfile;
932
933  void importxandz ()
934
935  {
936
937  int i, j, pat, val;
938
939  char fname[20];
940
941  int resp;
942
943  printf ("\n   What is the name of the file you wish to read?");
944  scanf ("%s", fname);
945
946  xzinfile = fopen(fname, "r");
947
948  printf ("\n  How many patterns would you like to input?");
949  scanf ("%d", &numpats);
950
951  printf ("\n Beginning input of x and z now.");
952
953  for (pat=1; pat<=numpats; pat=pat+1)
954    {
955    for (i=1; i<=in; i=i+1)
956      {
957      fscanf (xzinfile, "%d", &val);
958      x[i][pat] = val;
959      }
960
961    for (i=1; i<=out; i=i+1)
962      {
963      fscanf (xzinfile, "%d", &val);
964      desiredz[i][pat] = val / 100.0;
965      }
966    }
967
968  /* Echo print the training patterns.                  */
969
970  printf ("\n I/O patterns:");
971  for (pat=1; pat<=numpats; pat=pat+1)
972    {
973    printf ("\n Pattern %d:", pat);
974    for (i=1; i<=in; i=i+1)
975      printf ("%f ", x[i][pat]);
976    printf ("\n");
```

23JUL91 1:30p          HRUS0723.U00          PAGE 21

```
977     for (i=1; i<=out; i=i+1)
978       printf ("%f ", desiredz[i][pat]);
979     printf ("\n");
980     }
981   printf ("Press any integer key to continue.");
982   scanf ("%d", &resp);
983
984   fclose (xzinfile);
985
986   }
987
988   /***************************************************************/
989   /***************************************************************/
990   /***********************BREAK APART HERE************************/
991   /***************************************************************/
992   /***************************************************************/
993
994   #include <stdio.h>
995   #include <math.h>
996   #include "tandc.c"
997   #include "globals.c"
998
999   /***************************************************************/
1000  /***                                                         ***/
1001  /***   m1learn.c                                             ***/
1002  /***                                                         ***/
1003  /***   This module implements M.1 backprop for expert networks. ***/
1004  /***                                                         ***/
1005  /***   Called from esbpdriver.c                              ***/
1006  /***                                                         ***/
1007  /***   Calls module fire.c, flowforward.c                    ***/
1008  /***                                                         ***/
1009  /***   Contains submodules sqerror, backprop, correct, m1learn ***/
1010  /***                                                         ***/
1011  /***************************************************************/
1012
1013  float sqerror(pat)
1014  int pat;
1015  /***                                                         ***/
1016  /***                                                         ***/
1017  /***   Square error for pattern pat = sum of (desired (ideal) z ***/
1018  /***      minus actual z values) ** 2                        ***/
1019  /***                                                         ***/
1020  /***   Called by module m1learn.                             ***/
1021  /***                                                         ***/
```

23JUL91 1:30p          HRUS0723.U00          PAGE 22

```
1022  /***                                                              ***/
1023  {
1024  int i, j, dim;
1025  float sum;
1026
1027  dim = in + middle + out;
1028
1029  sum = 0.0;
1030  for (i=in+middle+1; i<=dim; i=i+1)
1031    {
1032
1033    j = i - (in+middle);
1034
1035    e[i][pat] = desiredz[j][pat] - z[i][pat];
1036
1037    sum = sum + (e[i][pat]) * (e[i][pat]);
1038
1039    }
1040
1041  return(sum);
1042  }
1043
1044
1045  void backprop(j, pat)
1046  int j, pat;
1047  /***                                                              ***/
1048  /***                                                              ***/
1049  /***  Backprop totals the error to be assigned to node j (pattern ***/
1050  /***     pat) by multiplying weight (strength) of j's outgoing    ***/
1051  /***     connections by the error assigned to those downstream    ***/
1052  /***     nodes.                                                   ***/
1053  /***                                                              ***/
1054  /***  Called by module m1learn.                                   ***/
1055  /***                                                              ***/
1056  /***                                                              ***/
1057
1058  {
1059
1060    int i, dim;
1061
1062    float sum;
1063
1064    sum = 0.0;
```

23JUL91 1:30p          HRUS0723.U00          PAGE 23

```
1065
1066    dim = in + middle + out;
1067
1068    for (i=1; i<=dim; i=i+1)
1069       sum = sum + s[i][j] * e[i][pat];
1070
1071    e[j][pat] = sum;
1072  }
1073
1074
1075  void correct(pat, online)
1076  int pat, online;
1077
1078  /***                                                          ***/
1079  /***                                                          ***/
1080  /***  Correct adjusts the weights in array s by backpropping  ***/
1081  /***    error, computing weight changes (deltaw) and adding them ***/
1082  /***    to s.                                                 ***/
1083  /***                                                          ***/
1084  /***  Called (iteratively) by mllearn.                        ***/
1085  /***                                                          ***/
1086  /***  Calls backprop.                                         ***/
1087  /***                                                          ***/
1088
1089  {
1090
1091    int i,j, dim;
1092    int allok, jok;
1093
1094    float xn, yn, xp, yp, yplus, yminus;
1095    float yplusprod, yminusprod, tempprod, lesser;
1096    float partialy, partiale;
1097
1098    float normalizer[CMAXTOTALNODES];
1099
1100    int okflag, ii;
1101
1102    dim = in + middle + out;
1103
1104
1105  /***                                                          ***/
1106  /***  Tag all input and middle nodes as not active; their error ***/
1107  /***    has yet to be assigned via backprop.                  ***/
```

```
23JUL91  1:30p          HRUS0723.U00          PAGE 24

1108  /***                                                          ***/
1109
1110    for (i=1; i<=in+middle; i=i+1)
1111      activetag[i] = 0;
1112
1113  /***                                                          ***/
1114  /*** Tag all output nodes as active; their error is assessed  ***/
1115  /***    directly by comparison to "ideal" or desired output.  ***/
1116  /***                                                          ***/
1117
1118    for (i=in+middle+1; i<=dim; i=i+1)
1119      activetag[i] = 1;
1120
1121  /***                                                          ***/
1122  /*** Run through the nodes, backpropping error to node j as   ***/
1123  /***    soon as all j's downstream nodes have had blame (error) ***/
1124  /***    assigned and are active.                              ***/
1125  /***                                                          ***/
1126
1127    allok = 0;
1128
1129    while (allok == 0)
1130    {
1131      allok = 1;
1132      for (j=in+middle; j>=1; j=j-1)
1133      {
1134        if (activetag[j] == 0)
1135        {
1136          allok = 0;
1137          jok = 1;
1138          for (i=1; i<=dim; i=i+1)
1139          {
1140            if (s[i][j] !=0.0 && activetag[i] == 0)
1141              jok = 0;
1142          }
1143          if (jok == 1)
1144          {
1145            activetag[j] = 1;
1146            backprop(j, pat);
1147          }
1148        }
1149      }
1150    }
1151
```

```
23JUL91 1:30p          HRUS0723.U00           PAGE 25

1152
1153   /***                                                        ***/
1154   /***  Compute delatw's via M1 algebra calculations.         ***/
1155   /***                                                        ***/
1156
1157    for (i=1; i<=dim; i=i+1)
1158      for (j=1; j<=dim; j=j+1)
1159        deltaw[i][j] = 0.0;
1160
1161    for (i=1; i<=dim; i=i+1)
1162      normalizer[i] = 0.0;
1163
1164    for (j=1; j<=dim; j=j+1)
1165      if (f[j] == 1)
1166      {
1167        yplusprod = 1.0;
1168        yminusprod = 1.0;
1169        for (i=1; i<=dim; i=i+1)
1170        {
1171          tempprod = s[j][i] * z[i][pat];
1172          if (tempprod > 0.0)
1173            yplusprod = yplusprod * (1.0 - tempprod);
1174          else
1175            yminusprod = yminusprod * (1.0 + tempprod);
1176        }
1177        yplus = 1.0 - yplusprod;
1178        yminus = -1.0 + yminusprod;
1179        lesser = yplus;
1180        if (-1.0 * yminus < lesser)
1181          lesser = -1.0 * yminus;
1182
1183        y[j] = yplus + yminus;
1184        if (lesser != 1.0)
1185          y[j] = y[j] / (1.0 - lesser);
1186
1187
1188
1189
1190        for (i=1; i<=dim; i=i+1)
1191        {
1192   /***                                                        ***/
1193   /***  Change masks of connections with weights of 1 or -1 to 0  ***/
1194   /***  to disallow learning on connections which are perfectly   ***/
1195   /***  learned already.                                       ***/
1196   /***                                                        ***/
```

23JUL91 1:30p          HRUS0723.U00          PAGE 26

```
1197  /***   Update 16 Aug 90: Mask connections with weights < 0.2    ***/
1198  /***   as 0 to disallow learning on connections under the        ***/
1199  /***   threshold.                                                ***/
1200  /***                                                             ***/
1201  /***   Update 19 Feb 91: Allow connections with weight 1 or      ***/
1202  /***   -1 to learn - don't freeze them once they reach these     ***/
1203  /***   boundaries. Allow learning based on the "nodetype"        ***/
1204  /***   variable only - this is the 4th value coming in  on       ***/
1205  /***   common.net connection info lines.                         ***/
1206  /***                                                             ***/
1207  /***   Masks are set as common.net file is read in - in          ***/
1208  /***   function importfiles.c                                    ***/
1209  /***                                                             ***/
1210
1211
1212  /*       if (fabs(fabs(s[j][i]) - 1.0) <= 0.000001)
1213            mask[j][i] = 0;
1214  */
1215           if (s[j][i] < 0.2)
1216              mask[j][i] = 0;
1217
1218  /***                                                              ***/
1219  /***   Allow learning only on weights which have learning masks   ***/
1220  /***   of 1.                                                      ***/
1221  /***                                                              ***/
1222
1223
1224           if (mask[j][i] != 0)
1225           {
1226
1227              tempprod = s[j][i] * z[i][pat];
1228              xn = z[i][pat] / (1 + tempprod);
1229              xp = z[i][pat] / (1 - tempprod);
1230              yn = (1.0 - yplus) / (1.0 + yminus);
1231              yp = (1.0 + yminus) / (1.0 - yplus);
1232
1233              if (yplus <= -1.0*yminus)
1234                 if (tempprod < 0.0)
1235                    partialy = xn * yp;
1236                 else
1237                    partialy = xp * yp;
1238              else
1239                 if (tempprod < 0.0)
1240                    partialy = xn * yn;
1241                 else
1242                    partialy = xp * yn;
1243
```

```
23JUL91 1:30p           HRUS0723.U00              PAGE 27

1244              normalizer[j] = normalizer[j] + partialy * partialy;
1245
1246              partiale = 0.0;
1247              if (y[j] >= 0.2)
1248                 partiale = e[j][pat] * partialy;
1249
1250
1251
1252              deltaw[j][i] = beta * partiale;
1253
1254
1255
1256           }
1257       }
1258
1259       normalizer[j] = sqrt(normalizer[j]);
1260
1261  /*    if (fabs(normalizer[j]) <= 0.000001)
1262       {
1263          normalizer[j] = 1.0;
1264
1265       }
1266  */
1267    }
1268
1269
1270  /***                                                           ***/
1271  /***  Squash delatw's by first dividing them by the normalizer ***/
1272  /***     then assuring their position inside the [1,-1] hypercube. ***/
1273  /***     Sigma is used as a multiplicative factor to scale along ***/
1274  /***     the deltaw vector.                                     ***/
1275  /***                                                           ***/
1276
1277
1278
1279
1280
1281    for (j=1; j<=dim; j=j+1)
1282    {
1283       okflag = 1;
1284
1285  /*    if (fabs(normalizer[j]) > 0.0000001)
1286          fprintf (deltafile, "\n Node %d: Normalizer = %f", j,
1287             normalizer[j]);
1288  */
1289       for (i=1; i<=dim; i=i+1)
1290       {
```

```
23JUL91  1:30p              HRUS0723.U00            PAGE 28

1291         if (mask[j][i] != 0)
1292           {
1293
1294           deltaw[j][i] = deltaw[j][i] / normalizer[j];
1295
1296   /*  25 March 1991: If s is already on the border and deltaw   */
1297   /*  would move it further outside the border, set deltaw to 0.  */
1298
1299           if ((fabs(s[j][i]) >= 1.0) && ((s[j][i]*deltaw[j][i]) > 0.0))
1300               deltaw[j][i] = 0.0;
1301
1302           if (online == 0)     /* if batch training   */
1303              deltawstar[j][i] = deltawstar[j][i] + deltaw[j][i];
1304
1305
1306           if (fabs(s[j][i] + deltaw[j][i]) > 1.0)
1307             {
1308               okflag = 0;
1309               ii = i;
1310             }
1311         }
1312       }
1313
1314       if (online == 1)    /** online training **/
1315       {
1316       if (okflag != 1)
1317         {
1318           printf ("\n Using the squashing fct to stay inside the hypercube.");
1319           printf ("okflag = %d\n", okflag);
1320           printf ("s[%d][%d] = %f, delta = %f \n", j, ii, s[j][ii], deltaw[j][ii]);
1321         }
1322
1323       while (okflag == 0)
1324       {
1325         okflag = 1;
1326
1327         for (i=1; i<=dim; i=i+1)
1328           {
1329           deltaw[j][i] = sigma * deltaw[j][i];
1330           }
1331
1332         for (i=1; i<=dim; i=i+1)
1333           if (fabs(s[j][i] + deltaw[j][i]) > 1.0)
1334              okflag = 0;
1335       }
1336
1337   /***                                                           ***/
```

```
23JUL91 1:30p           HRUS0723.U00            PAGE 29

1338 /*** Finally, add deltaw to s.                            ***/
1339 /***                                                      ***/
1340
1341       for (i=1; i<=dim; i=i+1)
1342         if (fabs(deltaw[j][i]) > 0.0000001)
1343         {
1344           s[j][i] = s[j][i] + deltaw[j][i];
1345         }
1346      }
1347      else              /** batch training **/
1348      {
1349        if (pat == numpats)  /** if you are on the last pattern **/
1350        {
1351          okflag = 1;
1352          for (i=1; i<=dim; i=i+1)
1353            if (fabs(s[j][i] + deltawstar[j][i]) > 1.0)
1354              okflag = 0;
1355
1356          while (okflag == 0)
1357          {
1358            okflag = 1;
1359
1360            for (i=1; i<=dim; i=i+1)
1361            {
1362              deltawstar[j][i] = sigma * deltawstar[j][i];
1363            }
1364
1365            for (i=1; i<=dim; i=i+1)
1366              if (fabs(s[j][i] + deltaw[j][i]) > 1.0)
1367                okflag = 0;
1368          }
1369
1370 /***                                                        ***/
1371 /*** Finally, add deltawstar to s.                          ***/
1372 /***                                                        ***/
1373
1374          for (i=1; i<=dim; i=i+1)
1375            if (fabs(deltawstar[j][i]) > 0.0000001)
1376            {
1377              s[j][i] = s[j][i] + deltawstar[j][i];
1378            }
1379
1380        }
1381
1382      }
```

23JUL91 1:30p          HRUS0723.U00          PAGE 30

```
1383    }
1384
1385    }
1386
1387
1388    void mllearn ()
1389
1390    /***                                                              ***/
1391    /***  Mllearn drives the learning algorithm modules.  It computes ***/
1392    /***     squared error, then iterates through a correction/flow   ***/
1393    /***     forward set of instructions until convergence is attained.***/
1394    /***                                                              ***/
1395    /***  Called by esbpdriver.                                       ***/
1396    /***                                                              ***/
1397    /***  Calls correct, flowforward, and printcommon.                ***/
1398    /***                                                              ***/
1399    {
1400       FILE *fopen(), *errfile, *wtfile;
1401
1402       int i, dim, its, pat;
1403
1404       int key, itcount, online;
1405
1406       char fname[20], fname2[20];
1407
1408       float currsqerror, maxsqerror, totsqerror, maxabserror;
1409
1410       float strangeerror, temp1, wterr, totabserror, mae;
1411
1412       float oldtotsqerror, oldmae, progress;
1413
1414       printf ("\n To which file would you like iterations and error info sent?");
1415       scanf ("%s", fname);
1416
1417       errfile = fopen(fname, "w");
1418
1419       printf ("\n To which file would you like weight info sent?");
1420       scanf ("%s", fname2);
1421
1422       wtfile = fopen(fname2, "w");
1423
1424       dim = in + middle + out;
1425
1426    /*** We have tried a bunch of different error measures to help ***/
```

23JUL91 1:30p        HRUS0723.U00        PAGE 31

```
1427  /***  assess learning including total absolute error, max square  ***/
1428  /***  error, max absolute error, total absolute error, difference***/
1429  /***  between the correct weights and current weights, MAE, and   ***/
1430  /***  RMAE.                                                       ***/
1431
1432     totabserror = 0.0;
1433     maxsqerror = 0.0;
1434     maxabserror = 0.0;
1435     totsqerror = 0.0;
1436     for (pat = 1; pat <=numpats; pat = pat+1)
1437     {
1438        currsqerror = sqrt(sqerror(pat));
1439        if (currsqerror > maxsqerror)
1440           maxsqerror = currsqerror;
1441        totsqerror = totsqerror + currsqerror;
1442        printf ("Sq error for pattern %d is %f\n", pat, currsqerror);
1443        fprintf (errfile, "Sq error for pattern %d is %f\n", pat, currsqerror);
1444
1445        for (i=in+middle+1; i<=dim; i=i+1)
1446           {
1447           totabserror = totabserror + fabs(e[i][pat]);
1448           if (fabs(e[i][pat]) > maxabserror)
1449              maxabserror = fabs(e[i][pat]);
1450           }
1451     }
1452     mae = totabserror / (numpats * out);
1453     printf ("\n Mean Absolute Error = %f\n", mae);
1454     fprintf (errfile, "\n Mean Absolute Error = %f\n", mae);
1455
1456     printf ("\n Largest squared error among all patterns is %f\n", maxsqerror);
1457     fprintf (errfile, "\n Largest squared error among all patterns is %f\n",
1458              maxsqerror);
1459
1460     printf ("\n Total squared error for all patterns is %f\n", totsqerror);
1461     fprintf (errfile, "\n Total squared error for all patterns is %f\n",
1462              totsqerror);
1463
1464     printf ("\n Largest absolute error is %f\n", maxabserror);
1465     fprintf (errfile, "\n Largest absolute error is %f\n", maxabserror);
1466
1467
1468
1469  /*******************************************************************/
1470  /*  This segment defining this strange type of error was added on   */
1471  /*  27 Dec 1990 to assure that the two weights being tested which   */
1472  /*  are slowest to return to their ideal values of 100 do indeed    */
```

23JUL91  1:30p           HRUS0723.U00          PAGE 32

```
1473  /*   reach 100 before learning stops.                          */
1474  /*                                                             */
1475  /****************************************************************/
1476
1477     strangeerror = 0.0;
1478     for (i=1; i<=numwrong; i=i+1)
1479        {
1480        temp1 = fabs(goods[i] - s[r[i]][c[i]]);
1481        if (temp1 > strangeerror)
1482           strangeerror = temp1;
1483        }
1484
1485     fprintf (errfile, "\n Largest weight error is %f\n", strangeerror);
1486
1487
1488     printf ("\n Would you like to learn until the weights are perfect?\n");
1489     printf ("1=yes  2=no  ");
1490     scanf ("%d", &key);
1491     wterr = -1.0;
1492     if (key == 1)
1493        wterr = 0.005;
1494
1495     printf ("Press any integer key to continue");
1496     scanf ("%d", &key);
1497
1498     its = 0;
1499
1500     fprintf (errfile, "\n        Maxsqerr Totsqerr  Wterr   Maxouterr  MAE\n\n");
1501     printf ("\n Epsilon = %f\n", epsilon);
1502
1503     itcount = 0;
1504
1505     printf ("\n Would you like to do ....\n");
1506     printf ("        0     batch training  -or-\n");
1507     printf ("        1     online training?\n");
1508     scanf ("%d", &online);
1509
1510     progress = 1.0;
1511
1512  /***  The while loop which controls how long learning iterates  ***/
1513  /***  can be driven by a number of conditions (unused ones are  ***/
1514  /***  commented out as needed.                                  ***/
1515
1516     while (strangeerror > wterr && its < maxits)
1517
1518  /* while (maxabserror > epsilon && its < maxits) */
1519
1520  /* while (progress > 0.00001 && its < maxits)  */
```

```
23JUL91 1:30p           HRUS0723.U00            PAGE 33

1521
1522    {
1523       its = its + 1;
1524       for (pat=1; pat<=numpats; pat=pat+1)
1525       {
1526
1527          correct(pat, online);
1528
1529          flowforward(pat);
1530       }
1531       fprintf (wtfile, "\n");
1532
1533       oldmae = mae;
1534       oldtotsqerror = totsqerror;
1535       totsqerror = 0.0;
1536       maxsqerror = 0.0;
1537       maxabserror = 0.0;
1538       totabserror = 0.0;
1539       for (pat=1; pat<=numpats; pat=pat+1)
1540       {
1541          currsqerror = sqrt(sqerror(pat));
1542          if (currsqerror > maxsqerror)
1543             maxsqerror = currsqerror;
1544          totsqerror = totsqerror + currsqerror;
1545          printf ("Sq error for pattern %d is %f\n", pat, currsqerror);
1546
1547          for (i=in+middle+1; i<=dim; i=i+1)
1548             {
1549                totabserror = totabserror + fabs(e[i][pat]);
1550                if (fabs(e[i][pat]) > maxabserror)
1551                   maxabserror = fabs(e[i][pat]);
1552             }
1553
1554       }
1555
1556       mae = totabserror / (numpats * out);
1557
1558       strangeerror = 0.0;
1559       for (i=1; i<=numwrong; i=i+1)
1560       {
1561          temp1 = fabs(goods[i] - s[r[i]][c[i]]);
1562          if (temp1 > strangeerror)
1563             strangeerror = temp1;
1564       }
1565
1566
1567       printf (" %d: Max sq error = %f, Total sq error = %f\n", its, maxsqerror,
```

```
23JUL91 1:30p              HRUS0723.U00           PAGE 34

1568              totsqerror);
1569     printf ("         Max absolute error = %f \n", maxabserror);
1570     printf ("         Error in the weights = %f \n", strangeerror);
1571     fprintf (errfile, " %4d: %f %f %f %f %f\n", its,
1572              maxsqerror, totsqerror, strangeerror, maxabserror, mae);
1573
1574  /*** For printing purposes, the file is updated, closed and reopened ***/
1575  /*** every 10 iterations of learning.                                ***/
1576
1577     itcount = itcount + 1;
1578     if (itcount > 10)
1579       {
1580         itcount = 0;
1581         fclose (errfile);
1582         errfile = fopen(fname, "a");
1583
1584         fclose (wtfile);
1585         wtfile = fopen(fname2, "a");
1586       }
1587
1588     progress = fabs(oldtotsqerror - totsqerror);
1589
1590  }
1591
1592  printf ("\n Learning ended with max error of %f and %d iterations.\n",
1593           maxsqerror, its);
1594  printf ("\n Total squared error = %f\n", totsqerror);
1595  fprintf(errfile,"\nLearning ended with max error of %f and%d iterations.\n",
1596            maxsqerror, its);
1597  fprintf (errfile, "\n Total squared error = %f\n", totsqerror);
1598
1599  for (pat=1; pat<=numpats; pat=pat+1)
1600  {
1601     printf ("\n Pattern = %d\n", pat);
1602     fprintf (errfile, "\n \n Pattern = %d\n", pat);
1603     printf ("\n Desired vector: ");
1604     fprintf (errfile, "\n Goal: ");
1605
1606     for (i=1; i<=out; i=i+1)
1607       {
1608          printf ("%5.3f ", desiredz[i][pat]);
1609          fprintf (errfile, "%5.3f ", desiredz[i][pat]);
1610       }
1611
1612     fprintf (errfile, "\n z:    ");
1613     for (i=in+middle+1; i<=dim; i=i+1)
1614       {
1615          printf ("%5.3f ", z[i][pat]);
```

```
1616        fprintf (errfile, "%5.3f ", z[i][pat]);
1617      }
1618    }
1619
1620    fclose (errfile);
1621
1622    fclose (wtfile);
1623
1624 /*** Print out the final net after learning in common.net format. ***/
1625
1626 printcommon();
1627
1628 }
1629
1630 void setup()
1631
1632 /***                                                              ***/
1633 /*** This little module is misplaced; it sets up the learning     ***/
1634 /***     parameters but is called from the main program           ***/
1635 /***     esbpdriver.                                              ***/
1636 /***                                                              ***/
1637 /*** Commented out responses below indicate parameters for        ***/
1638 /***     which defaults were taken to streamline the interactive  ***/
1639 /***     user interface requirements.                             ***/
1640
1641 {
1642 printf ("\n Set-up Menu for Learning Parameters\n");
1643
1644 printf ("\n Value for BETA?...");
1645 scanf ("%f", &beta);
1646
1647 printf ("\n Value for MAXIMUM # OF ITERATIONS?...");
1648 scanf ("%d", &maxits);
1649
1650 printf ("\n Value for EPSILON?...");
1651 scanf ("%f", &epsilon);
1652 /*
1653 printf ("\n Value for shrinking parameter SIGMA?...");
1654 scanf ("%f", &sigma);
1655
1656 printf ("\n Value for LAMBDA?...");
1657 scanf ("%f", &lambda);
1658 printf ("\n Value for THRESHHOLD?...");
1659 scanf ("%f", &T);
1660 printf ("\n Value for MU?...");
1661 scanf ("%f", &mu);
1662
```

```
23JUL91 1:30p            HRUS0723.U00          PAGE 36
1663  beta = 0.1;
1664
1665  maxits = 5;
1666
1667  epsilon = 0.001;
1668  */
1669  sigma = 0.8;
1670
1671  lambda = 4.0;
1672  T = 0.0;
1673  mu = 0.0;
1674
1675  )
1676
1677  /*******************************************************/
1678  /*******************************************************/
1679  /***********************BREAK APART HERE****************/
1680  /*******************************************************/
1681  /*******************************************************/
1682
1683  #include <stdio.h>
1684  #include "tandc.c"
1685  #include "globals.c"
1686
1687  /*******************************************************/
1688  /***                                                 ***/
1689  /***   printcommon.c                                 ***/
1690  /***                                                 ***/
1691  /***   This module prints the net after learning in the ***/
1692  /***   common.net format.                            ***/
1693  /***                                                 ***/
1694  /***   Called from mllearn.                          ***/
1695  /***                                                 ***/
1696  /*******************************************************/
1697
1698  FILE *fopen(), *stateinfile, *stateoutfile;
1699
1700  void printcommon ()
1701
1702  {
1703  int temp, temp1, nodetype;
1704
1705  float temp2;
1706
1707  int fromtolayer, fromnode, tonode, wt, fromlayer, tolayer;
1708
1709  int i, j, dim, row, col;
1710
1711  char fname[20];
```

```
23JUL91 1:30p         HRUS0723.U00          PAGE 37

1712  /*
1713  printf ("\n Which file contains the original state array?\n");
1714  scanf ("%s", fname);
1715  stateinfile = fopen(fname, "r");
1716  */
1717
1718  stateinfile = fopen("goodwine.net", "r");
1719
1720  /*
1721  printf ("\n Which file would you like to print the new state array?\n");
1722  scanf ("%s", fname);
1723
1724  stateoutfile = fopen(fname, "w");
1725  */
1726  stateoutfile = fopen("testout.out", "w");
1727
1728  fscanf (stateinfile, "%d %d %d %d",&rules, &in, &middle, &out);
1729  fprintf (stateoutfile, "%d \n %d \n %d \n %d \n", rules, in, middle, out);
1730
1731  for (i=in+1; i<=in+middle; i=i+1)
1732    {
1733       fscanf (stateinfile, "%d", &temp);
1734       fprintf (stateoutfile, "%d \n", temp);
1735    }
1736
1737  for (i=1; i<=rules; i=i+1)
1738    {
1739        fscanf (stateinfile, "%d %d %d %d %d", &fromtolayer, &fromnode,
1740                      &tonode, &wt, &nodetype);
1741       fromlayer = fromtolayer / 10;
1742       tolayer = fromtolayer % 10;
1743       col = (fromlayer - 1) * in + fromnode;
1744       row = in + (tolayer - 2) * middle + tonode;
1745       if (s[row][col] > 0.0)
1746          wt = (s[row][col] + 0.005) * 100;
1747       else
1748          wt = (s[row][col] - 0.005) * 100;
1749       fprintf (stateoutfile, "%d %d %d %d %d\n", fromtolayer, fromnode, tonode, wt, nodetype);
1750    }
1751
1752  fclose(stateinfile);
1753  fclose(stateoutfile);
1754
1755
1756  }
1757
1758  /****************************************************************/
1759  /****************************************************************/
```

23JUL91  1:30p          HRUS0723.U00           PAGE 38

```
1760  /************************BREAK APART HERE*************************/
1761  /*****************************************************************/
1762  /*****************************************************************/
1763
1764  #include <stdio.h>
1765  #include "tandc.c"
1766  #include "globals.c"
1767
1768  /*****************************************************************/
1769  /***                                                           ***/
1770  /***   readyours.c                                             ***/
1771  /***                                                           ***/
1772  /***   This modules reads in the weight matrix directly from   ***/
1773  /***   a file called bigs.dat (not in common.net format).      ***/
1774  /***                                                           ***/
1775  /***   Called from getweight.c                                 ***/
1776  /***                                                           ***/
1777  /*****************************************************************/
1778
1779  void readyours ()
1780
1781  {
1782
1783  FILE *fopen(), *weightfile;
1784
1785  int dim, i, j, val;
1786
1787  weightfile = fopen ("bigs.dat", "r");
1788
1789  fscanf (weightfile, "%d %d %d", &in, &middle, &out);
1790
1791  printf ("\n in = %d, middle = %d, and out = %d\n", in, middle, out);
1792
1793  dim = in + middle + out;
1794
1795  for (i=1; i<=dim; i=i+1)
1796     f[i] = 0;
1797
1798  for (i=1; i<=dim; i=i+1)
1799     for (j=1; j<=dim; j=j+1)
1800        {
1801        fscanf (weightfile, "%d", &val);
1802        s[i][j] = val / 100.0;
1803        }
1804  printf ("\n Finished reading weightfile \n");
1805
1806  fclose (weightfile);
1807
1808  }
```

APPENDIX II

Pascal Program for
Performing Goal Directed Monte Carlo Learning

```
22JUL91 5:59p              KUNI0722.U00            PAGE 1

1  Date:     Mon Jul 22, 1991  7:11 pm  GMT
 2  Source-Date: Mon, 22 Jul 91 14:47:23 -0400
 3  From:     david kuncicky
 4            EMS: INTERNET / MCI ID: 376-5414
 5            MBX: kuncick@mu.cs.fsu.edu
 6
 7  TO:      * D.C. Toedt / MCI ID: 421-9132
 8  Message-Id: 13910722191131/0003765414NB2EM
 9  Source-Msg-Id: <9107221847.AA01316@mu.cs.fsu.edu>
10
11  program GDMC (Input, Output);
12
13  { This Turbo 5.5 Pascal program performs Goal-Directed Monte Carlo
14    learning on the ASCII file common.net.
15  }
16
17    uses  Graph, Crt;
18
19    const NUM_PATTS = 22;            { number of vectors in the data set }
20          MAX_PATTS = 22;            { maximum number of vectors to be allocated }
21          TICKS_PER_GOAL = 10;       { number of time ticks before backtracking }
22          MAX_NOISE = 500;           { maximum noise level }
23          {  SEED = 41; }            { list of seed for random function }
24          {  SEED = 32; }
25             SEED = 11;
26          {  SEED = 67; }
27          {  SEED = 83; }
28          {  SEED = 75; }
29          {  SEED = 18; }
30          {  SEED = 98; }
31          {  SEED = 89; }
32          {  SEED = 60; }
33
34          X_IN_DIMENSION =  6;       { dimensions of input layer }
35          Y_IN_DIMENSION =  4;
36          IN_ARRAY_SIZE =  23;
37
38          X_MID_DIMENSION = 9;       { dimensions of middle layer }
39          Y_MID_DIMENSION = 7;
40          MID_ARRAY_SIZE = 61;
41
42          X_OUT_DIMENSION = 5;       { dimensions of output layer }
43          Y_OUT_DIMENSION = 3;
44          OUT_ARRAY_SIZE = 13;
45
46    type  Binary = 0..1;
47          Smallint = 0..100;
```

```
22JUL91  5:59p         KUNI0722.U00            PAGE   2

48          PatternType = (Input, Internal, Output, Correct, Ideal, Cell);
49          WeightType  = (Variable, Fixed, Nonexistent);
50          Weight = -100..100;
51
52          WeightRec = record                      { structure of synaptic object }
53                      Value       : Weight;       { base weight value }
54                      WType       : WeightType;   { type = fixed, var, none }
55                      Hits        : integer;      { Hebbian correlation factor }
56                      NoiseFactor : real;         { function of HCF }
57                   end;
58
59          NodeRec = record                        { structure of network node }
60                    State      : Binary;          { state - on, off }
61                    NameCode   : Smallint;        { pointer to ASCII node label }
62                    NodeType   : Smallint;        { type = reg(1), and(2),
63                                                           unknown(3), not(4) }
64                    Activation : Weight;          { activation value of node }
65                  end;
66
67          PatternArray = Array[1..X_IN_DIMENSION,1..Y_IN_DIMENSION] of Binary;
68          MidArray     = Array[0..X_MID_DIMENSION,0..Y_MID_DIMENSION] of NodeRec;
69          OutArray     = Array[0..X_OUT_DIMENSION,0..Y_OUT_DIMENSION] of NodeRec;
70          IdealArray   = Array[0..10,0..10] of Weight;
71
72          HitRec = record                         { structure of record used to }
73                   On  : boolean;                 { track output error }
74                   Num : integer;
75                   Tot : integer;
76                   Tot_Goal : integer;
77                   Err : integer;
78                 end;
79
80          PatternRec = record                     { structure of input array }
81                       Input : PatternArray;      { array of array of nodes }
82                       Ideal : IdealArray;        { array of ideal outputs }
83                     end;
84
85          CArray = Array[1..MAX_PATTS] of PatternRec;
86
87          StateArray1  = Array[0..IN_ARRAY_SIZE,0..MID_ARRAY_SIZE] of WeightRec;
88          WeightArray1 = Array[0..IN_ARRAY_SIZE,0..MID_ARRAY_SIZE] of Weight;
```

```
22JUL91  5:59p           KUW10722.U00              PAGE  3

89          StateArray2  = Array[0..MID_ARRAY_SIZE,0..MID_ARRAY_SIZE] of WeightRec;
 90          WeightArray2 = Array[0..MID_ARRAY_SIZE,0..MID_ARRAY_SIZE] of Weight;
 91          StateArray3  = Array[0..MID_ARRAY_SIZE,0..OUT_ARRAY_SIZE] of WeightRec;
 92          WeightArray3 = Array[0..MID_ARRAY_SIZE,0..OUT_ARRAY_SIZE] of Weight;
 93
 94          BufferArray = Array[0..50,0..290] of integer;  { holds screen image }
 95          String80 = string[80];
 96          String255 = String[255];
 97
 98    var  I, J, K, X, Y,
 99          Threshold : integer;        { threshold is usually 20 (from M.1 ) }
100          MidMem : MidArray;
101          OutMem : OutArray;
102          OldState : Binary;
103          InMem : CArray;             { array of input vectors }
104          State1 : ^StateArray1;      { state array 1 - input to middle }
105          State2 : ^StateArray2;      { state array 2 - middle to middle }
106          State3 : ^StateArray3;      { state array 3 - middle to output }
107          Bak1   : ^WeightArray1;     { noise array 1 - input to middle }
108          Bak2   : ^WeightArray2;     { noise array 2 - middle to middle }
109          Bak3   : ^WeightArray3;     { noise array 3 - middle to ouput }
110          Hit_Array : array[1..MAX_PATTS,1..OUT_ARRAY_SIZE] of integer;
111          NumHits, TotHits, TotOutput,
112          Hi_Hits, HitSum, E_Goal,
113          TotCFs, EGoal_Ticks : integer;
114          Cycles, Tot_Diff : integer;
115          Hi_Noise, Patt_Num,
116          P_Goal : integer;
117          TotOutError, Tot_Noise, TotError : longint;
118          TotOutErr, Rewards : integer;
119          Finished, Learning, Want_Sound,
120          Met_EGoal,
121          Changed, Add_Noise : boolean;
122          TempWeightType : WeightType;
123          TotalCFs, PosWeights, NegWeights,
124          Count, Line, Max_Goal, NumLinks, WeightNum : integer;
125          Results, DataSet, Common, TempFile : text;
126          Low_Goal, Low_PGoal, L, M, N, SumOut, Diff, NewCF, Temp : integer;
127          MAE, Tmp : real;
128
129    {---------------------------------------------------------------------}
130
131    function RMax(I, J : real) : real;
```

```
22JUL91 5:59p          KUNI0722.U00          PAGE 4

132     { returns maximum of 2 real }
133     begin
134       if I > J then
135         RMax := I
136       else
137         RMax := J;
138     end;
139
140     {----------------------------------------------------------------}
141
142     function Max(I, J : integer) : integer;
143     { returns maximum of 2 integers }
144     begin
145       if I > J then
146         Max := I
147       else
148         Max := J;
149     end;
150
151     {----------------------------------------------------------------}
152
153     function Min(I, J : integer) : integer;
154     { returns minimum of 2 integers }
155     begin
156       if I < J then
157         Min := I
158       else
159         Min := J;
160     end;
161
162     {----------------------------------------------------------------}
163
164     procedure Beep(Frequency, Duration : integer);
165     { plays sound of Frequency for Duration }
166     begin
167       Sound(Frequency);
168       Delay(Duration);
169       NoSound;
170     end;
171
172     {----------------------------------------------------------------}
173
174     procedure Squeeze(var J,M,N : integer; XDim, YDim : integer);
175     { converts linear coordinate (J) to 2 dimensions (M,N) }
176       var K : REAL;
```

```
22JUL91 5:59p          KUNI0722.U00              PAGE  5

177
178      begin
179        K := J-1;
180        M := Trunc(K/YDim)+1;
181        N := Round(Frac(K/YDim)*YDim)+1;
182      end;
183
184    {-------------------------------------------------------------------------}
185
186    procedure WriteCommon;
187    { write net sizes and weights to ASCII file common.net }
188
189    var  TempRuleSize, K, M, N : integer;
190         TempStr : String255;
191
192    begin
193
194      { write input, hidden, and output array sizes }
195      assign(Common,'COMMON.NET');
196      rewrite(Common);
197
198      writeln(Common,NumLinks);
199      writeln(Common,IN_ARRAY_SIZE);
200      writeln(Common,MID_ARRAY_SIZE);
201      writeln(Common,OUT_ARRAY_SIZE);
202
203      { write node types for middle layer }
204      for J := 1 to MID_ARRAY_SIZE do
205          begin
206            Squeeze(J,M,N,X_MID_DIMENSION,Y_MID_DIMENSION);
207            writeln(Common, MidMem[M,N].NodeType);
208          end;
209
210      { write weights for state array 12 }
211      for I := 1 to IN_ARRAY_SIZE do
212        for J := 1 to MID_ARRAY_SIZE do
213          if State1^[I,J].WType <> Nonexistent then
214            begin
215              write(Common, '12 ', I:5, J:5, State1^[I,J].Value:6);
216              case State1^[I,J].WType of
217                Fixed    : write(Common,' 1');
218                Variable : write(Common,' 2');
219              end;
220              writeln(Common,State1^[I,J].Hits:5,' ',
221                             State1^[I,J].NoiseFactor:5:1)
222            end;
223
224      { write weights for state array 22 }
```

```
22JUL91  5:59p          KUNI0722.U00            PAGE  6

225         for I := 1 to MID_ARRAY_SIZE do
226           for J := 1 to MID_ARRAY_SIZE do
227             if State2^[I,J].WType <> Nonexistent then
228               begin
229                 write(Common, '22 ', I:5, J:5, State2^[I,J].Value:6);
230                 case State2^[I,J].WType of
231                   Fixed      : write(Common,' 1');
232                   Variable   : write(Common,' 2');
233                 end;
234                 writeln(Common,State2^[I,J].Hits:5,' ',
235                                State2^[I,J].NoiseFactor:5:1)
236               end;
237
238         { write weights for state array 23 }
239         for I := 1 to MID_ARRAY_SIZE do
240           for J:= 1 to OUT_ARRAY_SIZE do
241             if State3^[I,J].WType <> Nonexistent then
242               begin
243                 write(Common, '23 ', I:5, J:5, State3^[I,J].Value:6);
244                 case State3^[I,J].WType of
245                   Fixed      : write(Common,' 1');
246                   Variable   : write(Common,' 2');
247                 end;
248                 writeln(Common,State3^[I,J].Hits:5,' ',
249                                State3^[I,J].NoiseFactor:5:1)
250               end;
251
252         { node labels have been stored in temp.txt, append them to end of file }
253         assign(TempFile,'TEMP.TXT');
254         reset(TempFile);
255         while not eof(TempFile) do
256           begin
257             readln(TempFile, TempStr);
258             writeln(Common, TempStr);
259           end;
260
261         close(TempFile);
262         close(Common);
263       end;
264
265   {------------------------------------------------------------------------}
266
267   procedure CheckHits;
268   { calculate total number of hits between ideal and actual output }
269
270   var I, J, TotErr : integer;
271
```

```
22JUL91  5:59p           KUNI0722.U00         PAGE  7

272     begin
273
274       TotHits := 0;
275       TotOutput := 0;
276       TotErr := 0;
277       TotOutErr := 0;
278       TotCFs := 0;
279
280       { count total hits }
281       for I := 1 to X_OUT_DIMENSION do
282         for J := 1 to Y_OUT_DIMENSION do
283           if (I - 1) * Y_OUT_DIMENSION + J <= OUT_ARRAY_SIZE then
284             begin
285               TotErr := TotErr +
286                   abs(InMem[Patt_Num].Ideal[I,J] - OutMem[I,J].Activation);
287
288               if InMem[Patt_Num].Ideal[I,J] = OutMem[I,J].Activation then
289                 begin
290                   TotCFs := TotCFs + 1;
291                   Hit_Array[Patt_Num,(I - 1) * Y_OUT_DIMENSION + J] :=
292                       Hit_Array[Patt_Num,(I - 1) * Y_OUT_DIMENSION + J] + 1;
293                 end;
294
295               if (InMem[Patt_Num].Ideal[I,J] >= Threshold) and
296                  (OutMem[I,J].Activation >= Threshold) then
297                 begin
298                   TotHits := TotHits + 1;
299                   TotOutput := TotOutput + OutMem[I,J].Activation;
300                 end
301               else if (InMem[Patt_Num].Ideal[I,J] < Threshold) and
302                  (OutMem[I,J].Activation < Threshold) then
303                 TotHits := TotHits + 1;
304
305             end;
306
307       TotError := TotError + TotErr;
308
309     end;
310
311     {--------------------------------------------------------------------------}
312
313     procedure Action2(J : integer; Add_Noise : boolean );
314     { activation for OUTPUT pattern }
315
316       var  I, M, N, K, L, Temp, SumOut, Diff, Node_Sum, NewCF : integer;
317            Tmp : real;
318
```

```
22JUL91  5:59p          KUNI0722.U00            PAGE  8
319     begin
320
321       Squeeze(J,M,N,X_OUT_DIMENSION,Y_OUT_DIMENSION);
322       OldState := OutMem[M,N].State;
323
324       { combining function }
325       Sumout := 0;
326       for I := 1 TO MID_ARRAY_SIZE DO
327         if State3^[I,J].WType <> Nonexistent then
328           begin
329             { add noise once per cycle if variable weight }
330             if (Add_Noise) and (State3^[I,J].WType = Variable) then
331               Diff := State3^[I,J].Value +
332                       Round(State3^[I,J].NoiseFactor *
333                       (Random(2 * Hi_Noise + 1) - Hi_Noise))
334             else
335               Diff := Bak3^[I,J];
336
337             Tmp := I - 1;
338             K := Trunc(Tmp / Y_MID_DIMENSION)+1;
339             L := Round(Frac(Tmp / Y_MID_DIMENSION) * Y_MID_DIMENSION) + 1;
340
341             if State3^[I,J].WType = Variable then
342               Bak3^[I,J] := Min(Max(Diff,0),100);
343             NewCF := (MidMem[K,L].Activation *
344                       State3^[I,0].Value * Bak3^[I,J]) div 100;
345
346             { no need to go any further if new CF = 0 }
347             if NewCF <> 0 then
348               begin
349                 { if both are non-negative }
350                 if (Sumout >= 0) and (NewCF > 0) then
351                   Sumout := Sumout + ( ((100-Sumout) * NewCF) div 100)
352
353                 { if both are negative }
354                 else if (Sumout < 0) and (NewCF < 0) then
355                   Sumout := -1 * ((-1 * Sumout) +
356                     ( ((100+Sumout) * (-1 * NewCF)) div 100))
357
358                 { one must be negative and the other must be non-negative }
359                 else if ((Sumout <= 0) and (NewCF > 0)) or
360                         ((Sumout >= 0) and (NewCF < 0))   then
361                   begin
362                     Temp := Min( abs(Sumout), abs(NewCF) );
363
364                     { they still don't allow division by zero }
365                     if Temp = 100 then
366                       Sumout:= (Sumout + NewCF)
```

```
22JUL91  5:59p         KUNI0722.U00              PAGE  9

367                      else
368                         Sumout:= (Sumout + NewCF) * (100 div (100 - Temp));
369                    end;
370                end;
371            end;
372
373
374        { activation function }
375        if Sumout >= Threshold then
376          begin            { if over thresh then output = internal state }
377            OutMem[M,N].State := 1;
378            OutMem[M,N].Activation := Sumout;
379            State3^[0,J].Value := 1;
380          end
381        else              { if under thresh then output = 0 }
382          begin
383            OutMem[M,N].State := 0;
384            OutMem[M,N].Activation := Sumout;
385            State3^[0,J].Value := 0;
386          end;
387
388      end; { procedure }
389
390   {---------------------------------------------------------------------}
391
392   procedure Reward;
393   { provide reinforcement - copy noisy weight value to base weight }
394
395      var I, J, HitTot, Noise, WChange : integer;
396          T : real;
397
398      begin
399
400        { State array 1, input -> hidden }
401        for I := 1 to IN_ARRAY_SIZE do
402          for J := 1 to MID_ARRAY_SIZE do
403            if State1^[I,J].WType = Variable then
404              begin
405                State1^[I,J].Value := Bak1^[I,J];
406                if Met_EGoal then
407                   State1^[I,J].NoiseFactor := 0.1
408                else
409                   State1^[I,J].NoiseFactor := RMax(0.1,
410                      (NUM_PATTS - State1^[I,J].Hits)/NUM_PATTS);
411              end;
412
413        { State array 2,  hidden -> hidden }
414        for I := 1 to MID_ARRAY_SIZE do
```

```
22JUL91 5:59p           KUN10722.U00           PAGE 10

415           for J := 1 to MID_ARRAY_SIZE do
416             if (State2^[I,J].WType = Variable) then
417             begin
418               State2^[I,J].Value := Bak2^[I,J];
419               if Met_EGoal then
420                 State2^[I,J].NoiseFactor := 0.1
421               else
422                 State2^[I,J].NoiseFactor := RMax(0.1,
423                   (NUM_PATTS - State2^[I,J].Hits)/NUM_PATTS);
424             end;
425
426       { State array 3,  hidden -> output }
427       for I := 1 to MID_ARRAY_SIZE do
428         for J := 1 to OUT_ARRAY_SIZE do
429           if State3^[I,J].WType = Variable then
430           begin
431             State3^[I,J].Value := Bak3^[I,J];
432             if Met_EGoal then
433               State3^[I,J].NoiseFactor := 0.1
434             else
435               State3^[I,J].NoiseFactor := RMax(0.1,
436                 (NUM_PATTS - State3^[I,J].Hits)/NUM_PATTS);
437           end;
438
439       Beep(100,10);
440       Rewards := Rewards + 1;
441
442     end;
443
444  {-------------------------------------------------------------------}
445
446  procedure Teach;
447  { learning algorithm - calculate when to reinforce, change patterns,
448    increase noise, change goal }
449
450  var I, J, K, L, IdealTot, TmpTot, SumHit : integer;
451      Learned, Met_Goal : boolean;
452
453  begin
454    Learned := false;
455
456    { check progress of error }
457    if (TotError <= E_Goal) then   { met E-goal }
458      begin
459        Reward;
460        Hi_Noise := 0;
461        EGoal_Ticks := 0;
462        E_Goal := Max(TotError - 1, 0);
```

```
22JUL91  5:59p          KUNI0722.U00          PAGE 11

463          if TotError = 0 then
464             begin
465                writeln('Total error = 0.');
466                WriteCommon;
467             end;
468          end;
469
470       if (TotError = 0) then    { learning has succeeded !! }
471          begin
472            Learned := true;
473            Learning := false;
474            Beep(3000,60);        { make success sound }
475            WriteCommon;
476            Finished := true;
477          end
478       else
479          Learned := false;
480
481       { noise function - increase noise if goal not met }
482       if (TotError >= E_Goal) then   { didn't meet at least one goal }
483          begin
484            if (Hi_Noise < MAX_NOISE) then
485              if Hi_Noise = 0 then
486                Hi_Noise := 1
487              else
488                Hi_Noise := Min(MAX_NOISE, Hi_Noise * 2);
489          end;
490
491       { if no progress has been made for a while then make goals easier }
492       EGoal_Ticks := EGoal_Ticks + 1;
493       if (EGoal_Ticks > TICKS_PER_GOAL) then
494          begin
495            EGoal_Ticks := 0;
496            E_Goal := Max(1, Round(E_Goal * 1.1));
497            Hi_Noise := Random(10);
498          end;
499
500       If not(Learned) then
501          Cycles := Cycles + 1;
502
503       { check if any output node has all CF's exactly correct, and if so,
504         fix all incoming weights to that node }
505       for J := 1 to OUT_ARRAY_SIZE do
506          begin
507            SumHit := 0;
508            for I := 1 to Num_Patts do
509              SumHit := SumHit + Hit_Array[I,J];
510
511            if SumHit = Num_Patts then
```

```
22JUL91  5:59p          KUNI0722.U00         PAGE 12

512            begin
513              for K := 1 to MID_ARRAY_SIZE do
514                begin
515                  State3^[K,J].Value := Bak3^[K,J];
516                  if State3^[K,J].WType = Variable then
517                    State3^[K,J].WType := Fixed;
518                end;
519            end;
520        end;
521
522   end;
523
524   {--------------------------------------------------------------------}
525
526   procedure ReadDat;
527   { read ASCI data file }
528
529   var I, M, N, Tmp : integer;
530
531   begin
532     Reset(DataSet);
533     Patt_Num := 1;
534     while (Patt_Num <= NUM_PATTS) and (not eof(DataSet)) do
535       begin
536
537         for I := 1 to IN_ARRAY_SIZE do
538           begin
539             read(DataSet,Tmp);
540             State1^[I,0].Value := Tmp;
541             Squeeze(I,M,N,X_IN_DIMENSION,Y_IN_DIMENSION);
542             InMem[Patt_Num].Input[M,N] := Tmp;
543           end;
544
545         for I := 1 to OUT_ARRAY_SIZE do
546           begin
547             read(DataSet,Tmp);
548             Squeeze(I,M,N,X_OUT_DIMENSION,Y_OUT_DIMENSION);
549             InMem[Patt_Num].Ideal[M,N] := Tmp;
550           end;
551
552         readln(DataSet);
553         Patt_Num := Patt_Num + 1;
554       end;
555
556     Close(DataSet);
557   end;
558
559   {--------------------------------------------------------------------}
```

```
22JUL91 5:59p          KUNI0722.U00            PAGE 13
560
561    procedure Initialize;
562    { allocate and initialize all data structures, read in common.net }
563
564      var   J,K,M,N,
565            TempType,
566            TempWeight,
567            WhichArray : integer;
568            TWeightType : WeightType;
569            TempStr : String255;
570            Go : char;
571
572      begin
573        ClrScr;
574        RandSeed := SEED;
575        X := 1; Y := 1;
576        Hi_noise := 0;
577        Met_EGoal := false;
578        Line := 21;
579        State := 0;
580        Hi_Hits := 0;
581        TotError := 0;
582        EGoal_Ticks := 0;
583        Rewards := 0;
584        Cycles := 0;
585        Count := 0;
586        Patt_Num := 1;
587        Threshold := 20;
588        Finished := false;
589        New(Bak1);
590        New(Bak2);
591        New(Bak3);
592        New(State1);
593        New(State2);
594        New(State3);
595
596        { initialize weights to Non-existent }
597        for I := 1 to 100 do
598          for J := 1 to 100 do
599            begin
600              State1^[I,J].WType := Nonexistent;
601              State2^[I,J].WType := Nonexistent;
602              State3^[I,J].WType := Nonexistent;
603              State1^[I,J].Value := Threshold;
604              State2^[I,J].Value := Threshold;
605              State3^[I,J].Value := Threshold;
606              State1^[I,J].Hits := 0;
607              State2^[I,J].Hits := 0;
608              State3^[I,J].Hits := 0;
```

```
609            State1^[I,J].NoiseFactor := 0;
610            State2^[I,J].NoiseFactor := 0;
611            State3^[I,J].NoiseFactor := 0;
612          end;
613
614      State1^[0,0].Value := 0;
615      State2^[0,0].Value := 0;
616      State3^[0,0].Value := 0;
617
618      { read input, hidden, and output array sizes }
619      assign(Common,'COMMON.NET');
620      reset(Common);
621
622      readln(Common, NumLinks);
623
624      readln(Common);
625      readln(Common);
626      readln(Common);
627
628      { read node types for middle layer }
629      for J := 1 to MID_ARRAY_SIZE do
630        begin
631          Squeeze(J,M,N,X_MID_DIMENSION,Y_MID_DIMENSION);
632          readln(Common, TempType);
633          MidMem[M,N].NodeType := TempType;
634        end;
635
636      Go := ' ';
637      write('Read weights from common file?: ');readln(Go);
638
639      if (Go = 'y') or (Go = 'Y') then
640        begin
641          { read weights for state arrays }
642          for K := 1 to NumLinks do
643            begin
644              readln(Common, WhichArray, I, J, TempWeight, TempType);
645
646              case TempType of
647                  1 : TWeightType := Fixed;
648                  2 : TWeightType := Variable;
649                  3 : TWeightType := Nonexistent;
650              end;
651
652              case WhichArray of
653                12 : begin
654                       State1^[I,J].Value := TempWeight;
655                       State1^[I,J].WType := TWeightType;
656                       Bak1^[I,J] := State1^[I,J].Value;
657                     end;
```

```
22JUL91  5:59p            KUNI0722.U00              PAGE 15

658
659                  22 : begin
660                          State2^[I,J].Value := TempWeight;
661                          State2^[I,J].WType := TWeightType;
662                          Bak2^[I,J] := State2^[I,J].Value;
663                        end;
664
665                  23 : begin
666                          State3^[I,J].Value := TempWeight;
667                          State3^[I,J].WType := TWeightType;
668                          Bak3^[I,J] := State3^[I,J].Value;
669                        end;
670               end;
671            end;
672         writeln('Network weights read from COMMON.NET.');
673
674         { write label information to temporary file }
675         assign(TempFile,'TEMP.TXT');
676         rewrite(Tempfile);
677         while not eof(Common) do
678           begin
679             readln(Common, TempStr);
680             writeln(TempFile, TempStr);
681           end;
682
683         close(TempFile);
684         close(Common);
685       end
686     else
687       begin
688         NumLinks := 0;
689         { assign weight types to variable for state arrays }
690         for I := 1 to IN_ARRAY_SIZE do
691           for J := 1 to MID_ARRAY_SIZE do
692             begin
693               State1^[I,J].WType := Variable;
694               State1^[I,J].Value := 0;
695               Bak1^[I,J] := 0;
696               { initialize NumLinks }
697               NumLinks := NumLinks + 1;
698             end;
699
700         for I := 1 to MID_ARRAY_SIZE do
701           for J := 1 to MID_ARRAY_SIZE do
702             if I > J then
703               begin
704                 State2^[I,J].WType := Variable;
705                 State2^[I,J].Value := 0;
706                 Bak2^[I,J] := 0;
```

```
22JUL91  5:59p            KUNI0722.U00             PAGE 16

707                    { initialize NumLinks }
708                      NumLinks := NumLinks + 1;
709                    end;
710
711            for I := 1 to MID_ARRAY_SIZE do
712              for J := 1 to OUT_ARRAY_SIZE do
713                begin
714                  State3^[I,J].WType := Variable;
715                  State3^[I,J].Value := 0;
716                  Bak3^[I,J] := 0;
717                  { initialize NumLinks }
718                  NumLinks := NumLinks + 1;
719                end;
720              writeln(NumLinks:5,' network weights initialized to 0.');
721
722            { write dummy label information to temporary file }
723            assign(TempFile,'TEMP.TXT');
724            rewrite(Tempfile);
725            close(TempFile);
726          end;
727
728
729      { initialize INPUT patterns }
730      for J := 1 to IN_ARRAY_SIZE do
731        begin
732          Squeeze(J,M,N,X_IN_DIMENSION,Y_IN_DIMENSION);
733
734          { zero all INPUT patterns }
735          for K := 1 to MAX_PATTS do
736            InMem[K].Input[M,N] := 0;
737
738          State1^[J,0].Value := 0;
739        end;
740
741      { initialize INTERNAL patterns }
742      for J := 1 to MID_ARRAY_SIZE do
743        begin
744          Squeeze(J,M,N,X_MID_DIMENSION,Y_MID_DIMENSION);
745
746          { load INTERNAL pattern randomly with 0 or 1 }
747          MidMem[M,N].State := Round(Random(2));
748          MidMem[M,N].Activation := 0;
749          State1^[0,J].Value := MidMem[M,N].State;
750          State2^[J,0].Value := MidMem[M,N].State;
751          State2^[0,J].Value := MidMem[M,N].State;
752          State3^[J,0].Value := MidMem[M,N].State;
753        end;
754
755      { initialize OUTPUT patterns }
```

```
22JUL91  5:59p          KUNI0722.U00           PAGE 17

756        for J := 1 to OUT_ARRAY_SIZE do
757            begin
758               Squeeze(J,M,N,X_OUT_DIMENSION,Y_OUT_DIMENSION);
759
760               { zero all IDEAL patterns }
761               for K := 1 to MAX_PATTS do
762                  InMem[K].Ideal[M,N] := 0;
763
764               { load OUTPUT pattern randomly with 0 or 1 }
765               OutMem[M,N].State      := Round(Random(2));
766               OutMem[M,N].Activation := 0;
767               State3^[0,J].Value     := OutMem[M,N].State;
768
769            end;
770
771     ReadDat;
772     writeln('There were ',Patt_Num-1:4,' data groups read from DATA.SET');
773     Patt_Num := 1;
774
775     Max_Goal := 0;
776
777     for I := 1 to X_OUT_DIMENSION do
778        for J := 1 to Y_OUT_DIMENSION do
779           for K := 1 to NUM_PATTS do
780              if (I - 1) * Y_OUT_DIMENSION + J <= OUT_ARRAY_SIZE then
781                 Max_Goal := Max_Goal + InMem[K].Ideal[I,J];
782
783     E_Goal := OUT_ARRAY_SIZE * NUM_PATTS * 100;
784     Low_Goal := E_Goal;
785     P_Goal := E_Goal;
786     Low_PGoal := P_Goal;
787
788  end; { procedure }
789
790  {--------------------------------------------------------------------}
791
792  begin { main program }
793  { the main program is not structured to reduce the number of subprogram
794     calls and increase execution efficiency }
795
796     Assign(DataSet, 'DATA.SET');
797     Assign(Results, 'RESULTS.DAT');
798     rewrite(Results);
799     writeln(Results,'   Cycles  NumHits  Hitsum    TotError   Rewards');
800
801     Initialize;
802
```

```
22JUL91 5:59p              KUNI0722.U00           PAGE 18

803       while not Finished do
804         begin
805
806           HitSum := 0;
807           TotError := 0;
808           Tot_Noise := 0;
809           NumHits := 0;
810           TotOutError := 0;
811           TotalCFs := 0;
812           MAE := 0;
813
814           { initialize hit array }
815           for I := 1 to MAX_PATTS do
816             for J := 1 to OUT_ARRAY_SIZE do
817               Hit_Array[I,J] := 0;
818
819           { zero weight correlators }
820           for I := 1 to IN_ARRAY_SIZE do
821             for J := 1 to MID_ARRAY_SIZE do
822               State1^[I,J].Hits := 0;
823
824           for I := 1 to MID_ARRAY_SIZE do
825             for J := 1 to MID_ARRAY_SIZE do
826               State2^[I,J].Hits := 0;
827
828           for I := 1 to MID_ARRAY_SIZE do
829             for J := 1 to OUT_ARRAY_SIZE do
830               State3^[I,J].Hits := 0;
831
832           { cycle through each pattern }
833           for Patt_Num := 1 to NUM_PATTS do
834             begin
835
836               if Patt_Num = 1 then
837                 Add_Noise := true
838               else
839                 Add_Noise := false;
840
841               for I := 1 to X_IN_DIMENSION do
842                 for J := 1 to Y_IN_DIMENSION do
843                   case InMem[Patt_Num].Input[I,J] of
844                     1 : State1^[(I-1) * Y_IN_DIMENSION + J,0].Value := 1;
845                     0 : State1^[(I-1) * Y_IN_DIMENSION + J,0].Value := 0;
846                   end;
847
848               Changed := false;
849
850               for J := 1 to MID_ARRAY_SIZE do
851                 begin
```

```
22JUL91  5:59p        KUNI0722.U00           PAGE 19

852
853              Squeeze(J,M,N,X_MID_DIMENSION,Y_MID_DIMENSION);
854              OldState := MidMem[M,N].State;
855
856              { combining function - state array 1 }
857              if (MidMem[M,N].NodeType =2) or (MidMem[M,N].NodeType =3) then
858                Sumout := 100
859              else
860                Sumout := 0;
861
862              for I := 1 TO IN_ARRAY_SIZE DO
863                if State1^[I,J].WType <> Nonexistent then
864                  begin
865
866                    { add noise once per cycle if variable weight }
867                    if (Add_Noise) and (State1^[I,J].WType = Variable) then
868                      Diff := State1^[I,J].Value +
869                              Round(State1^[I,J].NoiseFactor *
870                              (Random(2 * Hi_Noise + 1) - Hi_Noise))
871                    else
872                      Diff := Bak1^[I,J];
873
874                    if State1^[I,J].WType = Variable then
875                      Bak1^[I,J] := Min(Max(Diff,0),100);
876
877                    NewCF := (State1^[I,0].Value * Bak1^[I,J]);
878
879                    { perform different summation for each type of node }
880                    case MidMem[M,N].NodeType of
881
882                      { regular type node }
883                      1 : begin
884                            { no need to go any further if new CF = 0 }
885                            if NewCF <> 0 then
886                              begin
887                                { if both are non-negative }
888                                if (Sumout >= 0) and (NewCF > 0) then
889                                  Sumout := Sumout +
890                                            ( ((100-Sumout) * NewCF) div 100)
891
892                                { if both are negative }
893                                else if (Sumout < 0) and (NewCF < 0) then
894                                  Sumout := -1 * ((-1 * Sumout) +
895                                            ( ((100+Sumout) * (-1 * NewCF)) div 100))
```

```
22JUL91 5:59p          KUNI0722.U00          PAGE 20

896
897                              { one must be negative and the other must
898                                be non-negative }
899                              else if ((Sumout <= 0) and (NewCF > 0)) or
900                                      ((Sumout >= 0) and (NewCF < 0))  then
901                                begin
902                                  Temp := Min( abs(Sumout), abs(NewCF) );
903
904                                  { they still don't allow division by
905                                    zero }
906                                  if Temp = 100 then
907                                    Sumout:= (Sumout + NewCF)
908                                  else
909                                    Sumout:= (Sumout + NewCF) *
910                                            (100 div (100 - Temp));
911                                end;
912                            end;
913                         end;
914
915                    { conjunction node }
916                    2 : if NewCF >= Threshold then
917                          Sumout := Min(Sumout, NewCF)
918                        else
919                          Sumout := 0;
920
921                    { unknown type node }
922                    3 : if NewCF >= Threshold then
923                          Sumout := 0;
924
925                    { negation node }
926                    4 : if NewCF < Threshold then
927                          Sumout := 100;
928
929                  end; { case }
930                end;
931
932          { combining function - state array 2 }
933          for I := 1 TO MID_ARRAY_SIZE DO
934            if State2^[I,J].WType <> Nonexistent then
935              begin
936
937                { add noise once per cycle if variable weight }
938                if (Add_Noise) and (State2^[I,J].WType = Variable) then
```

```
22JUL91 5:59p            KUNI0722.U00           PAGE 21
939                    Diff := State2^[I,J].Value +
940                            Round(State2^[I,J].NoiseFactor *
941                            (Random(2 * Hi_Noise + 1) - Hi_Noise))
942                  else
943                    Diff := Bak2^[I,J];
944
945                  Tmp := I - 1;
946                  K := Trunc(Tmp / Y_MID_DIMENSION) + 1;
947                  L := Round(Frac(Tmp / Y_MID_DIMENSION) *
948                                   Y_MID_DIMENSION) + 1;
949
950                  if State2^[I,J].WType = Variable then
951                    Bak2^[I,J] := Min(Max(Diff,0),100);
952
953                  NewCF := (MidMem[K,L].Activation * State2^[I,0].Value *
954                            Bak2^[I,J]) div 100;
955
956                  { perform different summation for each type of node }
957                  case MidMem[M,N].NodeType of
958                    { regular type node }
959                    1 : begin
960                        { no need to go any further if new CF = 0 }
961                        if NewCF <> 0 then
962                          begin
963                            { if both are non-negative }
964                            if (Sumout >= 0) and (NewCF > 0) then
965                              Sumout := Sumout +
966                                        ( ((100-Sumout) * NewCF) div 100)
967
968                            { if both are negative }
969                            else if (Sumout < 0) and (NewCF < 0) then
970                              Sumout := -1 * ((-1 * Sumout) +
971                                ( ((100+Sumout) * (-1 * NewCF)) div 100))
972
973                            { one must be negative and the other must be
974                              non-negative }
975                            else if ((Sumout <= 0) and (NewCF > 0)) or
976                                    ((Sumout >= 0) and (NewCF < 0))  then
977                              begin
978                                Temp := Min( abs(Sumout), abs(NewCF) );
```

```
979
980                              { they still don't allow division by
981                                zero }
982                              if Temp = 100 then
983                                  Sumout:= (Sumout + NewCF)
984                              else
985                                  Sumout:= (Sumout + NewCF) *
986                                           (100 div (100 - Temp));
987                        end;
988                     end;
989                  end;
990
991
992              { conjunction node }
993              2 : if NewCF >= Threshold then
994                     Sumout := Min(Sumout, NewCF)
995                  else
996                     Sumout := 0;
997
998              { unknown type node }
999              3 :;
1000
1001             { negation node }
1002             4 : if NewCF < Threshold then
1003                     Sumout := 100;
1004
1005            end; { case }
1006         end;
1007
1008      { compute activation function }
1009
1010      if Sumout >= Threshold then
1011         begin    { if over thresh then change to 1 }
1012           { change state of cell in all locations }
1013           MidMem[M,N].State := 1;
1014           MidMem[M,N].Activation := Sumout;
1015           State1^[0,J].Value := 1;
1016           State2^[J,0].Value := 1;
1017           State2^[0,J].Value := 1;
1018           State3^[J,0].Value := 1;
1019         end
1020      else
1021         begin    { if not over thresh then change to 0 }
1022           MidMem[M,N].State := 0;
1023           MidMem[M,N].Activation := 0;
1024           State1^[0,J].Value := 0;
1025           State2^[J,0].Value := 0;
1026           State2^[0,J].Value := 0;
```

```
22JUL91 5:59p         KUNI0722.U00           PAGE 23

1027                    State3^[J,0].Value := 0;
1028                  end;
1029
1030              if OldState <> MidMem[M,N].State then
1031                Changed := true;
1032
1033          end;
1034
1035      while Changed do
1036        begin
1037          Changed := false;
1038          for J := 1 to MID_ARRAY_SIZE do
1039            begin
1040
1041              Squeeze(J,M,N,X_MID_DIMENSION,Y_MID_DIMENSION);
1042              OldState := MidMem[M,N].State;
1043
1044              { combining function - state array 1 }
1045              if (MidMem[M,N].NodeType = 2) or
1046                 (MidMem[M,N].NodeType = 3) then
1047                Sumout := 100
1048              else
1049                Sumout := 0;
1050
1051              for I := 1 TO IN_ARRAY_SIZE DO
1052                if State1^[I,J].WType <> Nonexistent then
1053                  begin
1054
1055                    Diff := Bak1^[I,J];
1056                    if State1^[I,J].WType = Variable then
1057                      Bak1^[I,J] := Min(Max(Diff,0),100);
1058                    NewCF := (State1^[I,0].Value * Bak1^[I,J]);
1059
1060                    { perform different summation for each type of node }
1061                    case MidMem[M,N].NodeType of
1062
1063                      { regular type node }
1064                      1 : begin
1065                            { no need to go any further if new CF = 0 }
1066                            if NewCF <> 0 then
1067                              begin
1068                                { if both are non-negative }
1069                                if (Sumout >= 0) and (NewCF > 0) then
1070                                  Sumout := Sumout +
1071                                    ( ((100-Sumout) * NewCF) div 100)
```

```
22JUL91  5:59p           KUNI0722.U00           PAGE 24

1072
1073                              { if both are negative }
1074                              else if (Sumout < 0) and (NewCF < 0) then
1075                                Sumout := -1 * ((-1 * Sumout) +
1076                                                ( ((100+Sumout) *
1077                                                   (-1 * NewCF)) div 100))
1078
1079                              { one must be negative and the other
1080                                must be non-negative }
1081                              else if ((Sumout <= 0) and (NewCF > 0))
1082                                      or ((Sumout >= 0)
1083                                      and (NewCF < 0))   then
1084                                begin
1085                                  Temp := Min( abs(Sumout),
1086                                               abs(NewCF) );
1087
1088                                  { they still don't allow division by
1089                                    zero }
1090                                  if Temp = 100 then
1091                                    Sumout:= (Sumout + NewCF)
1092                                  else
1093                                    Sumout:= (Sumout + NewCF) *
1094                                             (100 div (100 - Temp));
1095                                end;
1096                            end;
1097                         end;
1098
1099                    { conjunction node }
1100                    2 : if NewCF >= Threshold then
1101                          Sumout := Min(Sumout, NewCF)
1102                        else
1103                          Sumout := 0;
1104
1105                    { unknown type node }
1106                    3 : if NewCF >= Threshold then
1107                          Sumout := 0;
1108
1109                    { negation node }
1110                    4 : if NewCF < Threshold then
1111                          Sumout := 100;
1112
1113                  end; { case }
1114                end;
```

```
22JUL91 5:59p          KUN10722.U00           PAGE 25
1115
1116              { combining function - state array 2 }
1117              for I := 1 TO MID_ARRAY_SIZE DO
1118                if State2^[I,J].WType <> Nonexistent then
1119                  begin
1120
1121                    Diff := Bak2^[I,J];
1122                    Tmp := I - 1;
1123                    K := Trunc(Tmp / Y_MID_DIMENSION) + 1;
1124                    L := Round(Frac(Tmp / Y_MID_DIMENSION) *
1125                              Y_MID_DIMENSION) + 1;
1126                    if State2^[I,J].WType = Variable then
1127                      Bak2^[I,J] := Min(Max(Diff,0),100);
1128                    NewCF := (MidMem[K,L].Activation *
1129                              State2^[I,0].Value *
1130                              Bak2^[I,J]) div 100;
1131
1132                    { perform different summation for each type of node }
1133                    case MidMem[M,N].NodeType of
1134                      { regular type node }
1135                      1 : begin
1136                          { no need to go any further if new CF = 0 }
1137                          if NewCF <> 0 then
1138                            begin
1139                              { if both are non-negative }
1140                              if (Sumout >= 0) and (NewCF > 0) then
1141                                Sumout := Sumout + ( ((100-Sumout) *
1142                                          NewCF) div 100)
1143
1144                              { if both are negative }
1145                              else if (Sumout < 0) and (NewCF < 0) then
1146                                Sumout := -1 * ((-1 * Sumout) +
1147                                                ( ((100+Sumout) *
1148                                                  (-1 * NewCF)) div 100))
1149
1150                              { one must be negative and the other
1151                                must be non-negative }
1152                              else if ((Sumout <= 0) and (NewCF > 0))
1153                                      or ((Sumout >= 0)
1154                                          and (NewCF < 0))  then
1155                                begin
```

```
22JUL91 5:59p           KUNI0722.U00            PAGE 26

1156                            Temp := Min( abs(Sumout),
1157                                          abs(NewCF) );
1158
1159                            { nope, not yet }
1160                            if Temp = 100 then
1161                               Sumout:= (Sumout + NewCF)
1162                            else
1163                               Sumout:= (Sumout + NewCF) *
1164                                        (100 div (100 - Temp));
1165                        end;
1166                    end;
1167                 end;
1168
1169           { conjunction node }
1170           2 : if NewCF >= Threshold then
1171                  Sumout := Min(Sumout, NewCF)
1172               else
1173                  Sumout := 0;
1174
1175           { unknown type node }
1176           3 : if NewCF >= Threshold then
1177                  Sumout := 0;
1178
1179           { negation node }
1180           4 : if NewCF < Threshold then
1181                  Sumout := 100;
1182
1183         end; { case }
1184       end;
1185
1186   { compute activation function }
1187
1188   if Sumout >= Threshold then
1189      begin   { if over thresh then change to 1 }
1190         { change state of cell in all locations }
1191         MidMem[M,N].State := 1;
1192         MidMem[M,N].Activation := Sumout;
1193         State1^[0,J].Value := 1;
1194         State2^[J,0].Value := 1;
1195         State2^[0,J].Value := 1;
1196         State3^[J,0].Value := 1;
1197      end
1198   else
1199      begin   { if not over thresh then change to 0 }
1200         MidMem[M,N].State := 0;
1201         MidMem[M,N].Activation := 0;
1202         State1^[0,J].Value := 0;
1203         State2^[J,0].Value := 0;
```

```
22JUL91 5:59p              KUNI0722.U00              PAGE 27

1204                          State2^[0,J].Value := 0;
1205                          State3^[J,0].Value := 0;
1206                       end;
1207
1208                  if OldState <> MidMem[M,N].State then
1209                     Changed := true;
1210               end;
1211            end;
1212
1213         for J := 1 to OUT_ARRAY_SIZE do
1214            Action2(J, Add_Noise);  { activation of output pattern }
1215
1216         CheckHits;
1217
1218         { total number of correct output units }
1219         NumHits := NumHits + TotHits;
1220
1221         { total error of CF's for nodes on correct side of threshold }
1222         TotOutError := TotOutError + TotOutErr;
1223
1224         { Total number of correct CFs }
1225         TotalCFs := TotalCFs + TotCFs;
1226
1227         { modify Hebbian weight correlators }
1228         for I := 1 to IN_ARRAY_SIZE do
1229            for J := 1 to MID_ARRAY_SIZE do
1230               if State1^[I,0].Value = State1^[0,J].Value then
1231                  if State1^[I,J].Value > 0 then
1232                     State1^[I,J].Hits := State1^[I,J].Hits + 1;
1233
1234         for I := 1 to MID_ARRAY_SIZE do
1235            for J := 1 to MID_ARRAY_SIZE do
1236               if State2^[I,0].Value = State2^[0,J].Value then
1237                  if State2^[I,J].Value > 0 then
1238                     State2^[I,J].Hits := State2^[I,J].Hits + 1;
1239
1240         for I := 1 to MID_ARRAY_SIZE do
1241            for J := 1 to OUT_ARRAY_SIZE do
1242               if State3^[I,0].Value = State3^[0,J].Value then
1243                  if State3^[I,J].Value > 0 then
1244                     State3^[I,J].Hits := State3^[I,J].Hits + 1;
1245
1246         end; { end of 1 pattern }
1247
1248         Teach;
1249
1250         if Line > 20 then
1251            begin
1252               Line := 1;
```

```
22JUL91 5:59p              KUNI0722.U00              PAGE 28

1253          ClrScr;
1254          writeln('Cycles ----Hits----    Error ---EGoal---    Rew',
1255                  '  Env  CorrCFs  MAE');
1256          writeln('_____',
1257                  '_____');
1258        end;
1259
1260      MAE := TotError / (100 * NUM_PATTS * OUT_ARRAY_SIZE);
1261
1262      if E_Goal < Low_Goal then
1263        begin
1264          writeln(Results, Cycles:8, NumHits:8, Hitsum:8,'  ',
1265                  TotError:8,' ',Rewards:8,'  ',MAE:6:4);
1266          append(Results);
1267
1268          Low_Goal := E_Goal;
1269          WriteCommon;
1270        end;
1271
1272      if P_Goal < Low_PGoal then
1273        Low_PGoal := P_Goal;
1274
1275      if NumHits > Hi_Hits then
1276        Hi_Hits := NumHits;
1277
1278
1279      writeln(Cycles:5,' (',NumHits:5,',',Hi_Hits:5,')   ',
1280              TotError:5,  ' (',E_Goal:5,',',Low_Goal:5,') ',
1281              Rewards:5,' ',Hi_Noise:5,' ',TotalCFs:5,' ',MAE:6:4);
1282
1283      Line := Line + 1;
1284
1285      { original MAE is .2360 }
1286      if MAE < 0.0236 then
1287        Finished := True;
1288
1289    end; { while }
1290
1291    writeln('Finished.');
1292    readln;
1293  end.
1294
1295  {---------------------------------------------------------------}
```

APPENDIX III

Pascal Program for
Translating an Expert System Rule Base
to an Artificial Neural Network

```
22JUL91  6:27p           KUNI0722.U01              PAGE  1

1  Date:     Mon Jul 22, 1991  7:13 pm  GMT
 2  Source-Date: Mon, 22 Jul 91 14:48:15 -0400
 3  From:     david kuncicky
 4            EMS: INTERNET / MCI ID: 376-5414
 5            MBX: kuncick@nu.cs.fsu.edu
 6
 7  TO:       * D.C. Toedt / MCI ID: 421-9132
 8  Message-Id: 10910722191301/0003765414NB2EM
 9  Source-Msg-Id: <9107221848.AA01318@nu.cs.fsu.edu>
10
11  Program Translator (input, output, infile, outfile);
12
13  uses   Crt;
14
15  const  DEBUG = false;
16         MAXRULES = 300;
17         NODE_ARRAY_SIZE = 100;
18         DEFAULT_STRENGTH = 100;
19         STACK_SIZE = 25;
20         MAX_TOKENS = 25;
21         NUM_NODE_TYPES = 4;    { regular = 1,
22                                  conjunction = 2,
23                                  unknown = 3
24                                  not = 4 }
25
26  type   Str255 = string[255];
27         Str160 = string[160];
28         Str11  = string[11];
29         Bool = 0..1;
30         WeightType = (Variable, Fixed, Nonexistent);
31         Weight = -100..100;
32
33         WeightRec = record
34                   Value : Weight;
35                   WType : WeightType;
36                 end;
37
38         StateArray = array[1..NODE_ARRAY_SIZE,1..NODE_ARRAY_SIZE] of WeightRec;
39         StatePtr = ^StateArray;
40
41         RuleRec = record
42                   Antecedent : Str255;
43                   AnteType   : 1..NUM_NODE_TYPES;
44                   Consequent : Str255;
45                   Strength   : integer;   { implication strength }
46                   Ante_Used  : boolean;   { true if a node has been
47                                             created with antecedent }
48                   Cons_Used  : boolean;   { true if a node has been
```

```
22JUL91 6:27p            KUNI0722.U01              PAGE  2

49                                    created with consequent }
50              end;
51
52      RuleRecPtr = ^RuleRec;
53      RuleArray = array[1..MAXRULES] of RuleRecPtr;
54      RulePtr = ^RuleArray;
55
56      { nodetype key    1 = 'regular' node
57                        2 = 'conjunction' node
58                        3 = 'unknown' node
59                        4 = 'not' node
60      }
61
62      NodeRec = record
63              State      : Bool;
64              NameCode   : integer;
65              Activation : integer;
66              NodeType   : 1..NUM_NODE_TYPES;
67              end;
68      NodeArray = array[1..NODE_ARRAY_SIZE] of NodeRec;
69
70      TreePtr = ^TreeRec;
71      TreeRec = record
72              Name  : Str255;
73              Left  : TreePtr;
74              Right : TreePtr;
75              end;
76
77  var  I : integer;
78
79      TempStr : Str255;
80      FileStr : Str11;
81
82      Stack : array[1..STACK_SIZE] of Str255;
83      StackPtr : integer;
84
85      Token : array[1..MAX_TOKENS] of Str255;
86      TokenNum : integer;
87
88      Root : TreePtr;
89
90      Rules : RulePtr;
91
92      InArray,
93      MidArray,
94      OutArray : NodeArray;
95
96      InputRules,           { number of rules in input file }
97      NumRules,             { number of rules output - dups for 'or' }
```

```
22JUL91 6:27p          KUNI0722.U01              PAGE 3

98          NumINodes,              { number of input nodes created }
 99          NumMNodes,              { number of middle layer nodes created }
100          NumONodes : integer;    { number of output nodes created }
101
102       Infile, DebugFile, CommonFile : text;
103       RuleFile : file of RuleRec;
104       RuleList : text;
105       NodeFile : file of NodeArray;
106
107       State12,
108       State22,
109       State23    : StatePtr;
110       WeightFile : file of StateArray;
111
112       SizeFile : file of integer;
113
114   {-------------------------------------------------------------------}
115
116   function Max(I, J : integer) : integer;
117
118   begin
119     if I > J then
120       Max := I
121     else
122       Max := J;
123   end;
124
125   {-------------------------------------------------------------------}
126
127   procedure Initialize;
128
129     var I, J : integer;
130
131   begin
132     { allocate space for rules }
133     New(Rules);
134
135     NumRules := 0;
136     InputRules := 0;
137     NumINodes := 0;
138     NumMNodes := 0;
139     NumONodes := 0;
140
141     { initialize rule array }
142     for I := 1 to MAXRULES do
143       begin
```

```
22JUL91  6:27p           KUNI0722.U01           PAGE  4

144
145         New(Rules^[I]);
146
147         for J := 1 to 255 do
148           begin
149             Rules^[I]^.Antecedent[J] := ' ';
150             Rules^[I]^.Consequent[J] := ' ';
151           end;
152
153         Rules^[I]^.Ante_Used := false;
154         Rules^[I]^.AnteType := 1;
155         Rules^[I]^.Cons_Used := false;
156         Rules^[I]^.Strength := 0;
157       end;
158
159     { initialize nodes }
160     for I := 1 to NODE_ARRAY_SIZE do
161       begin
162         InArray[I].State := 0;
163         InArray[I].NameCode := 0;
164         InArray[I].NodeType := 1;
165         MidArray[I].State := 0;
166         MidArray[I].NameCode := 0;
167         MidArray[I].NodeType := 1;
168         OutArray[I].State := 0;
169         OutArray[I].NameCode := 0;
170         OutArray[I].NodeType := 1;
171       end;
172
173   end;
174
175  {---------------------------------------------------------------------------}
176
177  procedure Error (ErrorNum : integer);
178  { error handling routine, prints message then halts }
179    begin
180      ClrScr;
181      GotoXY(3,1);
182      write('ERROR # ',ErrorNum,' - ');
183
184      case ErrorNum of
185        0 : writeln('Input file ',FileStr,' does not exist');
186        1 : writeln('Link cannot be made, node not found, procedure MakeLink.');
187        2 : writeln('Link cannot be made, too many nodes found, procedure MakeLink.');
188        3 : writeln('Consequent not found for rule number ',NumRules : 3);
189        4 : writeln('Attempted to make illegal link, procedure MakeLink');
```

```
22JUL91 6:27p          KUNI0722.U01         PAGE 5

190        5 : writeln('Invalid certainty factor');
191        6 : writeln('Parentheses do not match');
192        7 : writeln('Stack overflow');
193        8 : writeln('Stack underflow');
194        9 : writeln('Illegal token');
195      else
196        writeln('Unspecified error');
197      end;
198
199      Halt;
200    end;
201
202  {---------------------------------------------------------------}
203
204  procedure Push(Str : Str255);
205
206    begin
207      if StackPtr >= STACK_SIZE then
208        Error(7)
209      else
210        StackPtr := StackPtr + 1;
211
212      Stack[StackPtr] := Str;
213    end;
214
215  {---------------------------------------------------------------}
216
217  function Pop : Str255;
218
219    begin
220      if StackPtr = 0 then
221        Error(8)
222      else
223        begin
224          Pop := Stack[StackPtr];
225          StackPtr := StackPtr - 1;
226        end;
227    end;
228
229  {---------------------------------------------------------------}
230
231  function EmptyStack : boolean;
232    begin
233      If StackPtr = 0 then
234        EmptyStack := true
235      else
```

```
22JUL91 6:27p            KUNI0722.U01           PAGE  6

236          EmptyStack := false;
237       end;
238
239   {--------------------------------------------------------------------}
240
241   function LastChar(TempStr : str255) : char;
242
243     var I : integer;
244
245     begin
246       I := Length(TempStr);
247       while (I <> 0) and (TempStr[I] = ' ') do
248         I := I - 1;
249
250       if I = 0 then
251         LastChar := TempStr[I]
252       else
253         LastChar := ' ';
254     end;
255
256   {--------------------------------------------------------------------}
257
258   function IntoStr(I, Dec : integer) : string;
259
260     var s: string[6];
261
262     begin
263       Str(i:Dec, s);
264       IntoStr := s;
265     end;
266
267   {--------------------------------------------------------------------}
268
269     function Min(I,J : integer) : integer;
270
271       begin
272         if I < J then
273           Min := I
274         else
275           Min := J;
276       end;
277
278   {--------------------------------------------------------------------}
279
280   function LeftTrim(InStr : Str255) : Str255;
```

```
22JUL91  6:27p           KUNI0722.U01              PAGE  7

281  { trims all leading blanks from a string }
282
283    var  Tstr : Str255;
284         N : integer;
285
286    begin
287      Tstr := InStr;
288      while copy(Tstr,1,1) = ' ' do
289        Delete(Tstr,1,1);
290      LeftTrim := Tstr;
291    end;
292
293  {--------------------------------------------------------------------}
294
295  function NoDups(Str1,Str2 : Str255; NewNodeType : integer) : boolean;
296
297    var I : integer;
298
299    begin
300      NoDups := true;
301
302      for I := 1 to NumRules do
303        if (Rules^[I]^.Antecedent = Str1) and
304           (Rules^[I]^.Consequent = Str2) then
305          begin
306            NoDups := false;
307            if NewNodeType <> 0 then
308              Rules^[I]^.AnteType := NewNodeType;
309          end;
310    end;
311
312  {--------------------------------------------------------------------}
313
314  procedure ReplaceCF(Str1,Str2 : Str255; NewCF : integer);
315
316    var I : integer;
317
318    begin
319      for I := 1 to NumRules do
320        if (Rules^[I]^.Antecedent = Str1) and
321           (Rules^[I]^.Consequent = Str2) then
322          Rules^[I]^.Strength := NewCF;
323  writeln(NewCF);
324  readln;
325    end;
326
327  {--------------------------------------------------------------------}
```

```
22JUL91  6:27p          KUNI0722.U01           PAGE  8

328
329  function Trim(InStr : Str255) : Str255;
330  { trims all trailing blanks from a string }
331
332    var  Tstr : Str255;
333         N : integer;
334
335    begin
336      N := Length(InStr);
337      while copy(InStr,N,1) = ' ' do
338        N := N - 1;
339      Trim := copy(InStr,1,N);
340    end;
341
342  {--------------------------------------------------------------------------}
343
344  procedure TrimRules;
345  { trim all rules so matching strings are of same length }
346
347    var I : integer;
348
349    begin
350      for I := 1 to NumRules do
351        begin
352          Rules^[I]^.Antecedent := Trim(LeftTrim(Rules^[I]^.Antecedent));
353          Rules^[I]^.Consequent := Trim(LeftTrim(Rules^[I]^.Consequent));
354          Rules^[I]^.Cons_Used := false; { re-initialize all Cons_Used }
355        end;
356    end;
357
358  {--------------------------------------------------------------------------}
359
360  procedure Replicate(Ch : char; Num : integer);
361  { replicates input character Num times to standard output }
362    var 1 : integer;
363
364    begin
365      for 1 := 1 to Num do
366        write(Ch);
367    end;
368
369  {--------------------------------------------------------------------------}
370
371  procedure DisplayRule(RuleNum : integer);
372
373    begin
```

```
374      writeln('Rule number: ',RuleNum : 3);
375      writeln('Antecedent: ',Rules^[RuleNum]^.Antecedent);
376      writeln('Consequent: ',Rules^[RuleNum]^.ConSequent);
377      Replicate(Chr(196),79);
378      readln;
379    end;
380
381  {----------------------------------------------------------------------}
382
383  function Parenths_Check(Start : integer; TempStr : str255) : boolean;
384
385    var I,Count, Last_Parenths : integer;
386
387    begin
388      I := Length(TempStr);
389      while (I <> 0) and (TempStr[I] <> ')') do
390        I := I - 1;
391      Last_Parenths := I;
392
393      Count := 0;
394      I := Start;
395
396      while I <= Length(TempStr) do
397        begin
398          I := I + 1;
399          if TempStr[I] = '(' then
400            Count := Count + 1;
401          if TempStr[I] = ')' then
402            Count := Count - 1;
403        end;
404
405      if Count = 0 then
406        Parenths_Check := true
407      else
408        Parenths_Check := false;
409
410    end;
411
412  {----------------------------------------------------------------------}
413
414  function Parenths_Check2(TempStr : str255) : boolean;
415
416    var I,Count, Last_Parenths : integer;
417        ZeroFlag : boolean;
418
419    begin
420      I := Length(TempStr);
```

```
22JUL91 6:27p           KUNI0722.U01            PAGE 10

421       while (I <> 0) and (TempStr[I] <> ')') do
422         I := I - 1;
423       Last_Parenths := I;
424
425       Count := 0;
426       I := 0;
427       ZeroFlag := false;
428
429       while (not ZeroFlag) and (I <= Length(TempStr)) do
430         begin
431           I := I + 1;
432           if TempStr[I] = '(' then
433             Count := Count + 1;
434           if TempStr[I] = ')' then
435             begin
436               Count := Count - 1;
437               if Count = 0 then
438                 ZeroFlag := true;
439             end;
440         end;
441
442       if Last_Parenths = I then
443         Parenths_Check2 := true
444       else
445         Parenths_Check2 := false;
446
447    end;
448
449
450    {---------------------------------------------------------------------}
451
452    function Upper(InStr : Str255) : Str255;
453    { returns uppercase alpha of input string }
454      var     I : integer;
455          TempStr : Str255;
456
457    begin
458      for I := 1 to 255 do
459        case InStr[I] of
460          'a'..'z' : TempStr[I] := Chr(Ord(InStr[I])-32);
461        else
462          TempStr[I] := InStr[I];
463        end;
464    end;
465
466    {---------------------------------------------------------------------}
467
```

22JUL91 6:27p           KUNI0722.U01           PAGE 11

```
468  function FindRule : boolean;
469  { finds the beginning of a new rule by finding a new line beginning with
470    'rule-' }
471  { returns found or not found }
472
473    var LocalStr : Str255;
474        NotEndofRule : boolean;
475
476    begin
477
478      FindRule := false;
479
480      while (not eof(Infile)) do
481        begin
482          readln(Infile,LocalStr);
483          TempStr := LeftTrim(Trim(copy(LocalStr,pos(' if ',LocalStr)+2,255)));
484
485          if pos('rule-',LocalStr) = 1 then
486            begin
487              FindRule := true;
488              InputRules := InputRules + 1;
489
490              { read in rest of rule which should be terminated with a period }
491              if pos('.',LocalStr) = Length(LocalStr) then
492                NotEndofRule := false
493              else
494                NotEndofRule := true;
495              while NotEndofRule do
496                begin
497                  readln(Infile,LocalStr);
498                  TempStr := TempStr +' '+LeftTrim(Trim(LocalStr));
499                  if pos('.',LocalStr) = Length(LocalStr) then
500                    NotEndofRule := false;
501                end;
502              exit;
503            end;
504        end;
505    end;
506
507  {-------------------------------------------------------------------------}
508
509  procedure FindKeyWord(W, X, Y : integer; var Z : integer);
510    { find minimum non-zero argument from W, X, and Y }
511
512    begin
513      if W = 0 then
```

```
22JUL91 6:27p          KUNI0722.U01           PAGE 12

514        W := 256;
515      if X = 0 then
516        X := 256;
517      if Y = 0 then
518        Y := 256;
519      Z := Min(W, Min(X, Y));
520    end;
521
522  {--------------------------------------------------------------------------}
523
524  procedure ParseTokens(NumRules : integer);
525
526    var AnteStr, TempStr : Str255;
527        K, J, T_A, T_N, T_O, T_min : integer;
528        Ch : char;
529
530    begin
531      AnteStr := Rules^[NumRules]^.Antecedent; { get antecedent of current rule }
532
533      TokenNum := 0;
534      TempStr := '';
535      K := 1;
536
537      while K <= Length(AnteStr) do
538        begin
539          if copy(AnteStr,K,5) = ' and ' then
540            begin
541              if Length(TempStr) <> 0 then
542                begin
543                  TokenNum := TokenNum + 1;
544                  Token[TokenNum] := TempStr;
545                end;
546              TempStr := '';
547              TokenNum := TokenNum + 1;
548              Token[TokenNum] := 'and';
549              K := K + 4;
550            end
551          else if copy(AnteStr,K,4) = ' or ' then
552            begin
553              if Length(TempStr) <> 0 then
554                begin
555                  TokenNum := TokenNum + 1;
556                  Token[TokenNum] := TempStr;
557                end;
558              TempStr := '';
559              TokenNum := TokenNum + 1;
560              Token[TokenNum] := 'or';
```

```
561         K := K + 3;
562       end
563     else if copy(AnteStr,K,4) = 'not(' then
564       begin
565         if Length(TempStr) <> 0 then
566           begin
567             TokenNum := TokenNum + 1;
568             Token[TokenNum] := TempStr;
569           end;
570         TempStr := '';
571         TokenNum := TokenNum + 1;
572         Token[TokenNum] := 'not';
573         TokenNum := TokenNum + 1;
574         Token[TokenNum] := '(';
575         K := K + 3;
576       end
577     else if copy(AnteStr,K,1) = ')' then
578       begin
579         if Length(TempStr) <> 0 then
580           begin
581             TokenNum := TokenNum + 1;
582             Token[TokenNum] := TempStr;
583           end;
584         TempStr := '';
585         TokenNum := TokenNum + 1;
586         Token[TokenNum] := ')';
587       end
588     else
589       TempStr := LeftTrim(TempStr + AnteStr[K]);
590
591     K := K + 1;
592   end;
593
594   if Length(TempStr) <> 0 then
595     begin
596       TokenNum := TokenNum + 1;
597       Token[TokenNum] := Trim(LeftTrim(TempStr));
598     end;
599
600 end;
601
602 {---------------------------------------------------------------------}
603
604 function BuildLeft : TreePtr;
605   { build left child from stack - this function pops elements off
606     of the stack and places them into the parse tree }
607
608   var TempStr1, TempStr2 : Str255;
```

```
22JUL91  6:27p          KUNI0722.U01          PAGE 14

609        Current : TreePtr;
610        K : integer;
611
612     begin
613
614        { display stack
615        for K := 1 to StackPtr do
616          writeln(K:2,' ',Stack[K]);
617        readln; }
618
619        { nil case }
620        if EmptyStack then
621          BuildLeft := nil
622        else
623          { atomic case }
624          begin
625            TempStr1 := Pop;
626
627            { if 'not' is encountered then look for parenths and unary operator }
628            if TempStr1 = 'not' then
629              begin
630                New(Current);
631                Current^.Name := TempStr1;
632                TempStr1 := Pop;   { pop off the ')' }
633                Current^.Right := nil;
634                Current^.Left := BuildLeft;
635                BuildLeft := Current;
636                exit;
637              end;
638
639            { if stack is empty then this branch is atomic }
640            if EmptyStack then
641              begin
642                New(Current);
643                Current^.Name := TempStr1;
644                Current^.Left := nil;
645                Current^.Right := nil;
646                BuildLeft := Current;
647              end
648            else
649              { recursive case }
650              begin
651                TempStr2 := Pop;
652
653                if TempStr2 = 'or' then
654                  begin
655                    New(Current);
656                    Current^.Name := TempStr2;
```

```
657              New(Current^.Right);
658              Current^.Right^.Name := TempStr1;
659              Current^.Right^.Left := nil;
660              Current^.Right^.Right := nil;
661              Current^.Left := BuildLeft;
662              BuildLeft := Current;
663            end
664
665          else if TempStr2 = '(' then
666            begin
667              New(Current);
668              Current^.Name := TempStr1;
669              Current^.Right := nil;
670              Current^.Left  := nil;
671              BuildLeft := Current;
672            end
673
674          else
675            begin
676              writeln('error:', Tempstr2,'*');
677              readln;
678              Error(9);
679            end;
680         end;
681      end;
682   end;
683
684   {---------------------------------------------------------------------------}
685
686   function BuildNode(var CurrentToken : integer) : TreePtr;
687   { this function creates 'and' nodes, but pushes all other tokens onto
688     the stack for processing by BuildLeft }
689
690     var  Current : TreePtr;
691          K : integer;
692
693     begin
694       if CurrentToken > TokenNum then
695         BuildNode := BuildLeft            { no more tokens }
696       else
697         begin
698           if (copy(Token[CurrentToken],1,4)) = 'and' then
699             begin
700               New(Current);
701               Current^.Name  := Token[CurrentToken];
702               Current^.Left  := BuildLeft;
703               CurrentToken := CurrentToken + 1;
704               Current^.Right := BuildNode(CurrentToken);
```

```
22JUL91  6:27p            KUNI0722.U01              PAGE 16

705              BuildNode := Current;
706           end
707
708        else if (copy(Token[CurrentToken],1,3)) = 'or' then
709          begin
710            Push(Token[CurrentToken]);
711            CurrentToken := CurrentToken + 1;
712            BuildNode := BuildNode(CurrentToken);
713          end
714
715        else if (copy(Token[CurrentToken],1,4)) = 'not' then
716          begin
717            while Token[CurrentToken] <> ')' do
718              begin
719                CurrentToken := CurrentToken + 1;
720                Push(Token[CurrentToken]);
721              end;
722            Push('not');
723            CurrentToken := CurrentToken + 1;
724            BuildNode := BuildNode(CurrentToken);
725          end
726
727        else { must not be a keyword }
728          begin
729            Push(Token[CurrentToken]);
730            CurrentToken := CurrentToken + 1;
731            BuildNode := BuildNode(CurrentToken);
732          end;
733
734      end
735
736  end;
737
738  {-------------------------------------------------------------------------}
739
740  procedure BuildTree(RuleNum : integer);
741
742  var  I, K,
743       CurrentToken : integer;
744
745  begin
746
747    { display token list }
748    if DEBUG then
749      for K := 1 to TokenNum do
750        writeln('token ',K:3,' ',Token[K]);
751
752    Root := nil;      { initialize root of parse tree }
```

```
22JUL91  6:27p          KUNI0722.U01           PAGE 17

753      StackPtr := 0;      { initialize stack }
754      CurrentToken := 1; { initialize index into token array }
755
756      Mark(Root);
757      Root := BuildNode(CurrentToken);
758
759    end;
760
761  {---------------------------------------------------------------------------}
762
763  procedure TreeCopy(var Ptr1, Ptr2 : TreePtr);
764    { copies Ptr1 branch to Ptr2 branch }
765
766    var Current : TreePtr;
767
768    begin
769      if Ptr1 = nil then
770        Ptr2 := nil
771      else
772        begin
773          if Ptr2 = nil then
774            begin
775              New(Ptr2);
776              Ptr2^.Left := nil;
777              Ptr2^.Right := nil;
778            end;
779
780          Ptr2^.Name := Ptr1^.Name;
781          TreeCopy(Ptr1^.Left,  Ptr2^.Left);
782          TreeCopy(Ptr1^.Right, Ptr2^.Right);
783        end;
784    end;
785
786  {---------------------------------------------------------------------------}
787
788  procedure Distribute(Ptr : TreePtr);
789
790    var  Current,
791         TempPtr : TreePtr;
792
793    begin
794      { if this is an 'and' node }
795      if (Ptr^.Name = 'and') then
796        { if 'or'; is on right side then switch right and left branches }
797        if (Ptr^.Right^.Name = 'or') then
798          begin
799            TempPtr := Ptr^.Right;
```

```
22JUL91  6:27p              KUNI0722.U01          PAGE 18

800            Ptr^.Right := Ptr^.Left;
801            Ptr^.Left := TempPtr;
802          end;
803
804     { now if there is an 'or' child it is on the left }
805     if (Ptr^.Name = 'and') then
806        if (Ptr^.Left^.Name = 'or') then
807          begin
808            Ptr^.Name := 'or';
809            Ptr^.Left^.Name := 'and';
810            TempPtr := Ptr^.Left^.Right;
811            Ptr^.Left^.Right := nil;
812            TreeCopy(Ptr^.Right, Ptr^.Left^.Right);
813            New(Current);
814            Current^.Name := 'and';
815            Current^.Left := TempPtr;
816            Current^.Right := Ptr^.Right;
817            Ptr^.Right := Current;
818          end;
819
820     if Ptr^.Left <> nil then
821        Distribute(Ptr^.Left);
822
823     if Ptr^.Right <> nil then
824        Distribute(Ptr^.Right);
825
826   end;
827
828 {---------------------------------------------------------------------}
829
830 procedure ShowBranch(OffSet : integer; Ptr : TreePtr);
831
832   begin
833
834     { display branch of tree }
835     if Ptr = nil then
836       begin
837         writeln('branch: nil');
838         readln;
839       end
840     else
841       begin
842         Replicate(' ',OffSet);
843         writeln('branch: ',copy(Ptr^.Name,1,50));
844         readln;
845         OffSet := OffSet + 4;
846         Replicate(' ',OffSet);
847         ShowBranch(OffSet,Ptr^.Left);
```

```
22JUL91  6:27p              KUNI0722.U01           PAGE 19

848            Replicate(' ',OffSet);
849            ShowBranch(OffSet,Ptr^.Right);
850          end;
851      end;
852
853  {--------------------------------------------------------------------------}
854
855  function Make_Ante(Ptr : TreePtr) : Str255;
856
857    var  TempPtr : TreePtr;
858
859    begin
860
861      if Ptr <> nil then
862        if (Ptr^.Left = nil) and (Ptr^.Right = nil) then
863          Make_Ante := Trim(Ptr^.Name)
864
865        else if (Ptr^.Left = nil) and (Ptr^.Right <> nil) then
866          Make_Ante := Trim(Ptr^.Name)+' '+Make_Ante(Ptr^.Right)
867
868        else if (Ptr^.Left <> nil) and (Ptr^.Right = nil) then
869          Make_Ante := Trim(Ptr^.Name)+'('+Make_Ante(Ptr^.Left)+')'
870
871        else
872          Make_Ante := Make_Ante(Ptr^.Left)+' '+Ptr^.Name+' '
873                                           +Make_Ante(Ptr^.Right);
874    end;
875
876  {--------------------------------------------------------------------------}
877
878  procedure Make_OR(Ptr : TreePtr; AnteStr, ConsStr : Str255);
879
880    var  TempAnte : Str255;
881
882    begin
883      TempAnte := Make_Ante(Ptr);
884      if NoDups(TempAnte, ConsStr,0) then
885        begin
886          NumRules := NumRules + 1;
887          Rules^[NumRules]^.Antecedent := TempAnte;
888          Rules^[NumRules]^.Consequent := ConsStr;
889          Rules^[NumRules]^.Strength := 100;
890        end;
891    end;
892
893  {--------------------------------------------------------------------------}
```

```
22JUL91  6:27p          KUNI0722.U01              PAGE 20

894
895  procedure Construct_Rule(Ptr : TreePtr; AnteStr, ConsStr : Str255);
896    { nodes can be 'and', 'or', 'not', or atomic phrases }
897
898    var  TempAnte, TmepStr : Str255;
899         K : integer;
900
901    begin
902      { if node is an 'or' then create two rules, one for each child }
903      if Ptr^.Name = 'or' then
904        begin
905          if Ptr^.Left^.Name = 'or' then
906            Construct_Rule(Ptr^.Left, AnteStr, ConsStr)
907          else
908            Make_OR(Ptr^.Left, AnteStr, ConsStr);
909
910          if Ptr^.Right^.Name = 'or' then
911            Construct_Rule(Ptr^.Right, AnteStr, ConsStr)
912          else
913            Make_OR(Ptr^.Right, AnteStr, ConsStr);
914
915          if Ptr^.Left <> nil then
916            Construct_Rule(Ptr^.Left, AnteStr, ConsStr);
917
918          if Ptr^.Right <> nil then
919            Construct_Rule(Ptr^.Right, AnteStr, ConsStr);
920
921        end { or }
922
923      { if node name is 'and' then make rule for each assertion in the
924        conjunction :
925                       +------+
926            child --->| conj | ---> original consequent
927            child --->| name |
928                       +------+
929      }
930      else if Ptr^.Name = 'and' then
931        begin
932          TempAnte := Make_Ante(Ptr);
933
934          if NoDups(TempAnte, ConsStr, 2) then
935            begin
936              NumRules := NumRules + 1;
937              Rules^[NumRules]^.Antecedent := TempAnte;
938              Rules^[NumRules]^.AnteType   := 2;
939              Rules^[NumRules]^.Consequent := ConsStr;
940              Rules^[NumRules]^.Strength := 100;
941            end;
942
```

```
22JUL91  6:27p            KUNI0722.U01           PAGE 21

943            TempStr := TempAnte;
944            repeat
945              begin
946                K := pos(' and ',TempStr);
947                if K = 0 then K := 255;
948                if NoDups(Trim(copy(TempStr,1,K)), TempAnte, 0) then
949                  begin
950                    NumRules := NumRules + 1;
951                    Rules^[NumRules]^.Antecedent := Trim(copy(TempStr,1,K));
952                    Rules^[NumRules]^.Consequent := TempAnte;
953                    Rules^[NumRules]^.Strength := 100;
954                  end;
955                TempStr := Trim(copy(TempStr,K+5,255));
956              end;
957            until (K = 255);
958
959            if Ptr^.Left <> nil then
960              if Ptr^.Left^.Name = 'not' then
961                Construct_Rule(Ptr^.Left, AnteStr, TempAnte);
962
963            if Ptr^.Right <> nil then
964              if Ptr^.Right^.Name = 'not' then
965                Construct_Rule(Ptr^.Right, AnteStr, TempAnte);
966
967            if Ptr^.Right <> nil then
968              begin
969                if Ptr^.Right^.Left <> nil then
970                  if Ptr^.Right^.Left^.Name = 'not' then
971                    Construct_Rule(Ptr^.Right^.Left, AnteStr, TempAnte);
972                if Ptr^.Right^.Right <> nil then
973                  if Ptr^.Right^.Right^.Name = 'not' then
974                    Construct_Rule(Ptr^.Right^.Right, AnteStr, TempAnte);
975              end;
976
977         end  { and }
978
979       else if Ptr^.Name = 'not' then
980         begin
981
982           TempAnte := Make_Ante(Ptr);
983           if NoDups(TempAnte,ConsStr,4) then
984             begin
985               NumRules := NumRules + 1;
986               Rules^[NumRules]^.Antecedent := TempAnte;
987               Rules^[NumRules]^.AnteType := 4;
988               Rules^[NumRules]^.Consequent := ConsStr;
989               Rules^[NumRules]^.Strength := 100;
990             end;
991
```

```
992            TempAnte := Make_Ante(Ptr^.Left);
993            if NoDups(TempAnte,'not('+TempAnte+')',0) then
994              begin
995                NumRules := NumRules + 1;
996                Rules^[NumRules]^.Antecedent := TempAnte;
997                Rules^[NumRules]^.Consequent := 'not('+TempAnte+')';
998                Rules^[NumRules]^.Strength := 100;
999              end;
1000
1001           if Ptr^.Left <> nil then
1002             Construct_Rule(Ptr^.Left, AnteStr, ConsStr);
1003
1004           if Ptr^.Right <> nil then
1005             Construct_Rule(Ptr^.Right, AnteStr, ConsStr);
1006
1007         end  { not }
1008
1009       { if node is an atomic phrase then create simple rule }
1010       else if Ptr = Root then
1011         if NoDups( Ptr^.Name, ConsStr, 0) then
1012           begin
1013             NumRules := NumRules + 1;
1014             Rules^[NumRules]^.Antecedent := Ptr^.Name;
1015             Rules^[NumRules]^.Consequent := ConsStr;
1016             Rules^[NumRules]^.Strength := 100;
1017           end;
1018     end;
1019
1020 {---------------------------------------------------------------------------}
1021
1022 procedure DisplayTree (Ptr : TreePtr);
1023 { display tree }
1024
1025   var OffSet : integer;
1026
1027 begin
1028   ClrScr;
1029   OffSet := 0;
1030
1031   if Ptr = nil then
1032     writeln('root: nil')
1033   else
1034     begin
1035       writeln('root: ',Ptr^.Name);
1036       ShowBranch(OffSet,Ptr^.Left);
1037       ShowBranch(OffSet,Ptr^.Right);
1038     end;
1039   readln;
```

```
22JUL91  6:27p         KUNI0722.U01          PAGE 23

1040    end;
1041
1042  {-------------------------------------------------------------------------}
1043
1044  procedure BuildRules;
1045
1046    var AnteStr, ConsStr : Str255;
1047
1048    begin
1049
1050      if DEBUG then
1051        DisplayTree(Root);
1052
1053      { perform distribution of 'and' over 'or' }
1054      Distribute(Root);
1055      Distribute(Root);
1056
1057      { construct rules from tree structure }
1058      AnteStr := Rules^[NumRules]^.Antecedent;
1059      ConsStr := Rules^[NumRules]^.Consequent;
1060      NumRules := NumRules - 1;  { erase original rule }
1061      Construct_Rule(Root, AnteStr, ConsStr);
1062
1063      if DEBUG then
1064        DisplayTree(Root);
1065
1066      { dispose of tree }
1067      Release(Root);
1068    end;
1069
1070  {-------------------------------------------------------------------------}
1071
1072  procedure MakeConsequent(TempStr : Str255);
1073  { find consequent for current rule }
1074
1075    var N, M, K, L : integer;
1076        NameStr : Str255;
1077
1078    begin
1079      { find all key words }
1080      N := pos(' if ',TempStr);
1081      M := pos(' or ',TempStr);
1082      K := pos(' then ',TempStr);
1083      L := pos(' and ',TempStr);
1084
1085      NameStr := '';
1086
```

```
22JUL91  6:27p           KUNI0722.U01              PAGE 24
1087       if K <> 0 then
1088         begin
1089           NameStr := LeftTrim(copy(TempStr,K+5,255));
1090
1091           { strip off the string 'the' }
1092           if pos('the ',NameStr) = 1 then
1093             NameStr := LeftTrim(copy(NameStr,4,255));
1094           Rules^[NumRules]^.Consequent := Namestr;
1095           Rules^[NumRules]^.Strength := 100;
1096         end
1097       else
1098         Error(3);
1099
1100    end;
1101
1102  {----------------------------------------------------------------------}
1103
1104  procedure MakeAntecedent(TempStr : Str255);
1105  { find antecedent for current rule, then call MakeConsequent }
1106
1107    var N, M, K, L : integer;
1108        NameStr : Str255;
1109
1110    begin
1111      { find all key words }
1112      N := pos(' if ',TempStr);
1113      K := pos(' then ',TempStr);
1114
1115      NameStr := '';
1116      NameStr := LeftTrim(copy(TempStr,N+3,K-2));
1117      NumRules := NumRules + 1;
1118
1119      { strip off the string 'the' }
1120      if pos('the ',NameStr) = 1 then
1121        NameStr := LeftTrim(copy(NameStr,4,255));
1122
1123      Rules^[NumRules]^.Antecedent := Namestr;
1124
1125    end;
1126
1127  {----------------------------------------------------------------------}
1128
1129  procedure Conjunction(RuleNum : integer);
1130  { Rewrite any rules with conjunctions in the consequent using the following
1131    strategy:
1132
```

```
22JUL91 6:27p         KUNI0722.U01            PAGE 25

1133        Example:  input rule:    if A then (B and C) (cf)
1134
1135                  becomes:       if A then B (cf)
1136                                 if A then C (cf)
1137
1138   - - - - - - - - - - - - - - - - - - - - - - - - - - - - - - - - - - - - }
1139
1140   var J,K,L,M,
1141       NumAntes,
1142       NumCons,
1143       TempNum,
1144       OrigCF,
1145       TempCF,
1146       TempType,
1147       NewStrength : integer;
1148       TempArray   : array [1..10] of Str255;
1149       TempAnte,
1150       TempStr,TempStr2   : Str255;
1151
1152   begin
1153
1154       NumCons := 0;
1155       L := 1;
1156
1157       if pos(' and ',Rules^[RuleNum]^.Consequent) = 0 then
1158          exit;
1159
1160       { initialize temporary array }
1161       for K := 1 to 10 do
1162         for M := 1 to 160 do
1163           TempArray[K][M] := ' ';
1164
1165       TempType := Rules^[RuleNum]^.AnteType;
1166
1167       while pos(' and ',Rules^[RuleNum]^.Consequent) <> 0 do
1168         { keep doing this as long as an 'and' is found }
1169         begin
1170           L := pos(' and ',Rules^[RuleNum]^.Consequent);
1171           NumCons := NumCons + 1;
1172           TempArray[NumCons] := LeftTrim(copy(Rules^[RuleNum]^.Consequent,1,L-1));
1173
1174           TempStr := LeftTrim(copy(Rules^[RuleNum]^.Consequent,L+4,255));
1175
1176           { strip off the string 'the' }
1177           if pos('the ',TempStr) = 1 then
1178             TempStr := LeftTrim(copy(TempStr,4,255));
```

```
1179              Rules^[RuleNum]^.Consequent := TempStr;
1180          end;
1181
1182          { one more time to catch last expression after the 'and' }
1183          if NumCons <> 0 then
1184            begin
1185              NumCons := NumCons + 1;
1186              TempArray[NumCons] := LeftTrim(Rules^[RuleNum]^.Consequent);
1187            end;
1188
1189          { Create new rules with parsed expressions.
1190            The rule 'if E then C(n)' has already been created. It's what
1191            is left of the original rule. }
1192
1193          { store original antecedent and CF since the next several commands
1194            may modify them }
1195          TempAnte := Rules^[RuleNum]^.Antecedent;
1196          TempCF := Rules^[RuleNum]^.Strength;
1197
1198          { must act on antecedent simplification now because NumRules is
1199            modified }
1200          ParseTokens(NumRules); { create array of tokens from antecedent }
1201          BuildTree(NumRules);   { build parse tree from array of tokens }
1202          BuildRules;            { creat simplified rules from parse tree }
1203
1204          for J := 1 to NumCons - 1 do
1205            begin
1206              if NoDups(Rules^[RuleNum]^.Antecedent,TempArray[J], 0) then
1207                begin
1208                  NumRules := NumRules + 1;
1209                  Rules^[NumRules]^.Antecedent := TempAnte;
1210                  Rules^[NumRules]^.Consequent := TempArray[J];
1211                  Rules^[NumRules]^.Strength := TempCF;
1212
1213                  { must act on antecedent simplification now because
1214                    NumRules is modified }
1215                  ParseTokens(NumRules); { create array of tokens from antecedent }
1216                  BuildTree(NumRules);   { build parse tree from array of tokens }
1217                  BuildRules;            { creat simplified rules from parse tree }
1218                end;
1219            end;
1220    end;
1221
```

```
22JUL91  6:27p              KUNI0722.U01              PAGE 27

1222   {-------------------------------------------------------------------------}
1223
1224   procedure Unknown;
1225   { Rewrite any rules with unknown in the antecedent by using the
1226     following strategy:
1227
1228         Any rule with a 'unknown' in the antecedent in which the antecedent
1229         will become a middle layer node is ignored. This means that in the
1230         middle layer a positive statement (has-sauce = yes) phrase and its
1231         'unknown' couterpart (has-sauce=unknown), if used, are treated as
1232         separate nodes. For rules with 'unknown' in the antecedent in which
1233         the antecedent will end up being an input node, the following algorithm
1234         is used:
1235
1236                 For the rule
1237                         if A is unknown then B (cf)
1238
1239                 For every occurence of A in an antecedent of the form:
1240
1241                         A is X
1242
1243                 create a new rule:
1244
1245                         if A is X then A is unknown (cf)
1246
1247   }
1248
1249      var I,J,K : integer;
1250          Found_Cons : boolean;
1251          TempStr,
1252          CheckStr : Str255;
1253
1254      begin
1255        { examine each rule }
1256        for I := 1 to NumRules do
1257          begin
1258
1259            { if 'unknown' appears and it is a simple phrase }
1260            if (pos('unknown',Rules^[I]^.Antecedent) <> 0) and
1261               (pos('and ',Rules^[I]^.Antecedent) = 0) then
1262              begin
1263
1264                TempStr := Rules^[I]^.Antecedent;
1265                Rules^[I]^.AnteType := 3;
1266                CheckStr := Trim(copy(TempStr,1,pos('unknown',TempStr)-4));
1267
1268                { check each antecedent for a match };
```

```
22JUL91 6:27p           KUNI0722.U01           PAGE 28

1269            for J := 1 to NumRules do
1270              begin
1271                if (pos(CheckStr,Rules^[J]^.Antecedent) <> 0) and
1272                   (pos('unknown',Rules^[J]^.Antecedent) = 0) then
1273                  begin
1274                    { create new rule 'if A is X then A is unknown' }
1275                    if NoDups(Rules^[J]^.Antecedent,TempStr,0) then
1276                      begin
1277                        NumRules := NumRules + 1;
1278                        gotoXY(1,1);
1279                        writeln('Processing rule - ',NumRules);
1280                        Rules^[NumRules]^.Antecedent := Rules^[J]^.Antecedent;
1281                        Rules^[NumRules]^.Consequent := TempStr;
1282                        Rules^[NumRules]^.Strength := 100;
1283                      end;
1284                  end;
1285              end;
1286          end;
1287        end;
1288    end;
1289
1290 {--------------------------------------------------------------------------}
1291
1292 procedure Certainty(I : integer);
1293 { Parse certainty factor from each consequent. If none exists then assign
1294   cf of 100. Also remove periods from consequents. }
1295
1296   var J,K,L,
1297       CF,Code : integer;
1298       Found_Cons : boolean;
1299       TempStr : Str11;
1300
1301   begin
1302     for I := 1 to NumRules do
1303     { examine rule }
1304       begin
1305         CF := 0;
1306         TempStr := '';
1307
1308         J := pos(' cf ',Rules^[I]^.Consequent);
1309         K := pos('.',Rules^[I]^.Consequent);
1310
1311         { if 'cf' does not appear then assign 100 }
1312         if J = 0 then
1313           begin
1314             if K <> 0 then
1315               Rules^[I]^.Consequent := Trim(copy(Rules^[I]^.Consequent,1,K-1));
```

22JUL91 6:27p        KUNI0722.U01           PAGE 29

```
1316          end
1317
1318       else
1319          { read in cf and convert to an integer }
1320          begin
1321            if K = 0 then
1322              TempStr := copy(Rules^[I]^.Consequent,J+3,6)
1323            else
1324              TempStr := copy(Rules^[I]^.Consequent,J+3,K-J-3);
1325
1326            val(TempStr,CF,Code);
1327            if Code <> 0 then
1328              begin
1329                writeln(I,' : ',Rules^[I]^.Consequent);
1330                writeln('Error: ',TempStr,CF);
1331                readln;
1332                Error(5);
1333              end;
1334
1335            Rules^[I]^.Strength := (CF * Rules^[I]^.Strength) div 100;
1336            Rules^[I]^.Consequent := Trim(copy(Rules^[I]^.Consequent,1,J-1));
1337
1338          end;
1339       end;
1340    end;
1341
1342 {---------------------------------------------------------------------}
1343
1344 procedure Convert;
1345 { - - - - - - - - - - - - - - - - - - - - - - - - - - - - - - - - - -
1346    convert parsed rules to a network using the following strategy:
1347
1348    for each antecedent:
1349      1. make sure it is not already a node
1350      2. if it appears only as an antecedent then create an input node
1351      3. if it appears as an antecedent and as a consequent then create a
1352         middle (hidden) layer node
1353
1354    for each consequent:
1355      1. make sure that it is not already a node
1356      2. if it is not already marked as USED then it must appear only as a
1357         consequent, so create an output node
1358
1359    for each node
1360      1. assign a nodetype
1361
1362    for each rule:
```

22JUL91 6:27p        KUNI0722.U01           PAGE 30

```
1363     1. update the links
1364
1365  - - - - - - - - - - - - - - - - - - - - - - - - - - - - - - - - - - - -}
1366
1367   var I, J,
1368       TempType   : integer;
1369       Found_Cons : boolean;
1370
1371   begin
1372
1373      writeln('Creating nodes');
1374
1375      { for each antecedent }
1376      for I := 1 to NumRules do
1377        begin
1378          Found_cons := false;
1379          if not Rules^[I]^.Ante_Used then    { check if node already exists }
1380            begin
1381              for J := 1 to NumRules do     { check each consequent for match }
1382                if (Rules^[I]^.Antecedent = Rules^[J]^.Consequent) then
1383                  Found_Cons := true;
1384
1385              { found ante and cons, so create a middle layer node }
1386              if Found_Cons then
1387                begin
1388
1389                  { increment no of mid nodes }
1390                  NumMNodes := NumMNodes + 1;
1391
1392                  { give new node a name code }
1393                  MidArray[NumMNodes].NameCode := I;
1394
1395                  { give new node a type }
1396                  TempType := 1;
1397                  for J := 1 to NumRules do
1398                    if Rules^[MidArray[NumMNodes].NameCode]^.Antecedent = Rules^[J]^.Antecedent then
1399                      TempType := Max(TempType, Rules^[J]^.AnteType);
1400                  MidArray[NumMNodes].NodeType := TempType;;
1401                end
1402              else
1403                { only found ante, so create an input node }
1404                begin
1405                  NumINodes := NumINodes + 1;    { increment no of input nodes }
1406                  InArray[NumINodes].NameCode := I;  { give new node a name }
```

22JUL91 6:27p         KUNI0722.U01            PAGE 31

```
1407                InArray[I].NodeType := 1;
1408              end;
1409
1410          { mark all rules that have antecedents with same name as USED }
1411          TempStr := Trim(Rules^[I]^.Antecedent);
1412          for J := 1 to NumRules do
1413            if Rules^[J]^.Antecedent = TempStr then
1414              Rules^[J]^.Ante_Used := true;
1415
1416          { mark all rules that have consequents with same name as USED }
1417          for J := 1 to NumRules do
1418            if Rules^[J]^.Consequent = TempStr then
1419              Rules^[J]^.Cons_Used := true;
1420
1421        end; { if not ...Used }
1422
1423     end; { antecedents }
1424
1425     { for each consequent - building output nodes }
1426     for I := 1 to NumRules do
1427       begin
1428         if not Rules^[I]^.Cons_Used then     { check if node already exists }
1429           begin
1430             NumONodes := NumONodes + 1;     { increment no of output nodes }
1431             OutArray[NumONodes].NameCode := I; { give new node a name }
1432             OutArray[NumONodes].NodeType := 1;
1433
1434             { mark all rules that have consequents with same name as USED }
1435             TempStr := Rules^[I]^.Consequent;
1436             for J := 1 to NumRules do
1437               if Rules^[J]^.Consequent = TempStr then
1438                 Rules^[J]^.Cons_Used := true;
1439
1440           end;
1441       end; { consequents }
1442
1443
1444     assign(DebugFile,'NodeList.Net');
1445     rewrite(DebugFile);
1446
1447     writeln(DebugFile,'input nodes');
1448     for I := 1 to NumINodes do
1449       begin
1450         writeln(DebugFile,I:3,' Code:',InArray[I].NameCode:3,' ',Rules^[InArray[I].NameCode]^.Antecedent);
```

```
22JUL91  6:27p           KUNI0722.U01            PAGE 32

1451      end;
1452
1453      writeln(DebugFile,'middle nodes');
1454      for I := 1 to NumMNodes do
1455        begin
1456          write(DebugFile,I:3,' Code:',MidArray[I].NameCode:3);
1457          writeln(DebugFile,' Type:',MidArray[I].NodeType:1,'   ',Rules^[MidArray[I].NameCode]^.Antecedent);
1458        end;
1459
1460      writeln(DebugFile,'output nodes');
1461      for I := 1 to NumONodes do
1462        begin
1463          writeln(DebugFile,I:3,' Code:',OutArray[I].NameCode:3,'   ',Rules^[OutArray[I].NameCode]^.Consequent);
1464        end;
1465
1466      close(DebugFile);
1467
1468    end; { procedure }
1469
1470 {---------------------------------------------------------------------------}
1471
1472 procedure Acyclic;
1473 { A preliminary attempt to prevent cycles as a result of the network
1474   expansion process. Look at the array of hidden nodes and reorder them
1475   so that nodes containing the same string appear in increasing order of
1476   complexity. }
1477
1478 var TempStr, TempStr2 : Str255;
1479     I, J, Count, Pass, TempNameCode, TempNodeType : integer;
1480
1481 begin
1482   writeln('Testing for cycles in middle layer');
1483
1484   Count := 1;
1485   Pass := 0;
1486
1487   while Count <> 0 do
1488     begin
1489       Pass := Pass + 1;
1490       Count := 0;
1491
1492       for I := 1 to NumMNodes do
1493         begin
1494           TempStr := Rules^[MidArray[I].NameCode]^.Antecedent;
1495           for J := 1 to NumMNodes do
1496             begin
```

```
22JUL91  6:27p         KUNI0722.U01         PAGE 33

1497               TempStr2 := Rules^[MidArray[J].NameCode]^.Antecedent;
1498               if (I > J) and (pos(Trim(TempStr),TempStr2) <> 0) then
1499               { switch middle nodes I and J }
1500                 begin
1501                   Count := Count + 1;
1502                   TempNameCode := MidArray[I].NameCode;
1503                   TempNodeType := MidArray[I].NodeType;
1504                   MidArray[I].NameCode := MidArray[J].NameCode;
1505                   MidArray[I].NodeType := MidArray[J].NodeType;
1506                   MidArray[J].NameCode := TempNameCode;
1507                   MidArray[J].NodeType := TempNodeType;
1508                 end;
1509             end;
1510         end;
1511       writeln('Pass: ',Pass:3,'   Count: ',Count:3);
1512     end;
1513 end;
1514
1515 {---------------------------------------------------------------------}
1516
1517 procedure MakeLinks;
1518 { The model uses 3 weight arrays, representing a fully connected graph
1519   from INPUTS --> MIDDLE,  MIDDLE --> MIDDLE, and MIDDLE --> OUTPUT.
1520   The strategy for making links and thus creating the weight arrays is:
1521
1522       1. Examine each rule, locate the antecedent and the consequent
1523          in the node arrays.
1524
1525       2. Each antecedent and consequent should appear in exactly one
1526          place. An error is raised if this is not true.
1527
1528       3. Replace the link value with the rule's implication strength.
1529 }
1530
1531   var I,J,K,
1532       CheckSum : integer;
1533       TempWeightType : WeightType;
1534       Found : boolean;
1535       AnteIn,              { node number for antecedent in input array }
1536       AnteMid,             { node number for antecedent in middle array }
1537       ConsMid,             { node number for consequent in middle array }
1538       ConsOut   : integer; { node number for consequent in output array }
1539       LinkType : char;
1540
1541   begin
1542
1543     writeln('Creating Links');
1544
```

```
22JUL91  6:27p           KUNI0722.U01           PAGE 34

1545      { allocate space for weight arrays }
1546      New(State12);
1547      New(State22);
1548      New(State23);
1549
1550      { initialize state arrays }
1551      for I := 1 to NODE_ARRAY_SIZE do
1552        for J := 1 to NODE_ARRAY_SIZE do
1553          begin
1554            State12^[I,J].Value := 0;
1555            State22^[I,J].Value := 0;
1556            State23^[I,J].Value := 0;
1557            State12^[I,J].WType := Nonexistent;
1558            State22^[I,J].WType := Nonexistent;
1559            State23^[I,J].WType := Nonexistent;
1560          end;
1561
1562      { examine each rule }
1563      for I := 1 to NumRules do
1564        begin
1565
1566          AnteIn := 0;
1567          AnteMid := 0;
1568          ConsMid := 0;
1569          ConsOut := 0;
1570
1571          { initialize weight type to 'variable' }
1572          TempWeightType := Variable;
1573
1574          { check InArray for antecedent }
1575          J := 1;
1576          Found := false;
1577          while (J <= NumINodes) and (not Found) do
1578            if Rules^[I]^.Antecedent = Rules^[InArray[J].NameCode]^.Antecedent then
1579              Found := true
1580            else
1581              J := J + 1;
1582          if found then
1583            AnteIn := J;
1584          if Found and DEBUG then
1585            writeln('found input node ante: ',J:3,' for rule: ',I:3);
1586
1587          { check MidArray for antecedent }
1588          J := 1;
1589          Found := false;
1590          while (J <= NumMNodes) and (not Found) do
1591            if Rules^[I]^.Antecedent = Rules^[MidArray[J].NameCode]^.Antecedent then
```

```
22JUL91  6:27p         KUNI0722.U01           PAGE 35

1592              Found := true
1593            else
1594              J := J + 1;
1595         if found then
1596           AnteMid := J;
1597         if Found and DEBUG then
1598           writeln('found middle node ante: ',J:3,' for rule: ',I:3);
1599
1600         { check MidArray for consequent }
1601         J := 1;
1602         Found := false;
1603         while (J <= NumMNodes) and (not Found) do
1604           if Rules^[I]^.Consequent = Rules^[MidArray[J].NameCode]^.Antecedent then
1605             Found := true
1606           else
1607             J := J + 1;
1608         if found then
1609           begin
1610             ConsMid := J;
1611             { if conseuqnet is a 'regular' node, make weight variable,
1612               otherwise make it a 'fixed' weight }
1613             if Rules^[MidArray[J].NameCode]^.AnteType = 1 then
1614               TempWeightType := Variable
1615             else
1616               TempWeightType := Fixed;
1617           end;
1618         if Found and DEBUG then
1619           writeln('found middle node cons: ',J:3,' for rule: ',I:3);
1620
1621         { check OutArray for Consequent }
1622         J := 1;
1623         Found := false;
1624         while (J <= NumONodes) and (not Found) do
1625           if Rules^[I]^.Consequent = Rules^[OutArray[J].NameCode]^.Consequent then
1626             Found := true
1627           else
1628             J := J + 1;
1629         if found then
1630           begin
1631             ConsOut := J;
1632             TempWeightType := Variable;
1633           end;
1634         if Found and DEBUG then
1635           writeln('found output node cons: ',J:3,' for rule: ',I:3);
1636
1637         if DEBUG then readln;
1638
```

```
22JUL91  6:27p          KUN10722.U01           PAGE 36

1639         { all nodes have been searched, check for error conditions }
1640         CheckSum := 0;
1641
1642         if AnteIn <> 0 then
1643            CheckSum := CheckSum + 1;
1644         if AnteMid <> 0 then
1645            CheckSum := CheckSum + 1;
1646         if ConsMid <> 0 then
1647            CheckSum := CheckSum + 1;
1648         if ConsOut <> 0 then
1649            CheckSum := CheckSum + 1;
1650
1651         if CheckSum < 2 then
1652            Error(1);
1653         if CheckSum > 2 then
1654            Error(2);
1655
1656         { no checksum error has occurred so attempt to make link }
1657
1658         if (AnteIn <> 0) and (ConsMid <> 0) then
1659           begin
1660             State12^[AnteIn,ConsMid].Value := Rules^[I]^.Strength;
1661             State12^[AnteIn,ConsMid].WType := TempWeightType;
1662           end
1663         else if (AnteMid <> 0) and (ConsMid <> 0) then
1664           begin
1665             State22^[AnteMid,ConsMid].Value := Rules^[I]^.Strength;
1666             State22^[AnteMid,ConsMid].WType := TempWeightType;
1667           end
1668         else if (AnteMid <> 0) and (ConsOut <> 0) then
1669           begin
1670             State23^[AnteMid,ConsOut].Value := Rules^[I]^.Strength;
1671             State23^[AnteMid,ConsOut].WType := TempWeightType;
1672           end
1673         else
1674           begin
1675             writeln(AnteIn:3,' ',AnteMid:3,' ',ConsMid:3,' ',ConsOut:3);
1676             if (AnteIn <> 0) and (ConsOut <> 0) then
1677               begin
1678                 writeln('Attempt to create link from input layer to output layer.');
1679                 writeln('This is not supported.');
1680               end
1681             else
1682               writeln('Illegal link');
1683             readln;
1684           end;
1685      end;
```

```
22JUL91  6:27p            KUN10722.U01        PAGE 38

1732        writeln(V,'                       ',V);
1733      end;
1734    GotoXY(25,15);
1735    write(Chr(192));
1736    Replicate(H,30);
1737    write(Chr(217));
1738
1739    GotoXY(30,8);
1740    write('Input file: ');
1741    readln(FileStr);
1742    Assign(InFile,FileStr);
1743    {$I-} Reset(InFile) {$I+};
1744    if not (IOresult = 0) then
1745       Error(0);
1746
1747    ClrScr;
1748  end;
1749
1750  {--------------------------------------------------------------------------}
1751
1752  procedure Closing;
1753
1754    var I,J : integer;
1755
1756  begin
1757    writeln('The ',InputRules:3,' input rules have been converted to ',NumRules:3,' links.');
1758
1759    { save sizes and state arrays in ASCII format for passing to
1760      learning program }
1761    assign(CommonFile,'COMMON.NET');
1762    rewrite(CommonFile);
1763    writeln(CommonFile,IntoStr(NumRules,4));
1764    writeln(CommonFile,IntoStr(NumINodes,4));
1765    writeln(CommonFile,IntoStr(NumMNodes,4));
1766    writeln(CommonFile,IntoStr(NumONodes,4));
1767
1768    for I := 1 to NumMNodes do
1769      writeln(CommonFile,Rules^[MidArray[I].NameCode]^.AnteType:2);
1770
1771    { write weights for state array 12 }
1772    for I := 1 to NumINodes do
1773      for J := 1 to NumMNodes do
1774        if State12^[I,J].WType <> Nonexistent then
1775          begin
1776            write(CommonFile,' 12 ', I:5, J:5, State12^[I,J].Value:8);
1777            case State12^[I,J].WType of
1778              Fixed       : writeln(CommonFile,' 1');
```

```
22JUL91  6:27p           KUNI0722.U01              PAGE 39

1779                  Variable    : writeln(CommonFile,' 2');
1780                  Nonexistent : writeln(CommonFile,' 3');
1781              end;
1782          end;
1783
1784    { write weights for state array 22 }
1785    for I := 1 to NumMNodes do
1786      for J := 1 to NumMNodes do
1787        if State22^[I,J].WType <> Nonexistent then
1788          begin
1789            write(CommonFile,' 22  ', I:5, J:5, State22^[I,J].Value:8);
1790            case State22^[I,J].WType of
1791              Fixed       : writeln(CommonFile,' 1');
1792              Variable    : writeln(CommonFile,' 2');
1793              Nonexistent : writeln(CommonFile,' 3');
1794            end;
1795          end;
1796
1797    { write weights for state array 23 }
1798    for I := 1 to NumMNodes do
1799      for J := 1 to NumONodes do
1800        if State23^[I,J].WType <> Nonexistent then
1801          begin
1802            write(CommonFile,' 23  ', I:5, J:5, State23^[I,J].Value:8);
1803            case State23^[I,J].WType of
1804              Fixed       : writeln(CommonFile,' 1');
1805              Variable    : writeln(CommonFile,' 2');
1806              Nonexistent : writeln(CommonFile,' 3');
1807            end;
1808          end;
1809
1810    { write labels for nodes }
1811    for I := 1 to NumINodes do
1812      writeln(CommonFile,InArray[I].NameCode:4,' I ',I:2,'  ',Rules^[InArray[I].NameCode]^.Antecedent);
1813    for I := 1 to NumMNodes do
1814      writeln(CommonFile,MidArray[I].NameCode:4,' M ',I:2,'  ',Rules^[MidArray[I].NameCode]^.Antecedent);
1815    for I := 1 to NumONodes do
1816      writeln(CommonFile,OutArray[I].NameCode:4,' O ',I:2,'  ',Rules^[OutArray[I].NameCode]^.Consequent);
1817
1818    close(CommonFile);
1819    writeln('Global data has been written in ASCII format to COMMON.NET');
1820
1821    writeln('A textual list of nodes has been saved to NODELIST.NET');
1822    writeln('A textual list of links has been saved to RULELIST.NET');
1823    writeln('The following numbers of nodes have been created:');
1824    writeln('         INPUT LAYER: ',NumINodes : 3);
```

```
22JUL91  6:27p          KUNI0722.U01            PAGE 40

1825     writeln('         MIDDLE LAYER: ',NumMNodes : 3);
1826     writeln('         OUTPUT LAYER: ',NumONodes : 3);
1827
1828   end;
1829
1830 {--------------------------------------------------------------------}
1831
1832 begin
1833
1834   Menu;                    { input file menu }
1835
1836   Initialize;              { initialize data structures }
1837
1838
1839   while not eof(Infile) do    { read and parse rules into ante and cons }
1840     if FindRule then
1841       begin
1842         gotoXY(1,1);
1843         writeln('Processing rule - ',NumRules);
1844
1845         MakeAntecedent(TempStr);
1846
1847         MakeConsequent(TempStr);
1848
1849         if DEBUG then DisplayRule(NumRules);
1850
1851         Conjunction(NumRules);
1852
1853         ParseTokens(NumRules); { create array of tokens from antecedent }
1854
1855         BuildTree(NumRules);   { build parse tree from array of tokens }
1856
1857         BuildRules;            { creat simplified rules from parse tree }
1858       end;
1859
1860   gotoXY(1,1);
1861   writeln('Processing rule - ',NumRules);
1862
1863   TrimRules;
1864
1865   Certainty(NumRules);
1866
1867   Unknown;                 { remove meta-rules using 'unknown' }
1868
1869   PrintRules;              { print final list of rules }
1870
1871   Convert;                 { convert rules to nodes }
```

```
22JUL91  6:27p           KUNI0722.U01          PAGE 41
1872
1873    Acyclic;               { reorder middle nodes to test acyclicity }
1874
1875    MakeLinks;             { create arrays of weights }
1876
1877    Closing;               { save data and display closing remarks }
1878
1879 end.
1880
```

APPENDIX IV

C Source Code Re: Influence Factors
(Work in Progress)

```
3JAN92 11:55a          INFLUENC.C        PAGE  1

1  #include <stdio.h>
  2  #include <math.h>
  3  #include "tandc.c"
  4  #include "globals.c"
  5
  6
  7  float sqerror(pat)
  8  int pat;
  9  /***                                                              ***/
 10  /***                                                              ***/
 11  /*** Square error for pattern pat = sum of (desired (ideal) z     ***/
 12  /***     minus actual z values) ** 2                              ***/
 13  /***                                                              ***/
 14  /*** Called by module m1learn.                                    ***/
 15  /***                                                              ***/
 16  /***                                                              ***/
 17  {
 18  int i, j, dim;
 19  float sum;
 20
 21  dim = in + middle + out;
 22
 23  sum = 0.0;
 24  for (i=in+middle+1; i<=dim; i=i+1)
 25     {
 26
 27     j = i - (in+middle);
 28
 29     e[i][pat] = desiredz[j][pat] - z[i][pat];
 30
 31     sum = sum + (e[i][pat]) * (e[i][pat]);
 32
 33     }
 34
 35  return(sum);
 36  }
 37
 38
 39  void backprop(j, pat)
 40  int j, pat;
 41  /***                                                              ***/
 42  /***                                                              ***/
 43  /*** Backprop totals the error to be assigned to node j (pattern  ***/
 44  /***    pat) by multiplying weight (strength) of j's outgoing     ***/
 45  /***    connections by the error assigned to those downstream     ***/
 46  /***    nodes.                                                    ***/
 47  /***                                                              ***/
 48  /*** Called by module m1learn.                                    ***/
 49  /***                                                              ***/
```

```
3JAN92 11:55a           INFLUENC.C          PAGE  2

50  /***                                                              ***/
51
52  {
53
54    int i, k, dim, jismin;
55
56    float sum, minval;
57
58    sum = 0.0;
59
60    dim = in + middle + out;
61
62    for (i=1; i<=dim; i=i+1)
63      {
64
65  /*********************************************************************/
66  /***                                                              ***/
67  /*** This is the first pass partial implementation of influence   ***/
68  /*** factors - applied during the backward assignment of error    ***/
69  /*** phase.  Implemented for conjunction, negation and unknown    ***/
70  /*** nodes only - regular nodes are still assigned error in the   ***/
71  /*** original way - via weighted sums.                            ***/
72  /***                                                              ***/
73  /*********************************************************************/
74
75
76      if (f[i] <= 1)
77         sum = sum + s[i][j] * e[i][pat];
78
79      if (f[i] == 2)
80        {
81          minval = s[i][j] * z[j][pat];
82          jismin = 1;
83
84          for (k=1; k<=dim; k=k+1)
85            {
86              if ((fabs(s[i][k]) > 0.00001) && (s[i][k] * z[k][pat] < minval))
87                jismin = 0;
88            }
89          if (jismin == 1)
90             sum = sum + s[i][j] * e[i][pat];
91          else
92             sum = sum + 0.0;
93        }
94
95      if (f[i] >= 3)
96         sum = sum + 0.0;
97
98  /*     sum = sum - s[i][j] * e[i][pat];   another option for neg/unk nodes */
99
100
101     }
102
103   e[j][pat] = sum;
104  }
```

```
3JAN92 11:55a           INFLUENC.C           PAGE 3
105
106
107  void correct(pat, online)
108  int pat, online;
109
110  /***                                                    ***/
111  /***                                                    ***/
112  /***  Correct adjusts the weights in array s by backpropping  ***/
113  /***     error, computing weight changes (deltaw) and adding them ***/
114  /***     to s.                                          ***/
115  /***                                                    ***/
116  /***  Called (iteratively) by m1learn.                  ***/
117  /***                                                    ***/
118  /***  Calls backprop.                                   ***/
119  /***                                                    ***/
120
121  {
122
123     int i,j, dim;
124     int allok, jok;
125
126     float xn, yn, xp, yp, yplus, yminus;
127     float yplusprod, yminusprod, tempprod, lesser;
128     float partialy, partiale;
129
130     float Pj, Nj, ioutpprod, ioutnprod;
131
132     float normalizer[CMAXTOTALNODES];
133
134     int okflag, ii, k;
135
136     dim = in + middle + out;
137
138
139  /***                                                    ***/
140  /***  Tag all input and middle nodes as not active; their error ***/
141  /***     has yet to be assigned via backprop.           ***/
142  /***                                                    ***/
143
144     for (i=1; i<=in+middle; i=i+1)
145     activetag[i] = 0;
146
147  /***                                                    ***/
148  /***  Tag all output nodes as active; their error is assessed ***/
149  /***     directly by comparison to "ideal" or desired output. ***/
150  /***                                                    ***/
151
152     for (i=in+middle+1; i<=dim; i=i+1)
```

```
3JAN92 11:55a            INFLUENC.C         PAGE  4

153        activetag[i] = 1;
154
155
156   /***                                                        ***/
157   /*** Run through the nodes, backpropping error to node j as ***/
158   /***   soon as all j's downstream nodes have had blame (error) ***/
159   /***   assigned and are active.                             ***/
160   /***                                                        ***/
161
162     allok = 0;
163
164     while (allok == 0)
165     {
166       allok = 1;
167       for (j=in+middle; j>=1; j=j-1)
168       {
169         if (activetag[j] == 0)
170         {
171           allok = 0;
172           jok = 1;
173           for (i=1; i<=dim; i=i+1)
174           {
175             if (s[i][j] !=0.0 && activetag[i] == 0)
176               jok = 0;
177           }
178           if (jok == 1)
179           {
180             activetag[j] = 1;
181             backprop(j, pat);
182           }
183         }
184       }
185     }
186
187
188   /***                                                        ***/
189   /*** Compute deltaw's via M1 algebra calculations.          ***/
190   /***                                                        ***/
191
192     for (i=1; i<=dim; i=i+1)
193       for (j=1; j<=dim; j=j+1)
194         deltaw[i][j] = 0.0;
195
196     for (i=1; i<=dim; i=i+1)
197       normalizer[i] = 0.0;
198
199     for (j=1; j<=dim; j=j+1)
200       if (f[j] == 1)
201       {
202         yplusprod = 1.0;
203         yminusprod = 1.0;
204         for (i=1; i<=dim; i=i+1)
205         {
206           tempprod = s[j][i] * z[i][pat];
```

```
3JAN92 11:55a          INFLUENC.C          PAGE  5

207          if (tempprod > 0.0)
208             yplusprod = yplusprod * (1.0 - tempprod);
209          else
210             yminusprod = yminusprod * (1.0 + tempprod);
211          }
212          yplus = 1.0 - yplusprod;
213          yminus = -1.0 + yminusprod;
214
215          Pj = 1.0 - yplus;
216          Nj = 1.0 + yminus;
217
218          lesser = yplus;
219          if (-1.0 * yminus < lesser)
220             lesser = -1.0 * yminus;
221
222          y[j] = yplus + yminus;
223          if (lesser != 1.0)
224             y[j] = y[j] / (1.0 - lesser);
225
226
227
228
229          for (i=1; i<=dim; i=i+1)
230          {
231  /***                                                           ***/
232  /***    Change masks of connections with weights of 1 or -1 to 0  ***/
233  /***    to disallow learning on connections which are perfectly   ***/
234  /***    learned already.                                          ***/
235  /***                                                           ***/
236  /***    Update 16 Aug 90:  Mask connections with weights  < 0.2   ***/
237  /***    as 0 to disallow learning on connections under the        ***/
238  /***    threshold.                                                ***/
239  /***                                                           ***/
240  /***    Update 19 Feb 91:  Allow connections with weight 1 or     ***/
241  /***    -1 to learn - don't freeze them once they reach these     ***/
242  /***    boundaries.  Allow learning based on the "nodetype"       ***/
243  /***    variable only - this is the 4th value coming in  on       ***/
244  /***    common.net connection info lines.                         ***/
245  /***                                                           ***/
246  /***    Masks are set as common.net file is read in - in          ***/
247  /***    function importfiles.c                                    ***/
248  /***                                                           ***/
249
250
251  /*      if (fabs(fabs(s[j][i]) - 1.0) <= 0.000001)
252             mask[j][i] = 0;
253  */
254          if (s[j][i] < 0.2)
255             mask[j][i] = 0;
256
257  /***                                                           ***/
258  /***    Allow learning only on weights which have learning masks  ***/
259  /***    of 1.                                                     ***/
260  /***                                                           ***/
```

```
3JAN92 11:55a          INFLUENC.C         PAGE  6
261
262
263        if (mask[j][i] != 0)
264        {
265
266           tempprod = s[j][i] * z[i][pat];
267           xn = z[i][pat] / (1 + tempprod);
268           xp = z[i][pat] / (1 - tempprod);
269           yn = (1.0 - yplus) / (1.0 + yminus);
270           yp = (1.0 + yminus) / (1.0 - yplus);
271
272           if (yplus <= -1.0*yminus)
273              if (tempprod < 0.0)
274                 partialy = xn * yp;
275              else
276                 partialy = xp * yp;
277           else
278              if (tempprod < 0.0)
279                 partialy = xn * yn;
280              else
281                 partialy = xp * yn;
282
283
284 /*** New deltaw computation section.                    ***/
285 /*** Re-computes partial derivatives avoiding a potential ***/
286 /*** division by zero problem.                          ***/
287
288           ioutpprod = 1.0;
289           ioutnprod = 1.0;
290           for (k=1; k<=dim; k=k+1)
291              {
292                if (k != i)
293                   {
294                     tempprod = s[j][k] * z[k][pat];
295                     if (tempprod > 0.0)
296                        ioutpprod = ioutpprod * (1.0 - tempprod);
297                     else
298                        ioutnprod = ioutnprod * (1.0 + tempprod);
299                   }
300              }
301
302           tempprod = s[j][i] * z[i][pat];
303
304           if (Pj >= Nj)
305              {
306                if (tempprod < 0.0)
307                   partialy = ioutnprod * z[i][pat] / Pj;
308                else
309                   partialy = ioutpprod * z[i][pat] * Nj / (Pj * Pj);
310              }
311           else
312              {
313                if (tempprod < 0.0)
314                   partialy = ioutnprod * z[i][pat] * Pj / (Nj * Nj);
315                else
316                   partialy = ioutpprod * z[i][pat] / Nj;
317              }
318
```

```
3JAN92 11:55a        INFLUENC.C         PAGE  7

319              normalizer[j] = normalizer[j] + partialy * partialy;
320
321           partiale = 0.0;
322           if (y[j] >= 0.2)
323              partiale = e[j][pat] * partialy;
324
325
326
327           deltaw[j][i] = beta * partiale;
328
329
330         }
331       }
332
333       normalizer[j] = sqrt(normalizer[j]);
334
335
336     if (fabs(normalizer[j]) <= 0.000001)
337       {
338       normalizer[j] = 1.0;
339
340       }
341
342    }
343
344
345  /***                                                            ***/
346  /***  Squash delatw's by first dividing them by the normalizer  ***/
347  /***     then assuring their position inside the [1,-1] hypercube. ***/
348  /***     Sigma is used as a multiplicative factor to scale along ***/
349  /***     the deltaw vector.                                      ***/
350  /***                                                            ***/
351
352
353
354
355
356    for (j=1; j<=dim; j=j+1)
357     {
358     okflag = 1;
359
360     for (i=1; i<=dim; i=i+1)
361       {
362       if (mask[j][i] != 0)
363         {
364
365         deltaw[j][i] = deltaw[j][i] / normalizer[j];
366
367  /*   25 March 1991: If s is already on the border and deltaw   */
368  /*   would move it further outside the border, set deltaw to 0. */
369
370           if ((fabs(s[j][i]) >= 0.995) && ((s[j][i]*deltaw[j][i]) > 0.0))
371             {
372             if (s[j][i] > 0.0)
373               s[j][i] = 1.0;
374             else
```

```
3JAN92 11:55a          INFLUENC.C           PAGE  8

375               s[j][i] = -1.0;
376
377            deltaw[j][i] = 0.0;
378          }
379        if (online == 0)     /* if batch training   */
380           deltawstar[j][i] = deltawstar[j][i] + deltaw[j][i];
381
382
383        if (fabs(s[j][i] + deltaw[j][i]) > 1.0)
384          {
385            okflag = 0;
386            ii = i;
387          }
388      }
389    }
390
391    if (online == 1)    /** online training **/
392      {
393      if (okflag != 1)
394        {
395          printf ("\n Using the squashing fct to stay inside the hypercube.");
396          printf ("okflag = %d\n", okflag);
397          printf ("s[%d][%d] = %f, delta = %f \n", j, ii, s[j][ii], deltaw[j][ii]);
398        }
399
400      while (okflag == 0)
401        {
402         okflag = 1;
403
404         for (i=1; i<=dim; i=i+1)
405           {
406            deltaw[j][i] = sigma * deltaw[j][i];
407           }
408
409         for (i=1; i<=dim; i=i+1)
410            if (fabs(s[j][i] + deltaw[j][i]) > 1.0)
411               okflag = 0;
412        }
413
414  /***                                                            ***/
415  /*** Finally, add deltaw to s.                                  ***/
416  /***                                                            ***/
417
418        for (i=1; i<=dim; i=i+1)
419          if (fabs(deltaw[j][i]) > 0.0000001)
420            {
421             s[j][i] = s[j][i] + deltaw[j][i];
422            }
423        }
424      else                /** batch training **/
425        {
426         if (pat == numpats)  /** if you are on the last pattern **/
427            {
```

```
3JAN92 11:55a          INFLUENC.C       PAGE  9

428            okflag = 1;
429            for (i=1; i<=dim; i=i+1)
430              if (fabs(s[j][i] + deltawstar[j][i]) > 1.0)
431                okflag = 0;
432
433            while (okflag == 0)
434              {
435                okflag = 1;
436
437                for (i=1; i<=dim; i=i+1)
438                  {
439                    deltawstar[j][i] = sigma * deltawstar[j][i];
440                  }
441
442                for (i=1; i<=dim; i=i+1)
443                  if (fabs(s[j][i] + deltaw[j][i]) > 1.0)
444                    okflag = 0;
445              }
446
447 /***                                                            ***/
448 /*** Finally, add deltawstar to s.                              ***/
449 /***                                                            ***/
450
451            for (i=1; i<=dim; i=i+1)
452              if (fabs(deltawstar[j][i]) > 0.0000001)
453                {
454                  s[j][i] = s[j][i] + deltawstar[j][i];
455                }
456
457        }
458
459      }
460    }
461
462 }
463
464
465 void m1learn ()
466
467 /***                                                                ***/
468 /*** M1learn drives the learning algorithm modules.  It computes    ***/
469 /***    squared error, then iterates through a correction/flow      ***/
470 /***    forward set of instructions until convergence is attained.  ***/
471 /***                                                                ***/
472 /*** Called by flowdriver.                                          ***/
473 /***                                                                ***/
474 /*** Calls correct and flowforward.                                 ***/
475 /***                                                                ***/
476 {
477    FILE *fopen(), *errfile, *wtfile;
478
479    int i, ii, j, dim, its, pat;
```

```
3JAN92 11:55a          INFLUENC.C          PAGE 10
480
481    int key, itcount, online;
482
483    char fname[20], fname2[20];
484
485    float currsqerror, maxsqerror, totsqerror, maxabserror;
486
487    float strangeerror, temp1, wterr, totabserror, mae;
488
489    float oldtotsqerror, oldmae, progress;
490
491    float err[6][11];
492
493    printf ("\n To which file would you like iterations and error info sent?");
494    scanf ("%s", fname);
495
496    errfile = fopen(fname, "w");
497
498    printf ("\n To which file would you like weight info sent?");
499    scanf ("%s", fname2);
500
501    wtfile = fopen(fname2, "w");
502    fprintf (wtfile, "\n %d %d %d \n", numpats, numwrong, maxits);
503
504    dim = in + middle + out;
505
506    totabserror = 0.0;
507    maxsqerror = 0.0;
508    maxabserror = 0.0;
509    totsqerror = 0.0;
510    for (pat = 1; pat <=numpats; pat = pat+1)
511      {
512       currsqerror = sqrt(sqerror(pat));
513       if (currsqerror > maxsqerror)
514         maxsqerror = currsqerror;
515       totsqerror = totsqerror + currsqerror;
516
517       fprintf (errfile, "Sq error for pattern %d is %f\n", pat, currsqerror);
518
519       for (i=in+middle+1; i<=dim; i=i+1)
520         {
521          totabserror = totabserror + fabs(e[i][pat]);
522          if (fabs(e[i][pat]) > maxabserror)
523            maxabserror = fabs(e[i][pat]);
524         }
525      }
526    mae = totabserror / (numpats * out);
527
528    fprintf (errfile, "\n Mean Absolute Error = %f\n", mae);
529
530    fprintf (errfile, "\n Largest squared error among all patterns is %f\n", maxsqerror);
531
532    fprintf (errfile, "\n Total squared error for all patterns is %f\n", totsqerror);
533
```

```
3JAN92 11:55a          INFLUENC.C        PAGE 11

534    fprintf (errfile, "\n Largest absolute error is %f\n", maxabserror);
535
536
537
538   /*********************************************************************/
539   /*  This segment defining this strange type of error was added on    */
540   /*  27 Dec 1990 to assure that the two weights being tested which    */
541   /*  are slowest to return to their ideal values of 100 do indeed     */
542   /*  reach 100 before learning stops.                                 */
543   /*                                                                   */
544   /*********************************************************************/
545
546    strangeerror = 0.0;
547    for (i=1; i<=numwrong; i=i+1)
548      {
549         temp1 = fabs(goods[i] - s[r[i]][c[i]]);
550         if (temp1 > strangeerror)
551            strangeerror = temp1;
552      }
553
554    fprintf (errfile, "\n Largest weight error is %f\n", strangeerror);
555
556
557    printf ("\n Would you like to learn until the weights are perfect?\n");
558    printf ("1=yes  2=no  ");
559    scanf ("%d", &key);
560    wterr = -1.0;
561    if (key == 1)
562      wterr = 0.005;
563
564    printf ("Press any integer key to continue");
565    scanf ("%d", &key);
566
567    its = 0;
568
569    fprintf (errfile, "\n         Maxsqerr Totsqerr  Wterr   Maxouterr  MAE\n\n");
570      fprintf (errfile, " %4d: %f %f %f %f %f\n", its,
571             maxsqerror, totsqerror, strangeerror, maxabserror, mae);
572
573
574    itcount = 0;
575
576    printf ("\n Would you like to do ....\n");
577    printf ("       0    batch training  -or-\n");
578    printf ("       1    online training?\n");
579    scanf ("%d", &online);
580
581    printf ("\n To which file would you like the new state array to be sent?");
582    scanf ("%s", newstatearray);
583
584    progress = 1.0;
585
586    while (strangeerror > wterr && its < maxits)
587
588  /* while (maxabserror > epsilon && its < maxits) */
589
```

3JAN92 11:55a      INFLUENC.C       PAGE 12

```
590  /* while (progress > 0.00001 && its < maxits)  */
591
592    {
593       its = its + 1;
594       for (pat=1; pat<=numpats; pat=pat+1)
595       {
596
597          flowforward(pat);
598
599          for (i=in+middle+1; i<=dim; i=i+1)
600          {
601              j = i - (in+middle);
602
603              e[i][pat] = desiredz[j][pat] - z[i][pat];
604          }
605
606          correct(pat, online);
607  /*
608          for (i=1; i<=numwrong; i=i+1)
609              fprintf (wtfile, " %5.3f", s[r[i]][c[i]]);
610
611          fprintf (wtfile, "\n");
612  */
613
614          flowforward(pat);
615       }
616  /*
617       fprintf (wtfile, "\n");
618  */
619       oldmae = mae;
620       oldtotsqerror = totsqerror;
621       totsqerror = 0.0;
622       maxsqerror = 0.0;
623       maxabserror = 0.0;
624       totabserror = 0.0;
625       for (pat=1; pat<=numpats; pat=pat+1)
626       {
627          currsqerror = sqrt(sqerror(pat));
628          if (currsqerror > maxsqerror)
629              maxsqerror = currsqerror;
630          totsqerror = totsqerror + currsqerror;
631
632          for (i=in+middle+1; i<=dim; i=i+1)
633          {
634              totabserror = totabserror + fabs(e[i][pat]);
635              if (fabs(e[i][pat]) > maxabserror)
636                  maxabserror = fabs(e[i][pat]);
637          }
638
639       }
640
641       mae = totabserror / (numpats * out);
642
643       strangeerror = 0.0;
644       for (i=1; i<=numwrong; i=i+1)
645       {
646          temp1 = fabs(goods[i] - s[r[i]][c[i]]);
647          if (temp1 > strangeerror)
```

```
3JAN92 11:55a           INFLUENC.C          PAGE 13

648            strangeerror = temp1;
649         }
650
651      printf ("\n %4d", its);
652
653      itcount = itcount + 1;
654
655      err[1][itcount] = maxsqerror;
656      err[2][itcount] = totsqerror;
657      err[3][itcount] = strangeerror;
658      err[4][itcount] = maxabserror;
659      err[5][itcount] = mae;
660
661 /*      fprintf (errfile, " %4d: %f %f %f %f %f\n", its,
662               maxsqerror, totsqerror, strangeerror, maxabserror, mae);
663 */
664
665      if (itcount == 10)
666        {
667           for (i=1; i<=10; i=i+1)
668             {
669                fprintf (errfile, " %4d:", its-10+i);
670                for (ii=1; ii<=5; ii=ii+1)
671                   fprintf (errfile, " %f", err[ii][i]);
672                fprintf (errfile, "\n");
673             }
674           itcount = 0;
675           fclose (errfile);
676           errfile = fopen(fname, "a");
677 /*
678           fclose (wtfile);
679           wtfile = fopen(fname2, "a");
680 */
681        }
682
683      progress = fabs(oldtotsqerror - totsqerror);
684
685   }
686   if (itcount >= 1)
687     {
688        for (i=1; i<=itcount; i=i+1)
689          {
690             fprintf (errfile, " %4d:", its-itcount+i);
691             for (ii=1; ii<=5; ii=ii+1)
692                fprintf (errfile, " %f", err[ii][i]);
693             fprintf (errfile, "\n");
694          }
695     }
696
697   fprintf (errfile, "\n Learning ended with max error of %f and %d iterations.\n", maxsqerror, its);
698   fprintf (errfile, "\n Total squared error = %f\n", totsqerror);
699
700   for (pat=1; pat<=numpats; pat=pat+1)
701   {
702      fprintf (errfile, "\n \n Pattern = %d\n", pat);
703      fprintf (errfile, "\n Goal: ");
704
```

```
3JAN92 11:55a           INFLUENC.C         PAGE 14

705     for (i=1; i<=out; i=i+1)
706     {
707        fprintf (errfile, "%5.3f ", desiredz[i][pat]);
708     }
709
710     fprintf (errfile, "\n z:    ");
711     for (i=in+middle+1; i<=dim; i=i+1)
712     {
713        fprintf (errfile, "%5.3f ", z[i][pat]);
714     }
715  }
716
717  fclose (errfile);
718
719  fclose (wtfile);
720
721 printcommon();
722
723 }
724
725 void setup()
726 /***                                                      ***/
727 /***  This little module is misplaced; it sets up the learning ***/
728 /***     parameters but is called from the main program   ***/
729 /***        flowdriver.                                    ***/
730 /***                                                      ***/
731
732 {
733 printf ("\n Set-up Menu for Learning Parameters\n");
734
735 printf ("\n Value for BETA?...");
736 scanf ("%f", &beta);
737
738 printf ("\n Value for MAXIMUM # OF ITERATIONS?...");
739 scanf ("%d", &maxits);
740
741 printf ("\n Value for EPSILON?...");
742 scanf ("%f", &epsilon);
743 /*
744 printf ("\n Value for shrinking parameter SIGMA?...");
745 scanf ("%f", &sigma);
746
747 printf ("\n Value for LAMBDA?...");
748 scanf ("%f", &lambda);
749 printf ("\n Value for THRESHHOLD?...");
750 scanf ("%f", &T);
751 printf ("\n Value for MU?...");
752 scanf ("%f", &mu);
753
754
755 beta = 0.1;
756
757 maxits = 5;
758
759 epsilon = 0.001;
760 */
```

```
3JAN92 11:55a          INFLUENC.C        PAGE 15
761  sigma = 0.8;
762
763  lambda = 4.0;
764  T = 0.0;
765  mu = 0.0;
766
767  }
768
```

We claim:

1. A machine having a memory which contains data representing an acyclic event-driven neural network, said acyclic event-driven neural network having a plurality of nodes, each of said nodes being encoded in the form of an artificial neural object, said plurality of nodes including one or more input nodes and one or more output nodes, wherein each one of said plurality of nodes has encoded therein a respective weight vector value W and an internal state value y, said a cyclic neural network being operated in accordance with a method comprising:

(a) processing an example input signal E by said input nodes so that an output signal, z, is generated at said output nodes;

(b) assigning an error value to each one of said plurality of nodes in said neural network according to an error equation;

(c) encoding a respective new weight vector value, $W^{new}$, in each one of said plurality of nodes in said neural network based on said error value, wherein the new weight vector value for a specified one of said plurality of nodes is defined by the equation:

$$W^{new} = W + \Delta W,$$

where W is the weight vector value of said specified node prior to application of said example input signal E and $\Delta W$ is a vector pointing in the negative direction of the gradient of the error equation, the negative of the gradient of the error equation, $-\nabla E$, is calculated according to the gradient equation:

$$-\nabla E = 2e \frac{\partial F}{\partial w_i} f'(y),$$

i represents an integer value greater than zero and less than or equal to the number of nodes connected to provide input to said specified node in said neural network, e=I−z, wherein I represents an ideal output signal associated with said example input signal E for said specified node, $\partial F/\partial w_i$ is calculated according to the equation:

$$\frac{\partial F}{\partial w_i} = \begin{cases} \frac{x_i}{1+x_iw_i} \frac{1+y^+}{1-y^-}, & \text{if } y^+ \leq |y^-| \text{ and } i \in N, \\ \frac{x_i}{1-x_iw_i} \frac{1+y^+}{1-y^-}, & \text{if } y^+ \leq |y^-| \text{ and } i \in P, \\ \frac{x_i}{1+x_iw_i} \frac{1+y^-}{1-y^+}, & \text{if } y^+ \leq |y^-| \text{ and } i \in N, \\ \frac{x_i}{1-x_iw_i} \frac{1+y^-}{1-y^+}, & \text{if } y^+ \leq |y^-| \text{ and } i \in P, \end{cases}$$

$x_i$ is defined as an input value for the ith input into said specified node, $w_i$ is defined as a weighted input value for the ith input into said specified node, $y^+$ is generated according to the equation:

$$y^+ = 1 - \prod_{i \in P} (1 - x_i w_i),$$

$y^-$ is generated according to the equation:

$$y^- = -1 + \prod_{i \in N} (1 - x_i w_i),$$

where P is the set of inputs to said specified node with a positive weight value and N is the set of inputs to said specified node with a negative weight value, f'(y) is calculated according to the equation:

$$f'(y) = \begin{cases} 0, & \text{if } y < 0.2 \\ 1, & \text{otherwise} \end{cases} ; \text{ and}$$

(d) replacing the encoded representation of the weight vector value W of each one of said plurality of nodes in said neural network with a value encoding each node's new weight vector value $W^{new}$.

2. The machine of claim 1 wherein the new weight vector value $W^{new}$ is generated subject to the following constraints:

(a) the change in the weight vector value W is a positive scalar multiple of the negative of the gradient of the error equation;

(b) the change in the weight vector value W is not greater than a predetermined maximum step size; and (c) the new weight vector value $W^{new}$ lies within the weight space of a preselected hypercube in a multidimensional vector space.

3. The machine of claim 1 wherein an error signal e for a specified one of said one or more output nodes is generated in accordance with the equation:

$$e = I - \zeta$$

where I is the ideal output signal of said specified output node, $\zeta$ is a computed output signal of said specified output node, and an error signal at a particular node that is not an output node and whose output is applied as an input to a first group of nodes, said first group of nodes having k nodes, via weighted connections having connection weights is generated in accordance with the equation:

$$e = \sum_{j=1}^{k} \epsilon_j e_j$$

$$[e = \Sigma_k \epsilon_k e_k]$$

where e represents the error of the particular node as a function of the errors of the weighted nodes, $e_j$, that receive output from the particular node, where j represents an integer value having a range from one to k, and $e_j$ represents an error distribution weight that is equal to the connection weight of the weighted connection between the particular node and said first group of nodes which receive the particular node's output.

4. A machine having a memory which contains data representing an expert network, said expert network having a plurality nodes, said plurality of nodes consisting of negation nodes, conjunction nodes and regular nodes, each of said plurality of nodes being encoded in the form of an artificial neural object, said plurality of nodes including one or more input nodes and one or more output nodes, wherein each one of said plurality of nodes has encoded therein a respective weight vector value F/and an internal state value y, said expert network being operated in accordance with a method comprising:

(a) processing an example input signal E by said input nodes so that an output signal, z, is generated at said output nodes;

(b) assigning an error value to each one of said plurality of nodes in said expert network according to an error equation;

(c) encoding a respective new weight vector value, $W^{new}$, in each one of said plurality of nodes in said neural network based on said error value, wherein the new weight vector value for a specified one of said plurality of nodes is defined by the equation:

$$W^{new} = W + \Delta W,$$

where W is the weight vector value of said specified node prior to application of said example input signal E and $\Delta W$ is a vector pointing in the negative direction of the gradient of the error equation, and where the negative of the gradient of the error equation, $-\nabla E$, is calculated according to the gradient equation:

$$-\nabla E = 2e \frac{\partial F}{\partial w_i} f'(y),$$

i represents an integer value greater than zero and less than or equal to the number of nodes connected to provide input to said specified node in said neural network,
e=I–z, wherein I represents an ideal output signal associated with said example input signal E for said specified node, $\partial F/\partial w_i$ is calculated according to the equation:

$$\frac{\partial F}{\partial w_i} = \begin{cases} \frac{x_i}{1+x_iw_i} \frac{1+y^+}{1-y^-}, & \text{if } y^+ \leq |y^-| \text{ and } i \in N, \\ \frac{x_i}{1-x_iw_i} \frac{1+y^+}{1-y^-}, & \text{if } y^+ \leq |y^-| \text{ and } i \in P, \\ \frac{x_i}{1+x_iw_i} \frac{1+y^-}{1-y^+}, & \text{if } y^+ \leq |y^-| \text{ and } i \in N, \\ \frac{x_i}{1-x_iw_i} \frac{1+y^-}{1-y^+}, & \text{if } y^+ \leq |y^-| \text{ and } i \in P, \end{cases}$$

$x_i$ is defined as an input value for the ith input into said specified node,
$w_i$ is defined as a weighted input value for the ith input into said specified node,
$y^+$ is generated according to the equation:

$$y^+ = 1 - \prod_{i \in P} (1 - x_i w_i),$$

$y^-$ is generated according to the equation:

$$y^- = -1 + \prod_{i \in N} (1 - x_i w_i),$$

where P is the set of inputs to said specified node with a positive weight value and N is the set of inputs to said specified node with a negative weight value, f'(y) is calculated according to the equation:

$$f'(y) = \begin{cases} 0, & \text{if } y < 0.2 \\ 1, & \text{otherwise} \end{cases} ; \text{ and}$$

(d) replacing the encoded representation of the weight vector value W of each one of said plurality of nodes in said expert network with a value encoding each node's new weight vector value $W^{new}$.

5. The machine of claim 4 wherein the new weight vector value $W^{new}$ is generated subject to the following restraints:

(a) that the change in the weight vector value W be a positive scalar multiple of the negative of the gradient of the error equation;

(b) that the change in the weight vector value W not be greater than a predetermined maximum step size; and (c) that the new weight vector value $W^{new}$ lies within the weight space of a preseleeted hypercube in a multidimensional vector space.

6. The machine of claim 4 wherein an error signal e for a specified one of said one or more output nodes is generated in accordance with the equation:

$$e = I - \zeta$$

where I is the ideal output signal of the specified output node, $\zeta$ is a computed output signal of the specified output node, and an error signal at a particular node that is not an output node and whose output is applied as an input to a first group of nodes, said first group of nodes having k nodes, via weighted connections having connection weights is generated in accordance with the equation:

$$e = \sum_{j=1}^{k} e_j \epsilon_j,$$

where e represents the error of the particular node as a function of the errors of the first group of nodes, $e_j$, that receive output from the particular node, where j represents an integer value having a range from one to k, and $\epsilon_j$ is an error distribution weight that is equal to the connection weight of the weighted connection between the particular node and the first group of nodes which receive the particular node's output.

* * * * *

UNITED STATES PATENT AND TRADEMARK OFFICE
CERTIFICATE OF CORRECTION

Page 1 of 2

PATENT NO. : 5,649,066
DATED : July 15, 1997
INVENTOR(S) : Robert Christopher Lacher, Susan Irene Hruska, and David Carl Kunicky It is certified that error appears in the above-indentified patent and that said Letters Patent is hereby corrected as shown below:

Column 280, line 33, replace the first minus sign with an equal sign, for the equation to read:

$$e = I - \zeta$$

Column 280, lines 43-46, instead of the following equation:

$$e = \sum_{j=1}^{k} \varepsilon_j e_j$$

$$\left[ e = \sum_k \varepsilon_k e_k \right]$$

the equation should read:

$$e = \sum_{j=1}^{k} \varepsilon_j e_j$$

Column 280, line 52, "ej" represents" should read --Ej is--.

UNITED STATES PATENT AND TRADEMARK OFFICE
CERTIFICATE OF CORRECTION

PATENT NO. : 5,649,066
DATED : July 15, 1997
INVENTOR(S) : Robert Christopher Lacher, Susan Irene Hruska, and David Carl Kunicky It is certified that error appears in the above-indentified patent and that said Letters Patent is hereby corrected as shown below:

Column 280, line 65, "F/" should read --W--.

Column 280, line 51, after "and" insert --where e represents the error of the particular node as a function of the errors of the first group of nodes, $e_j$, that receive output from the particular node, where j represents an integer value having a range from one to k, and--.

Column 280, line 54, "said" should read --the--.

Signed and Sealed this

Twenty-fifth Day of November, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,649,066

DATED : July 15, 1997

INVENTOR(S) : Robert Christopher Lacher, Susan Irene Hruska, and David Carl Kunicky It is certified that error appears in the above-identified patent and that said Letters Patent is hereby corrected as shown below:

Column 280, line 33, replace the first minus sign with an equal sign, for the equation to read:

$$e = I - \zeta$$

Column 280, lines 43-46, instead of the following equation:

$$e = \sum_{j=1}^{k} \varepsilon_j e_j$$
$$\left[ e = \sum_k \varepsilon_k e_k \right]$$

the equation should read:

$$e = \sum_{j=1}^{k} \varepsilon_j e_j$$

Column 280, line 52, "$e_j$" should read --$\varepsilon_j$--.

UNITED STATES PATENT AND TRADEMARK OFFICE
CERTIFICATE OF CORRECTION

PATENT NO. : 5,649,066
DATED : July 15, 1997
INVENTOR(S) : Robert Christopher Lacher, Susan Irene Hruska, and David Carl Kunicky It is certified that error appears in the above-identified patent and that said Letters Patent is hereby corrected as shown below:

Column 280, line 65, "F/" should read --W--.

This Certificate supersedes Certificate of Correction issued November 25, 1997.

Signed and Sealed this

Twenty-third Day of December, 1997

Attest:

BRUCE LEHMAN

Attesting Officer

Commissioner of Patents and Trademarks